US010313754B2

(12) United States Patent
Mudd et al.

(10) Patent No.: US 10,313,754 B2
(45) Date of Patent: Jun. 4, 2019

(54) SYSTEM AND METHOD FOR PERSONALIZING PLAYBACK CONTENT THROUGH INTERACTION WITH A PLAYBACK DEVICE

(71) Applicant: SLACKER, INC., San Diego, CA (US)

(72) Inventors: Dennis M. Mudd, Poway, CA (US); Wendy Eichenbaum, San Diego, CA (US); David James Parise, San Marcos, CA (US)

(73) Assignee: SLACKER, INC, San Diego, CA (US)

( * ) Notice: Subject to any disclaimer, the term of this patent is extended or adjusted under 35 U.S.C. 154(b) by 0 days.

(21) Appl. No.: 14/550,804

(22) Filed: Nov. 21, 2014

(65) Prior Publication Data

US 2017/0195728 A1 Jul. 6, 2017

Related U.S. Application Data

(63) Continuation of application No. 12/045,666, filed on Mar. 10, 2008, now abandoned.

(Continued)

(51) Int. Cl.
*H04N 21/45* (2011.01)
*H04N 21/482* (2011.01)
(Continued)

(52) U.S. Cl.
CPC ......... *H04N 21/4532* (2013.01); *G06F 16/13* (2019.01); *G06F 16/435* (2019.01);
(Continued)

(58) Field of Classification Search
CPC ......... G06F 17/30749; G06F 17/30766; G06F 17/30772; G06F 17/30775
(Continued)

(56) References Cited

U.S. PATENT DOCUMENTS 4,881,078 A 11/1989 Toshinobu et al.
4,914,448 A 4/1990 Ostsuka et al.
(Continued)

FOREIGN PATENT DOCUMENTS

EP 0406845 B1 1/1994
EP 1610145 A1 12/2005
(Continued)

OTHER PUBLICATIONS

Carlvik, O. et al., "IP-Based Personalized Media on Demand," ISS '97, World Telecommunications Congress, (International Switching Symposium); Global Network Evolution: Convergence or Collision? Toronto, Sep. 21-26, 1997, pp. 365-370.
(Continued)

*Primary Examiner* — Joshua D Taylor
*Assistant Examiner* — Jaycee Imperial
(74) *Attorney, Agent, or Firm* — Cooley LLP

(57) ABSTRACT

User interfaces associated with devices and applications for distributing digital media content are described. A user interface may be provided that includes a favorites selection button allowing a user to identify selected media tracks and/or associated artists to be played more frequently. A ban selection button may be also provided allowing a user to selectively ban media tracks and/or associated artists. Additional controls may be provided including controls and interfaces for creating user customized stations to customize content delivery based on user specified preferences stored in a user profile.

30 Claims, 47 Drawing Sheets

Related U.S. Application Data

(60) Provisional application No. 60/893,849, filed on Mar. 8, 2007, provisional application No. 60/893,840, filed on Mar. 8, 2007.

(51) Int. Cl.

| | |
|---|---|
| *H04N 5/445* | (2011.01) |
| *G06F 16/13* | (2019.01) |
| *G06F 16/48* | (2019.01) |
| *G06F 16/64* | (2019.01) |
| *G06F 16/68* | (2019.01) |
| *G06F 16/435* | (2019.01) |
| *G06F 16/635* | (2019.01) |
| *G06F 16/638* | (2019.01) |
| *H04L 29/06* | (2006.01) |
| *H04L 29/08* | (2006.01) |
| *H04W 8/18* | (2009.01) |

(52) U.S. Cl.
 CPC ............ *G06F 16/48* (2019.01); *G06F 16/637* (2019.01); *G06F 16/639* (2019.01); *G06F 16/64* (2019.01); *G06F 16/68* (2019.01); *H04L 65/604* (2013.01); *H04L 67/306* (2013.01); *H04N 5/44543* (2013.01); *H04N 21/482* (2013.01); *H04N 21/4825* (2013.01); *H04W 8/18* (2013.01)

(58) Field of Classification Search
 USPC ................................... 725/46; 715/764, 765
 See application file for complete search history.

(56) References Cited

U.S. PATENT DOCUMENTS

| | | |
|---|---|---|
| 5,038,211 A | 8/1991 | Hallenbeck |
| 5,117,407 A | 5/1992 | Vogel |
| 5,311,175 A | 5/1994 | Waldman |
| 5,323,267 A | 6/1994 | Galarneau et al. |
| 5,666,113 A | 9/1997 | Logan |
| 5,923,267 A | 7/1999 | Beuk et al. |
| 5,977,964 A | 11/1999 | Williams et al. |
| 6,004,135 A | 12/1999 | Trattner et al. |
| 6,023,242 A | 2/2000 | Dixon |
| 6,049,306 A | 4/2000 | Amarillas |
| 6,317,784 B1 | 11/2001 | Mackintosh et al. |
| 6,349,339 B1 | 2/2002 | Williams |
| 6,351,596 B1 | 2/2002 | Ostrover |
| 6,388,345 B1 | 5/2002 | Stimpson |
| 6,389,321 B2 | 5/2002 | Tang et al. |
| 6,437,774 B1 | 8/2002 | Tsuji et al. |
| 6,553,222 B1 | 4/2003 | Weiss |
| 6,563,805 B1 | 5/2003 | Ma et al. |
| 6,564,003 B2 | 5/2003 | Marko et al. |
| 6,587,127 B1 | 7/2003 | Leeke et al. |
| 6,658,062 B1 | 12/2003 | Nakatsuyama et al. |
| 6,680,677 B1 | 1/2004 | Tiphane |
| 6,778,841 B1 | 8/2004 | Bories et al. |
| 6,785,656 B2 | 8/2004 | Patsiokas et al. |
| 6,795,702 B2 | 9/2004 | Sennett |
| 6,822,635 B2 | 11/2004 | Shahoian et al. |
| 6,834,156 B1 | 12/2004 | Marko et al. |
| 6,876,835 B1 | 4/2005 | Marko et al. |
| 6,904,055 B2 | 6/2005 | Pichna et al. |
| 6,933,433 B1 | 8/2005 | Porteus et al. |
| 6,934,917 B2 | 8/2005 | Lin |
| 6,972,363 B2 | 12/2005 | Georges et al. |
| 6,985,694 B1 | 1/2006 | De Bonet et al. |
| 7,010,263 B1 | 3/2006 | Patsiokas et al. |
| 7,028,082 B1 | 4/2006 | Rosenberg et al. |
| 7,035,932 B1 | 4/2006 | Dowling |
| 7,057,521 B1 | 6/2006 | Beuk et al. |
| 7,106,221 B2 | 11/2006 | Horton et al. |
| 7,232,973 B2 | 1/2007 | Kaps et al. |
| 7,187,947 B1 | 3/2007 | White et al. |
| 7,216,008 B2 | 5/2007 | Sakata |
| 7,251,452 B2 | 7/2007 | Stumphauzer, II |
| 7,293,066 B1 | 11/2007 | Day |
| 7,352,331 B2 | 4/2008 | Quagliaro |
| 7,403,910 B1 | 7/2008 | Hastings et al. |
| 7,526,728 B2 | 4/2009 | Apparao et al. |
| 7,555,539 B1 | 6/2009 | Rosenberg et al. |
| 7,483,964 B1 | 10/2009 | Jackson et al. |
| 7,624,337 B2 | 11/2009 | Sull et al. |
| 7,680,959 B2 | 3/2010 | Svendsen |
| 7,756,388 B2 | 7/2010 | Plastina et al. |
| 7,840,563 B2 | 11/2010 | Powers et al. |
| 7,877,290 B1 | 1/2011 | Arsenault et al. |
| 7,884,274 B1 | 2/2011 | Wieder |
| 7,890,874 B2 | 2/2011 | Kaufman |
| 7,953,032 B2 | 5/2011 | Liang |
| 8,050,652 B2 | 11/2011 | Qureshey et al. |
| 8,204,073 B1 | 6/2012 | Gailloux et al. |
| 8,332,512 B1 | 12/2012 | Wu et al. |
| 8,370,351 B2 | 2/2013 | Kalasapur et al. |
| 8,443,007 B1 | 5/2013 | Kindig et al. |
| 8,712,563 B2 | 4/2014 | Milbrandt et al. |
| 8,737,910 B2 | 5/2014 | Zigler et al. |
| 8,838,564 B2 | 9/2014 | Sahni et al. |
| 8,849,820 B1 | 9/2014 | Kindig et al. |
| 8,881,209 B2 | 11/2014 | Kalmes et al. |
| 2001/0005900 A1 | 6/2001 | Yoshida et al. |
| 2001/0053944 A1 | 12/2001 | Marks et al. |
| 2002/0016643 A1 | 2/2002 | Sakata |
| 2002/0041692 A1 | 4/2002 | Seto et al. |
| 2002/0072341 A1 | 6/2002 | Ricard et al. |
| 2002/0073225 A1 | 6/2002 | Dillon et al. |
| 2002/0082901 A1* | 6/2002 | Dunning ........... G06F 17/30017 705/26.63 |
| 2002/0092019 A1 | 7/2002 | Marcus |
| 2002/0158838 A1 | 10/2002 | Smith et al. |
| 2002/0164973 A1 | 11/2002 | Janik et al. |
| 2002/0184111 A1 | 12/2002 | Swanson |
| 2002/0199194 A1 | 12/2002 | Ali |
| 2003/0006690 A1 | 1/2003 | Roh |
| 2003/0006892 A1 | 1/2003 | Church |
| 2003/0014496 A1 | 1/2003 | Spencer et al. |
| 2003/0027523 A1 | 2/2003 | Lim |
| 2003/0050997 A1 | 3/2003 | Hickey et al. |
| 2003/0052913 A1 | 3/2003 | Barile |
| 2003/0061611 A1 | 3/2003 | Pendakur |
| 2003/0066090 A1 | 4/2003 | Traw et al. |
| 2003/0073411 A1 | 4/2003 | Meade |
| 2003/0089218 A1* | 5/2003 | Gang ................ G06F 17/30743 84/615 |
| 2003/0110503 A1 | 6/2003 | Perkes |
| 2003/0122779 A1 | 7/2003 | Martin et al. |
| 2003/0182255 A1 | 9/2003 | Plastina et al. |
| 2004/0001690 A1 | 1/2004 | Boston et al. |
| 2004/0017316 A1 | 1/2004 | Tanaka et al. |
| 2004/0044677 A1 | 3/2004 | Huper-Graff et al. |
| 2004/0064476 A1 | 4/2004 | Rounds |
| 2004/0158860 A1 | 8/2004 | Crow |
| 2004/0218067 A1 | 11/2004 | Chen et al. |
| 2004/0220926 A1 | 11/2004 | Lamkin et al. |
| 2004/0267503 A1 | 12/2004 | Batterberry et al. |
| 2005/0108754 A1 | 5/2005 | Carhart et al. |
| 2005/0114794 A1 | 5/2005 | Grimes et al. |
| 2005/0120305 A1 | 6/2005 | Engstrom et al. |
| 2005/0172318 A1 | 8/2005 | Dudkiewicz et al. |
| 2005/0179668 A1 | 8/2005 | Edwards |
| 2005/0198690 A1 | 9/2005 | Esolen et al. |
| 2005/0240661 A1 | 10/2005 | Heller et al. |
| 2006/0005148 A1 | 1/2006 | Cheng et al. |
| 2006/0009199 A1 | 1/2006 | Mittal |
| 2006/0123053 A1 | 1/2006 | Scannell |
| 2006/0022960 A1 | 2/2006 | Fukushima |
| 2006/0026663 A1 | 2/2006 | Kortum et al. |
| 2006/0031892 A1 | 2/2006 | Cohen |
| 2006/0075007 A1 | 4/2006 | Anderson et al. |
| 2006/0085349 A1 | 4/2006 | Hug |
| 2006/0112082 A1 | 5/2006 | Platt et al. |
| 2006/0126750 A1 | 6/2006 | Friedman |

(56) References Cited

U.S. PATENT DOCUMENTS

| | | |
|---|---|---|
| 2006/0143094 A1 | 6/2006 | Kohout et al. |
| 2006/0149813 A1 | 7/2006 | Janik |
| 2006/0156236 A1 | 7/2006 | Heller et al. |
| 2006/0174313 A1* | 8/2006 | Ducheneaut ......... G06Q 10/10 725/135 |
| 2006/0194535 A1 | 8/2006 | Houldsworth et al. |
| 2006/0195516 A1 | 8/2006 | Beaupre |
| 2006/0195790 A1 | 8/2006 | Beaupre et al. |
| 2006/0200599 A1 | 9/2006 | Manchester et al. |
| 2006/0206478 A1 | 9/2006 | Glaser et al. |
| 2006/0206493 A1 | 9/2006 | Lipscomb et al. |
| 2006/0212442 A1 | 9/2006 | Conrad et al. |
| 2006/0212444 A1* | 9/2006 | Handman ......... G06F 17/30017 |
| 2006/0218187 A1 | 9/2006 | Plastina et al. |
| 2006/0227905 A1 | 10/2006 | Kunysz et al. |
| 2006/0235864 A1 | 10/2006 | Hotelling et al. |
| 2006/0238517 A1 | 10/2006 | King et al. |
| 2006/0239131 A1 | 10/2006 | Nathan et al. |
| 2006/0253782 A1 | 11/2006 | Stark et al. |
| 2006/0265329 A1 | 11/2006 | Hug |
| 2006/0265421 A1* | 11/2006 | Ranasinghe ...... G06F 17/30743 |
| 2007/0013593 A1 | 1/2007 | Zafar et al. |
| 2007/0041350 A1 | 2/2007 | Famolari |
| 2007/0073728 A1 | 3/2007 | Klein et al. |
| 2007/0078899 A1 | 4/2007 | Gulin et al. |
| 2007/0079352 A1 | 4/2007 | Klein, Jr. |
| 2007/0089057 A1 | 4/2007 | Kindig |
| 2007/0089132 A1* | 4/2007 | Qureshey .......... G06F 17/30749 725/39 |
| 2007/0136753 A1 | 6/2007 | Bovenschulte et al. |
| 2007/0152975 A1 | 7/2007 | Ogihara et al. |
| 2007/0152977 A1 | 7/2007 | Ng et al. |
| 2007/0156589 A1 | 7/2007 | Zimler et al. |
| 2007/0174147 A1 | 7/2007 | Klein, Jr. |
| 2007/0208610 A1 | 9/2007 | Pisaris-Henderson et al. |
| 2007/0220552 A1 | 9/2007 | Juster et al. |
| 2007/0236472 A1 | 10/2007 | Bentsen et al. |
| 2007/0239856 A1 | 10/2007 | Abadir |
| 2007/0281704 A1 | 12/2007 | Lin et al. |
| 2007/0300158 A1 | 12/2007 | Kasperkiewicz et al. |
| 2008/0009268 A1 | 1/2008 | Ramer et al. |
| 2008/0052630 A1 | 2/2008 | Rosenbaum et al. |
| 2008/0086379 A1 | 4/2008 | Dion et al. |
| 2008/0097967 A1 | 4/2008 | Milbrandt et al. |
| 2008/0120648 A1 | 5/2008 | Carlson et al. |
| 2008/0162570 A1 | 7/2008 | Kindig et al. |
| 2008/0215645 A1 | 9/2008 | Kindig et al. |
| 2008/0222546 A1 | 9/2008 | Mudd et al. |
| 2008/0222576 A1 | 9/2008 | Hashimoto |
| 2008/0242277 A1 | 10/2008 | Chen et al. |
| 2008/0258986 A1 | 10/2008 | Milbrandt et al. |
| 2008/0261512 A1 | 10/2008 | Milbrandt et al. |
| 2008/0263098 A1 | 10/2008 | Kindig et al. |
| 2008/0305736 A1 | 12/2008 | Milbrandt et al. |
| 2009/0017866 A1 | 1/2009 | White et al. |
| 2009/0019374 A1 | 1/2009 | Logan et al. |
| 2009/0031007 A1 | 1/2009 | Boic et al. |
| 2009/0147975 A1 | 6/2009 | Horbach et al. |
| 2009/0164419 A1 | 6/2009 | Taylor et al. |
| 2010/0010648 A1 | 1/2010 | Bull et al. |
| 2010/0106852 A1 | 4/2010 | Kindig et al. |
| 2010/0121857 A1 | 5/2010 | Elmore et al. |
| 2010/0125507 A1 | 5/2010 | Tarantino et al. |
| 2011/0107381 A1 | 5/2011 | Solnik et al. |
| 2013/0014136 A1 | 1/2013 | Bhatia et al. |
| 2013/0086078 A1 | 4/2013 | Masseshaiah |
| 2013/0218942 A1 | 8/2013 | Willis et al. |
| 2013/0262966 A1 | 10/2013 | Wu et al. |
| 2013/0318080 A1 | 11/2013 | Aravamudan et al. |
| 2014/0006556 A1 | 1/2014 | Shapiro et al. |
| 2014/0177717 A1 | 6/2014 | Li et al. |
| 2014/0258025 A1 | 9/2014 | Bouzid et al. |
| 2014/0258313 A1 | 9/2014 | McCallum |
| 2014/0280213 A1 | 9/2014 | Isquith et al. |
| 2015/0006544 A1 | 1/2015 | Isquith et al. |
| 2016/0335258 A1 | 11/2016 | Kindig et al. |
| 2017/0126770 A1 | 5/2017 | Kindig |

FOREIGN PATENT DOCUMENTS

| | | | |
|---|---|---|---|
| GB | | 2343053 A | 4/2000 |
| KR | 10-2011-0073484 A | | 6/2011 |
| WO | WO 1999/012230 A1 | | 3/1999 |
| WO | WO 2001/035667 A1 | | 5/2001 |
| WO | WO 2004/097803 A2 | | 11/2004 |
| WO | WO 2005/034407 A2 | | 4/2005 |
| WO | WO 2005/076117 A1 | | 8/2005 |
| WO | WO 2006/042309 A1 | | 4/2006 |
| WO | WO 2006/124277 A | | 11/2006 |
| WO | WO 2008/060032 A1 | | 5/2008 |

OTHER PUBLICATIONS

Hacker, S., "MP3: The Devinitive Guide," Mar. 1, 2000, O'Reilly Media, Inc., p. 112, ISBN: 978-1-565-92661-5.

Motorola, "Complexity analysis of the Motorola Turbo Code Interleaver," TSG-RAN Working Group 1 Meeting #3, Eskilstuna, Sweden, Mar. 22-26, 1999, pp. 1-5.

Tell, E. et al., "A hardware architecture for a multi mode block interleaver," Proc. ICCSC [Online], Jul. 2004, Moscow Russia, Retrieved from the Internet: <URL: http://www.da.isy.liu.se/pubs/erite/>, [Retrieved on Aug. 14, 2008], pp. 1-4.

Wikipedia, "Pandora Radio," Oct. 7, 2006, (online), Retrieved from the Internet on: Oct. 12, 2010, <URL: http://en.wikipedia.org/w/index.php?title=Pandora_Radio&oldid=80072157>, 3 pages.

Pandora, "Frequently Asked Questions", Aug. 30, 2006, Pandora Media Inc., Retrieved from the Internet: <URL: web.archive.org/web/20060830160154/http://blog.pandora.com/faq/>, pp. 1-14.

U.S. Appl. No. 11/774,481, Office Action dated Apr. 29, 2010.

PCT/US2007/072954, International Search Report dated Feb. 1, 2008.

PCT/US2007/072954, Written Opinion dated Feb. 1, 2008.

PCT/US2007/072954, International Preliminary Report on Patentability dated Jan. 6, 2009.

Office Action for Canadian Application No. 2,667,573 dated Jun. 13, 2014, 3 pages.

Office Action for Canadian Application No. 2,667,573, dated Jul. 8, 2015, 4 pages.

Office Action for Canadian Application No. 2,667,573 dated Jun. 14, 2016, 2 pages.

Supplementary European Search Report for European Application No. 07868561.7, dated Jan. 2, 2012, 7 pages.

PCT/US2007/082373, International Search Report dated Sep. 22, 2008.

PCT/US2007/082373, Written Opinion dated Sep. 22, 2008.

PCT/US2007/082373, International Preliminary Report on Patentability dated Apr. 28, 2009.

U.S. Appl. No. 12/582,675, Office Action dated Nov. 23, 2012, 13 pages.

U.S. Appl. No. 12/582,675, Office Action dated Oct. 3, 2014, 11 pages.

Office Action for U.S. Appl. No. 12/582,675, dated Mar. 25, 2016, 16 pages.

Office Action for U.S. Appl. No. 12/582,675, dated Aug. 24, 2017, 17 pages.

Office Action for U.S. Appl. No. 12/582,675, dated Jan. 18, 2017, 15 pages.

Office Action for U.S. Appl. No. 12/582,675, dated Jul. 17, 2015, 13 pages.

Office Action for U.S. Appl. No. 12/582,675, dated Aug. 9, 2013, 11 pages.

U.S. Appl. No. 13/106,754, Office Action dated Jul. 3, 2012.

Office Action for U.S. Appl. No. 14/709,318, dated Jul. 7, 2017, 19 pages.

U.S. Appl. No. 12/011,193, Office Action dated Nov. 10, 2010.

U.S. Appl. No. 12/011,193, Office Action dated Jul. 22, 2011.

U.S. Appl. No. 12/011,193, Office Action dated Nov. 16, 2011.

(56) References Cited

OTHER PUBLICATIONS

U.S. Appl. No. 12/011,193, Office Action dated Oct. 2, 2013.
U.S. Appl. No. 12/011,193, Office Action dated Aug. 4, 2014.
Canadian Office Action in Application No. CA 2,680,281 dated Jan. 23, 2015.
Office Action for Canadian Application 2,680,281 dated Feb. 8, 2017, 3 pages.
European Office Action in Application No. EP 08754882.2, dated Feb. 11, 2010.
U.S. Appl. No. 12/045,666, Office Action dated Oct. 6, 2011.
U.S. Appl. No. 12/045,666, Office Action dated Jun. 4, 2012.
U.S. Appl. No. 12/045,666, Office Action dated Jul. 19, 2013.
U.S. Appl. No. 12/045,666, Office Action dated May 21, 2014.
PCT/US2008/056451, International Search Report dated Jun. 24, 2008.
PCT/US2008/056451, Written Opinion dated Jun. 24, 2008.
PCT/US2008/056451, International Preliminary Report on Patentability dated Sep. 8, 2009.
U.S. Appl. No. 12/032,637, Office Action dated Mar. 21, 2011.
PCT/US2008/054184, International Search Report & Written Opinion dated Jul. 2, 2008.
PCT/US2008/054184, International Preliminary Report on Patentability dated Aug. 19, 2009.
U.S. Appl. No. 12/039,692, Office Action dated Nov. 24, 2010.
PCT/US2008/055390, International Search Report dated Aug. 22, 2008.
PCT/US2008/055390, Written Opinion dated Aug. 22, 2008.
PCT/US2008/055390, International Preliminary Report on Patentability dated Sep. 1, 2009.
PCT/US2008/055197, International Search Report dated Aug. 29, 2008.
Written Opinion for International Application No. PCT/US2008/055197, dated Aug. 29, 2008, 5 pages.
PCT/US2008/055197, International Preliminary Report on Patentability dated Sep. 1, 2009.
Office Action for Canadian Application No. 2,680,797, dated Jan. 26, 2015, 5 pages.
Office Action for Canadian Application No. 2,680,797, dated Jul. 28, 2016, 4 pages.
U.S. Appl. No. 12/048,128, Office Action dated Dec. 23, 2011.
U.S. Appl. No. 12/048,128, Office Action dated Sep. 13, 2012.
U.S. Appl. No. 12/048,128, Office Action dated Mar. 26, 2015.
Office Action for U.S. Appl. No. 12/048,128, dated Feb. 4, 2016, 23 pages.
PCT/US2008/056899, International Search Report dated Mar. 27, 2009.
PCT/US2008/056899, Written Opinion dated Mar. 27, 2009.
PCT/US2008/056899, International Preliminary Report on Patentability dated Sep. 15, 2009.
European Office Action in Application No. EP 07869177.1, dated Mar. 13, 2015.
Canadian Office Action in Application No. CA 2,672,437 dated Oct. 14, 2014.
U.S. Appl. No. 11/637,300, Office Action dated Sep. 30, 2008.
U.S. Appl. No. 11/955,299, Office Action dated Oct. 18, 2011.
U.S. Appl. No. 11/955,299, Office Action dated Feb. 22, 2012.
PCT/US2007/087305, International Search Report and Written Opinion dated Jul. 3, 2008.
PCT/US2007/087305, International Preliminary Report on Patentability dated Jun. 16, 2009.
U.S. Appl. No. 12/049,113, Office Action dated Jan. 25, 2011.
PCT/US2008/057110, International Search Report and Written Opinion dated Aug. 5, 2008.
PCT/US2008/057110, International Preliminary Report on Patentability dated Sep. 15, 2009.
Office Action for U.S. Appl. No. 14/216,877, dated Sep. 30, 2016, 21 pages.
Office Action for U.S. Appl. No. 13/838,244, dated Feb. 9, 2015, 15 pages.
Office Action for U.S. Appl. No. 13/838,244, dated Apr. 22, 2016, 33 pages.
Office Action for U.S. Appl. No. 13/838,244, dated Nov. 30, 2016, 24 pages.
Office Action for U.S. Appl. No. 13/838,244, dated Sep. 29, 2015, 28 pages.
PCT/US2014/030837, International Search Report dated Jul. 24, 2014.
U.S. Appl. No. 11/923,554, Office Action dated Dec. 23, 2009.
U.S. Appl. No. 11/923,554, Office Action dated Nov. 12, 2010.
U.S. Appl. No. 11/923,573, Office Action dated Jun. 22, 2011.
U.S. Appl. No. 11/923,573, Office Action dated Oct. 14, 2010.
Office Action for U.S. Appl. No. 14/709,318, dated Feb. 14, 2018, 19 pages.
Office Action for Canadian Application 2,680,281 dated Feb. 8, 2018, 2 pages.

* cited by examiner

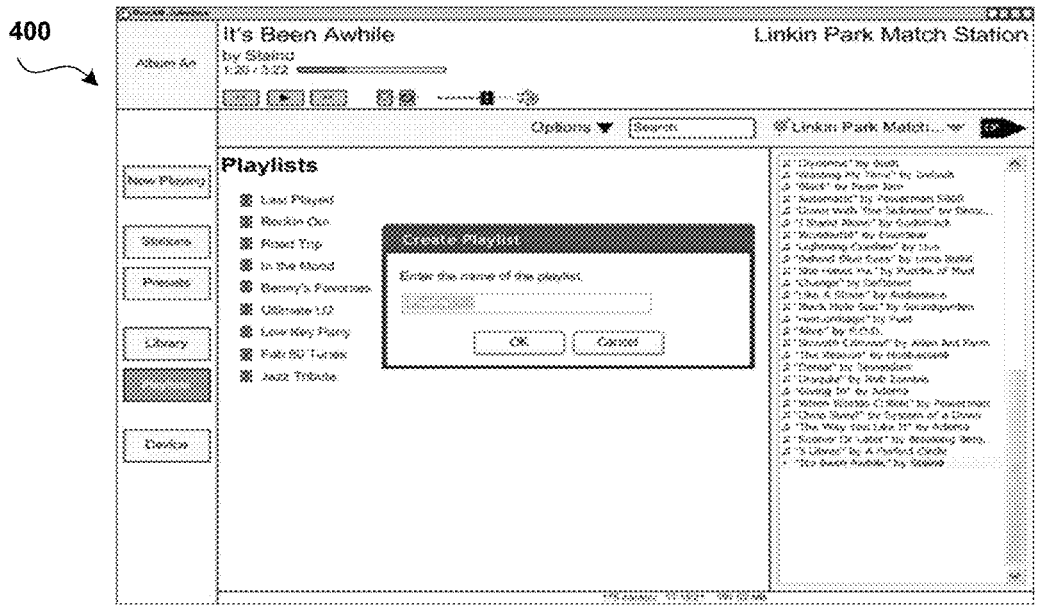
FIGURE 4
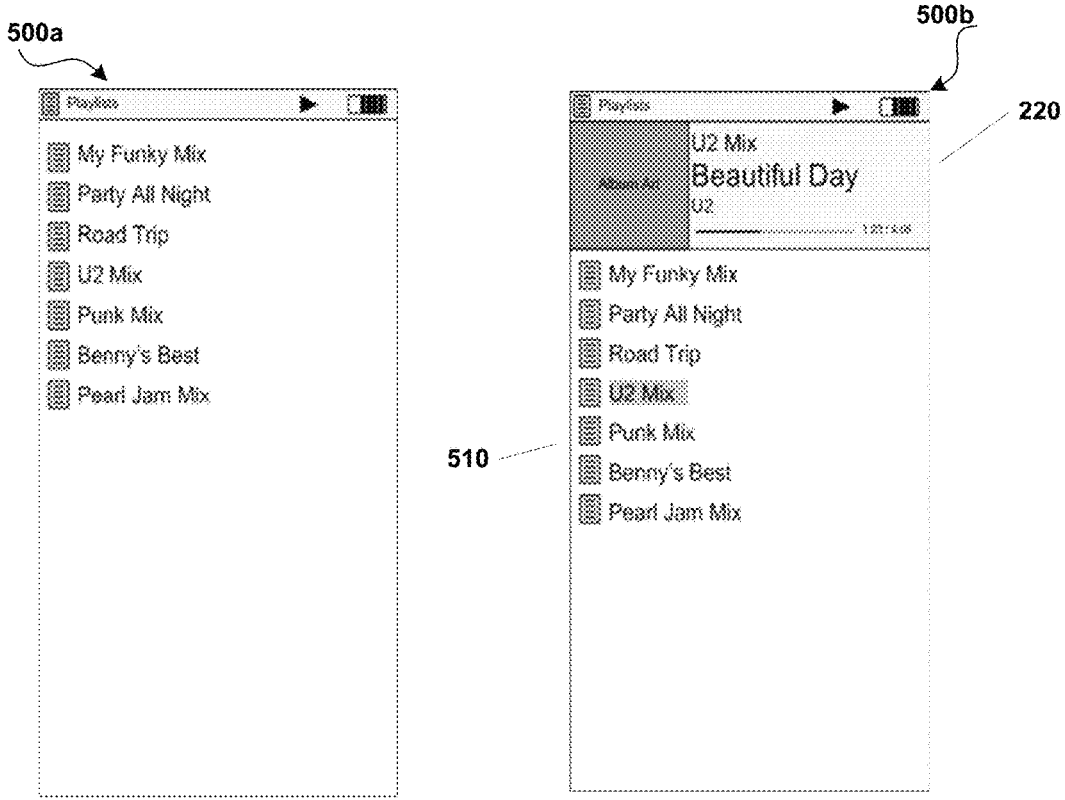
FIGURE 5A
FIGURE 5B

Screenshot of Jukebox Playlist Main Screen

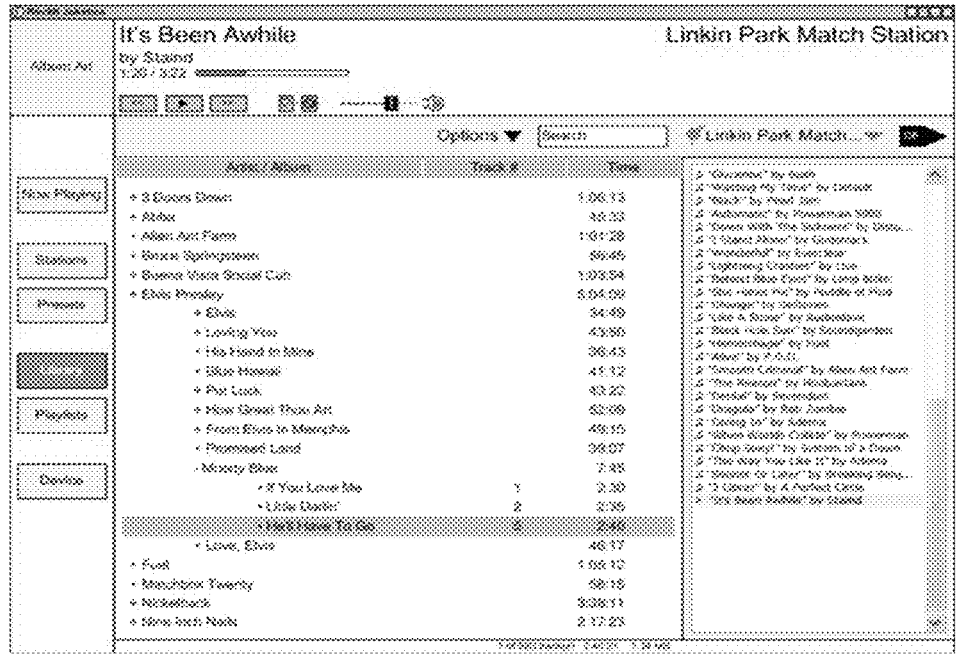
Library Main Screen for Jukebox Application
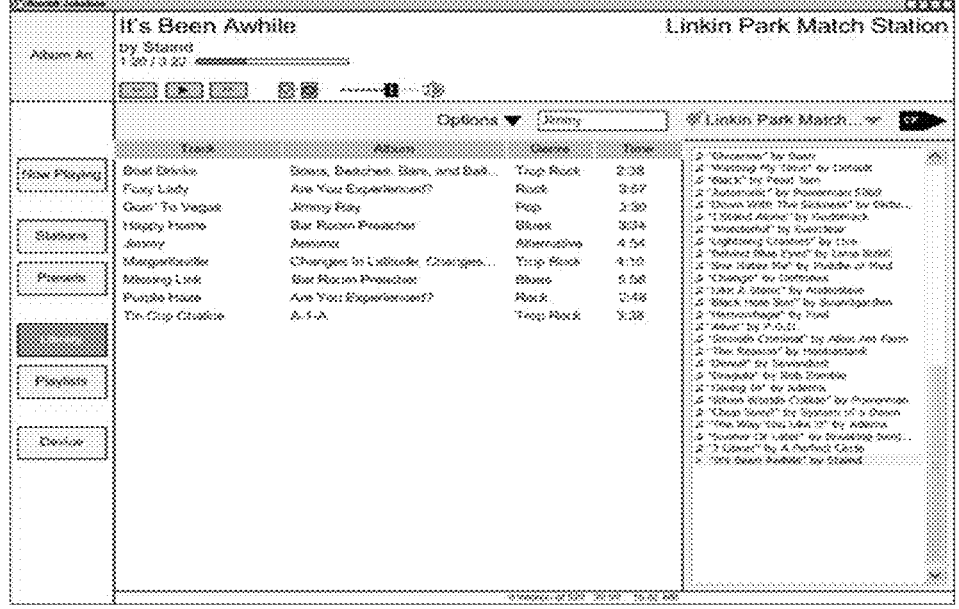
Library Search Screen for Jukebox Application
FIGURE 7D

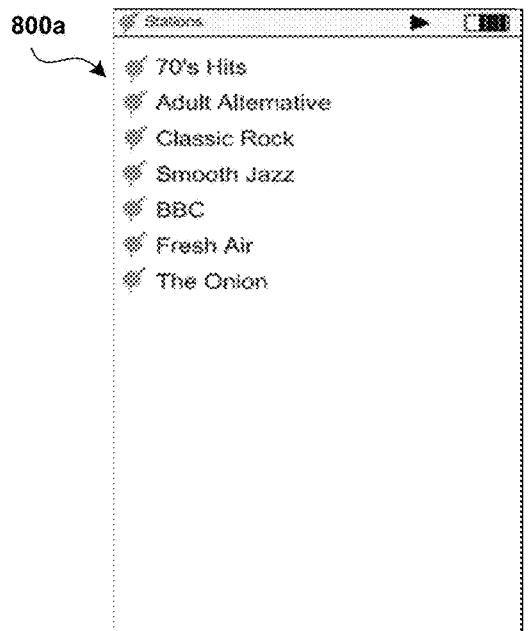
FIGURE 8A
FIGURE 8B
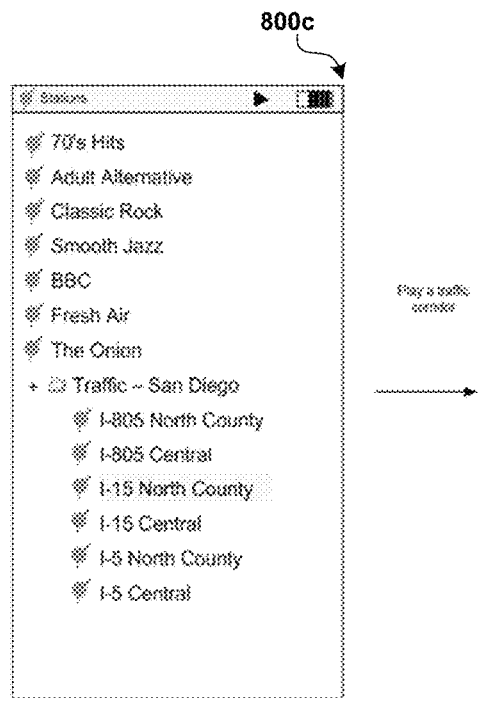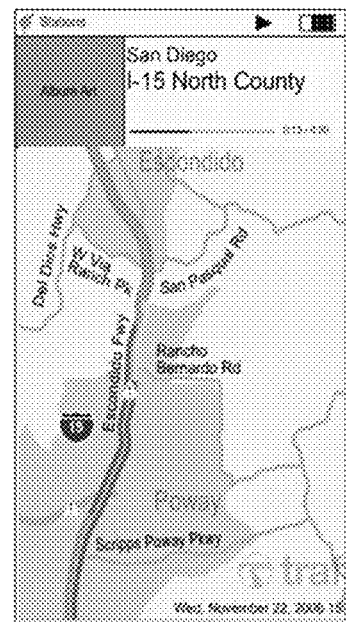
FIGURE 8C

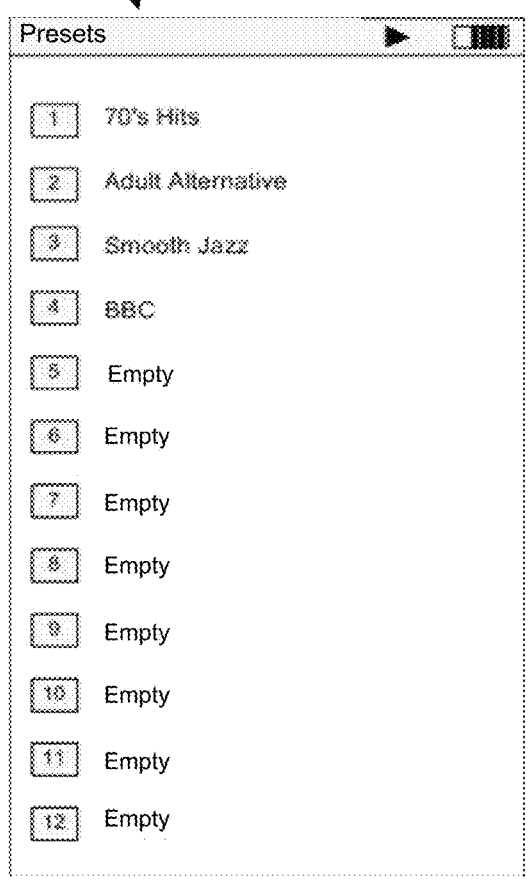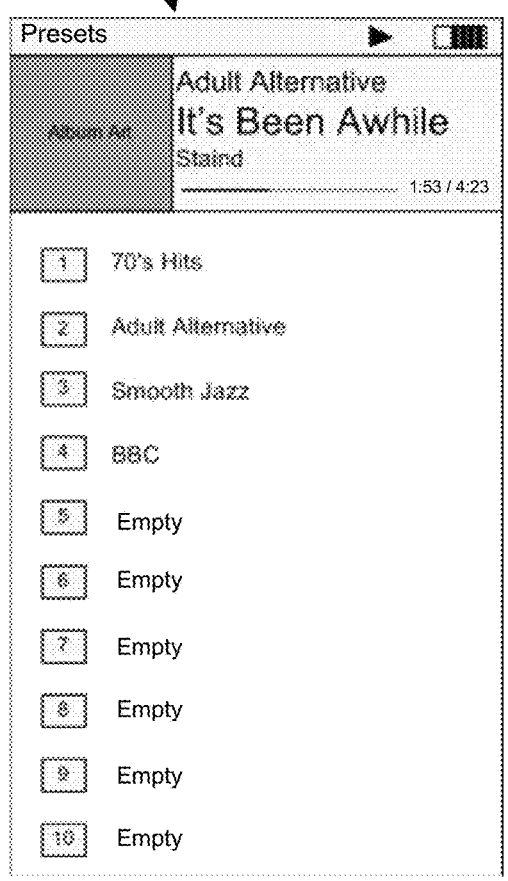
FIGURE 10A      FIGURE 10B

4700

4800

SYSTEM AND METHOD FOR PERSONALIZING PLAYBACK CONTENT THROUGH INTERACTION WITH A PLAYBACK DEVICE

CROSS-REFERENCE TO RELATED APPLICATIONS

This application is a continuation of U.S. application Ser. No. 12/045,666, entitled SYSTEM AND METHOD FOR PERSONALIZING PLAYBACK CONTENT THROUGH INTERACTION WITH A PLAYBACK DEVICE, filed Mar. 10, 2008, which application claims priority under 35 U.S.C. § 119(e) to U.S. Provisional Patent Application Ser. No. 60/893,849, entitled DEVICES AND METHODS FOR DISTRIBUTING DIGITAL CONTENT INCLUDING WEB APPLICATIONS, filed Mar. 8, 2007, and to U.S. Provisional Patent Application Ser. No. 60/893,840, entitled DEVICES AND METHODS FOR DISTRIBUTING DIGITAL CONTENT INCLUDING JUKEBOX APPLICATIONS, filed Mar. 8, 2007. The content of each of these applications is hereby incorporated by reference entirety for all purposes.

This application is related to U.S. patent application Ser. No. 11/955,299, entitled METHOD AND APPARATUS FOR INTERACTIVE DISTRIBUTION OF DIGITAL CONTENT, filed on Dec. 12, 2007, to U.S. Utility patent application Ser. No. 11/923,573, entitled METHODS AND SYSTEMS FOR PERSONALIZED RENDERING OF DIGITAL MEDIA CONTENT, filed on Oct. 24, 2007, to U.S. Utility patent application Ser. No. 11/923,554, entitled SYSTEMS AND DEVICES FOR PERSONALIZED RENDERING OF DIGITAL MEDIA CONTENT, filed on Oct. 24, 2007, to U.S. Provisional Patent Application Ser. No. 60/894,879, entitled SYSTEMS AND METHODS FOR PORTABLE, PERSONALIZED RADIO, filed on Mar. 14, 2007, to U.S. Provisional Patent Application Ser. No. 60/886,283, entitled DEVICES AND METHODS FOR DISTRIBUTING DIGITAL CONTENT, filed on Jan. 23, 2007, to U.S. Utility patent application Ser. No. 11/637,300, entitled METHOD AND APPARATUS FOR INTERACTIVE DISTRIBUTION OF DIGITAL CONTENT, filed Dec. 12, 2006, and to U.S. Provisional Patent Application Ser. No. 60/862,736, entitled METHOD AND DEVICE FOR PLAYBACK OF LOCALLY STORED DIGITAL MEDIA CONTENT, filed Oct. 24, 2006. The contents of each or these applications is hereby incorporated by reference herein in its entirety for all purposes.

FIELD OF THE INVENTION

The present invention relates generally to distribution of digital content. More particularly but not exclusively, the invention relates to systems and methods for distributing digital media content, including music, text, graphics, still images and video, via standalone devices as well as via application programs or web browsers.

BACKGROUND

A range of digital content is currently available through various media sources. Provided content may include text, music or other audible content, graphics, still images such as photos, video or other forms of content. Furthermore, such content is currently distributed in a variety of ways including, via the Internet, wireless networks, as well as via cable, terrestrial and satellite broadcasts. Many current content delivery devices such as portable media players and media-enabled phones are able to receive content wirelessly or load content from personal computers via wired or wireless connections. However, currently provided content delivery services and devices typically offer content based on preset formats such as predefined radio stations or playlists. Current content delivery systems offer few options to tailor the delivery experience to a specific user's preferences, and provide limited means for user control, selection and presentation of delivered content.

Furthermore, traditional broadcast mediums such as television, radio and even satellite radio only offer minimal opportunities for customization and interactivity of content delivery or content delivery devices. While the number of channels may be increasing in these mediums, they typically cannot accommodate even simple customizations such as "Classic Rock" with extra airplay by some artists and nothing by other artists, or combinations of different music formats. In addition, existing media players and other devices capable of receiving media transmissions can be frustrating to use and often provide little in the way of efficient and customizable user interfaces and device controls capable of providing content and additional information related to the content. Consequently, there exists a need for systems and methods for delivering digital content that provide for more efficient and user specific content selection and delivery as well as more user specific control of content displays, interfaces and device controls.

SUMMARY

In one or more embodiments aspects of the present invention are directed to systems and methods to customize delivery of content to users based on a wide variety of criteria. Among other features, embodiments of the present invention may include user customizable content delivery including user customizable selection of tracks and/or artists, user tailored device control and user interfaces, customizable web and GUI interfaces and controls and customized radio station content selection and presentation. Devices and applications for facilitating embodiments of the present invention include handheld and mobile devices, standalone application programs suitable for execution on a variety of computer hardware and operating systems, as well as web based applications.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein:

FIG. 4 is an illustration of one embodiment of a user input menu screen in accordance with aspects of the present invention.

FIGS. 5A-5C are illustrations of embodiments of Playlist display screens in accordance with aspects of the present invention.

FIGS. 7A-7D are illustrations of embodiments of Library screens in accordance with aspects of the present invention.

FIGS. 8A-8E are illustrations of embodiments of Radio Station screens in accordance with aspects of the present invention.

FIGS. 10A-10B are illustrations of embodiments of Presets screens in accordance with aspects of the present invention.

DETAILED DESCRIPTION

Figure 1A:
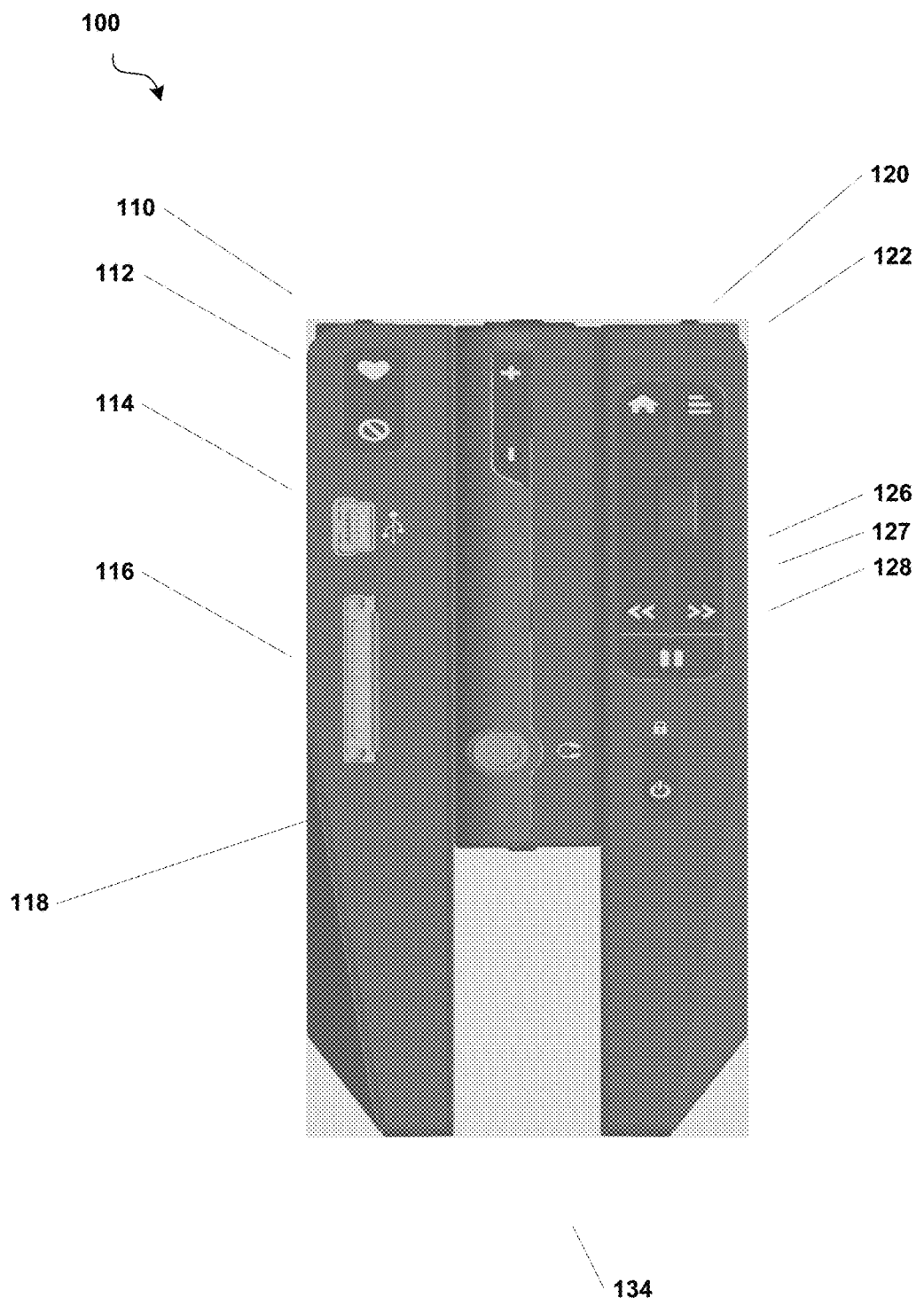
FIG. 1A is an illustration of one embodiment of device configurations, controls, features and displays in accordance with aspects of the present invention.

This application is related to U.S. Utility patent application Ser. No. 11/955,299, entitled METHOD AND APPARATUS FOR INTERACTIVE DISTRIBUTION OF DIGITAL CONTENT, to U.S. Utility patent application Ser. No. 11/923,573, entitled METHODS AND SYSTEMS FOR PERSONALIZED RENDERING OF DIGITAL MEDIA CONTENT, to U.S. Utility patent application Ser. No. 11/923,554, entitled SYSTEMS AND DEVICES FOR PERSONALIZED RENDERING OF DIGITAL MEDIA CONTENT, to U.S. Utility patent application Ser. No. 11/774,481, entitled INPUT INTERFACE INCLUDING PUSH SENSITIVE MECHANICAL SWITCH IN COMBINATION WITH MECHANICAL TOUCH SENSOR, to U.S. Provisional Patent Application Ser. No. 60/886,283, entitled DEVICES AND METHODS FOR DISTRIBUTING DIGITAL CONTENT, to U.S. Provisional Patent Application Ser. No. 60/894,879, entitled SYSTEM AND METHOD FOR PORTABLE, PERSONALIZED RADIO, to U.S. Utility patent application Ser. No. 11/637,300, entitled METHOD AND APPARATUS FOR INTERACTIVE DISTRIBUTION OF DIGITAL CONTENT, to U.S. Provisional Patent Application Ser. No. 60/886,283, entitled DEVICES AND METHODS FOR DISTRIBUTING DIGITAL CONTENT, to U.S. Provisional Application Ser. No. 60/862,736, entitled METHOD AND DEVICE FOR PLAYBACK OF LOCALLY STORED DIGITAL MEDIA CONTENT, and to U.S. Provisional Patent Application Ser. No. 60/806,716, entitled INPUT DEVICE INCLUDING PUSH-SENSITIVE MECHANICAL SWITCH IN COMBINATION WITH CAPACITIVE TOUCH SENSOR, filed Jul. 6, 2006. The contents of each of these applications are hereby incorporated by reference herein in its entirety for all purposes. These related applications are also designated collectively herein as the "related applications" for purposes of brevity.

In one or more embodiments, the present invention is directed to systems and methods to customize delivery of content to users based an a wide variety of criteria. Among other features, embodiments of the present invention may include user customizable content delivery including user customizable selection of tracks and/or artists, user tailored device control and user interfaces, customizable web and GUI interfaces and controls and customized station selection and presentation. Devices and applications for facilitating embodiments of the present invention include standalone handheld and mobile devices, standalone application programs suitable for execution on a variety of computer hardware and operating systems, as well as web applications.

The apparatus, systems and methods disclosed herein are directed generally to distribution of digital content, including audio content such as music as well text, graphics, photos, other still images and/or video. For purposes of explanation, the following description is provided with reference to specific nomenclature and implementation details; however, it will be apparent to one skilled in the art that specific details described are not required in order to practice the invention, and that other embodiments in keeping within the spirit and scope of the present invention beyond those specifically described are possible and fully contemplated herein.

Some embodiments the present invention may be implemented on a portable handheld or mobile device configured for content reception, storage, analysis, processing, selection and playback. Such a device, hereinafter denoted for convenience as a "personal device," may be implemented in a variety of sizes and form factors and may comprise hardware, software, firmware, user actuated interface controls, displays, interface connectors, and/or other software, mechanical, optical, electrical and electronic components and systems. In alternate embodiments, the features and functions described below with reference to the personal device may also be implemented in different formats such as in a component or home version, a web based version operable on an Internet web browser, or as a standalone application operable on a personal computer or handheld device. For example, in alternate embodiments the features and functions described below with respect to personal device illustrated in FIG. 1 may be implemented on a standalone application, also noted herein as a "jukebox," or on a web browser, also denoted herein as a "web player," the associated input, output and control functionality implemented on the computer display and/or in conjunction with computer controls such as a computer keyboard and/or a pointing device such as a computer mouse. Accordingly, the teachings that follow with respect to personal device 100 are equally applicable to analogous standalone jukebox and/or web based applications.

System Configurations

In typical embodiments, media profiles associated with personal device, web player or standalone applications are used to manage and store information associated with the user interface functionality as described herein. Media profiles may be stored on and/or managed by the device or application as well as on a remote system configured to provide user customized content. In this model, the user interacts with one or more personal media profiles, also denoted herein as a user profile or station profile. The media profile defines favorite media channels, favorite categories or attributes of content within or across channels, custom channel information and customizations to channels.

In typical embodiments the media profile acts to select or filter content on behalf of the user. Thus the user need only express their preferences to access content that is tailored to their tastes. This requires much less effort than acquiring, managing and distributing a personal content library across multiple devices. The user can interact with user interfaces to customize content delivery based on a variety of criteria, including selection and profiling of favorites tracks and artists, favorites types of content, favorite stations or based on other criteria as is described further herein. The customization information may be stored in one or more media profiles as described above, either on the device or host computer of the web player or standalone application, or on a remote system as is further described below.

Figure 51:
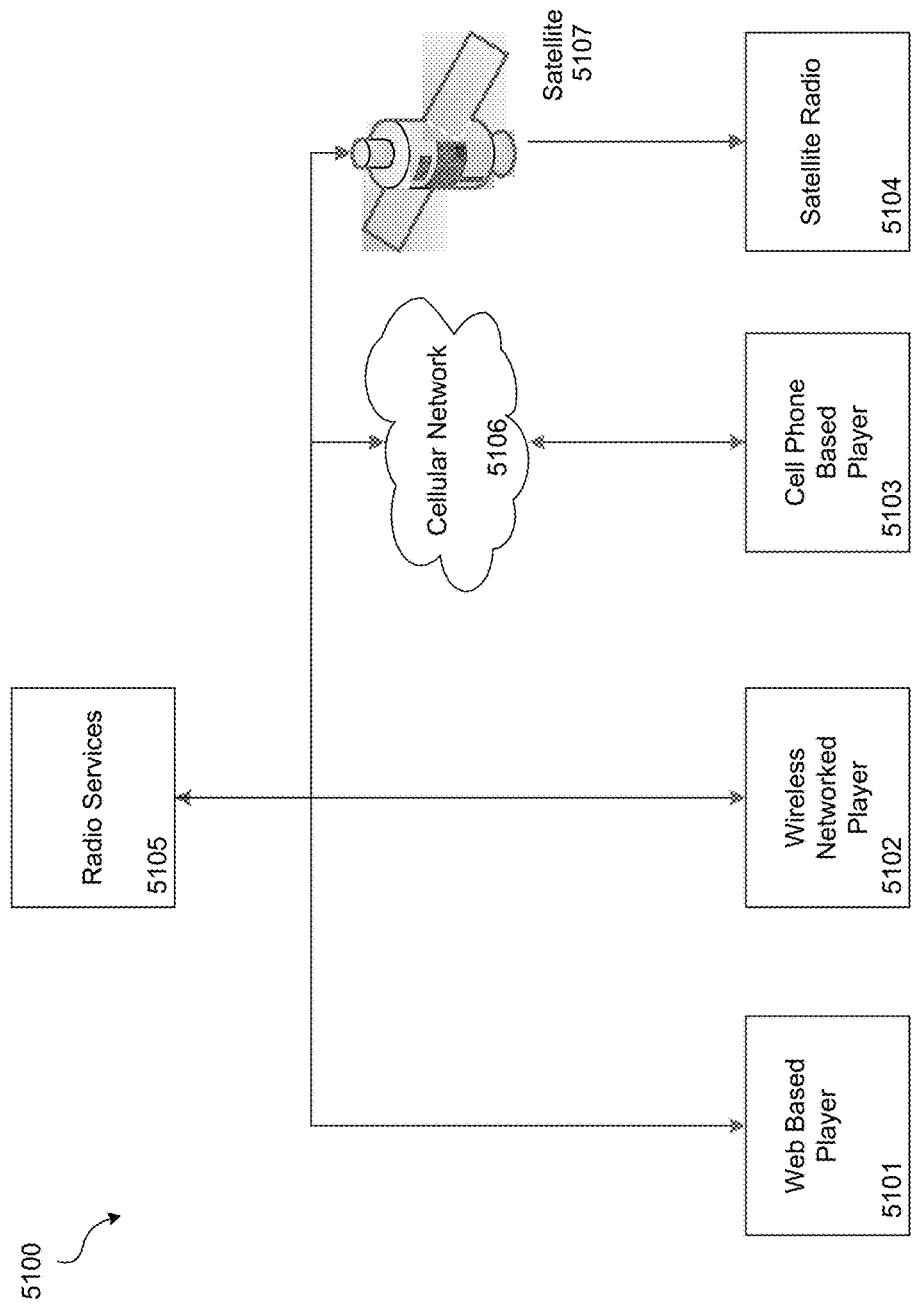
FIG. 51 is an illustration of an embodiment of a system for providing user personalized content in accordance with aspects of the present invention.

Referring now to FIG. 51, there is shown a system 5100 on which personalized content rendering by a playback device may be implemented in accordance aspects of the present invention. As shown in FIG. 51, the system 5100 includes a variety of clients which access, over a variety of networks, services implementing a personalized radio service for providing user customized content. The radio service is also denoted herein as a "Slacker Service" or just "Slacker," based on the name of one such service provider. A web based player 5101 is a media player that has a persistent connection to the Internet and accesses radio services 5105 via a web-services interface. The web based player may be a web browser embodiment (web player) or a standalone application (jukebox), such as a web client application. A wireless networked player 5102 is a media player that connects periodically or opportunistically to wireless networks, for example, the IEEE 802.11 family of wireless networks. Player 5102 is a client that synchronizes content and user customization profiles while connected, and need not be connected while rendering personalized radio. This is especially suitable for hand-held portable media players. A cellular phone based player 5103 connects to radio services 5105 over a cellular network 5106. Because cellular networks may be very busy during peak times but have excess capacity during off-peak hours, the cell phone based player 5103 can synchronize content and/or personalization profiles during off peak hours, resulting in a more economical use of the network. A satellite radio 5104 can utilize the content sequencing logic to de-couple the rendering of audio for the end-user from the reception of content from a satellite 5107. This allows the radio to build a cache of content during periods of good reception, and to playback cached content with no audible drop-outs due to loss of signal in non-real time. Any of these implementations 5101-5104, as well as others, may be embodied as the personal device 100 further described below.

The caching of content on the device means radio can support more channels than the bandwidth of the satellite connection could support if broadcasting in real-time. If the satellite radio 5104 additionally has an uplink to radio services 5105 via an Internet, wireless, or cellular network connection, personalized profile changes on the device can be synchronized back to the radio services 105 and ultimately to other clients. Otherwise, the satellite radio 5104 can operate on a non-synchronized local user profile, or can receive a user profile edited on other clients and transmitted across the satellite link.

Figure 52:
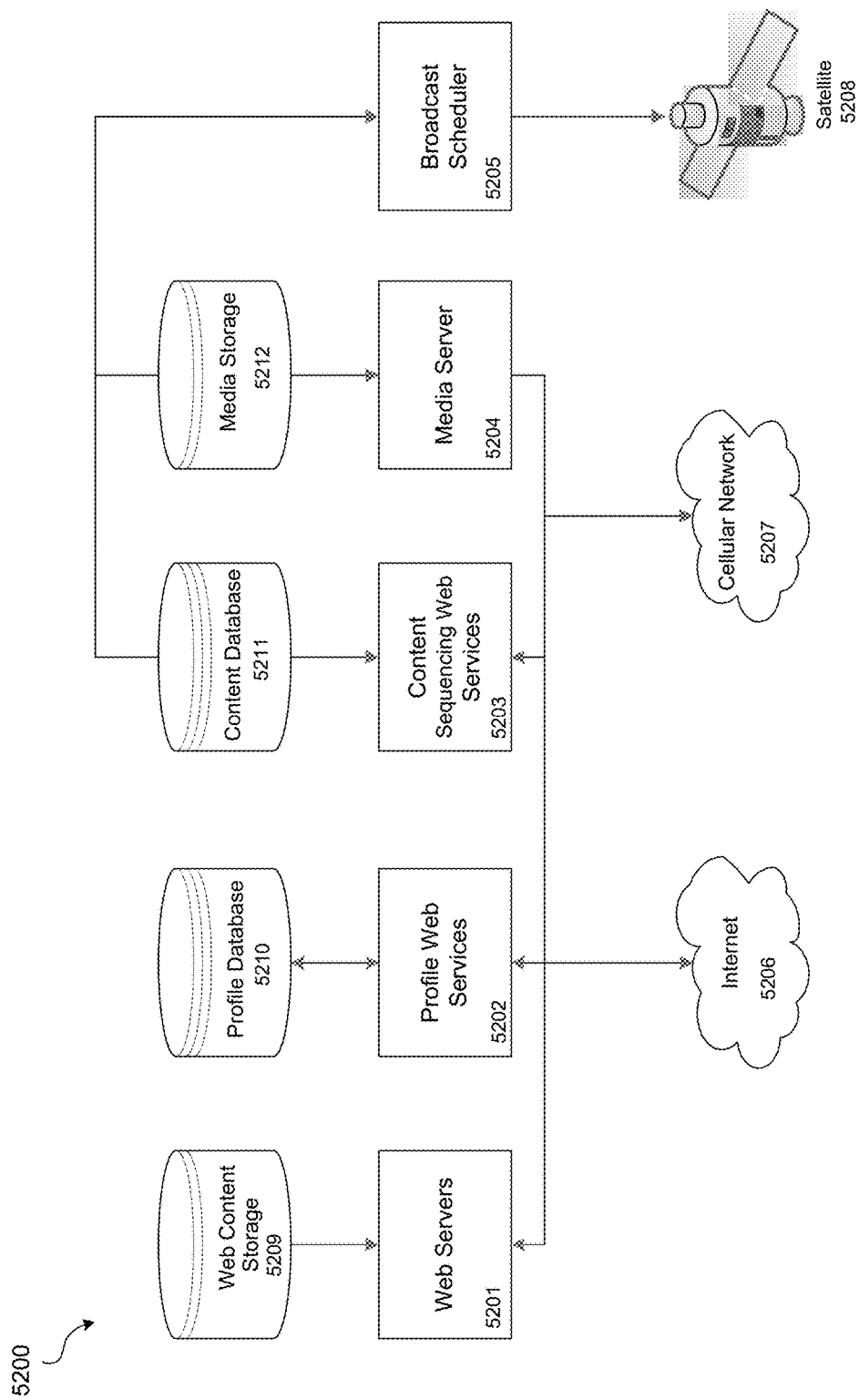
FIG. 52 is an illustration of an embodiment of a system for providing radio services in accordance with aspects of the present invention.

Referring now to FIG. 52, system 5200 comprising one embodiment of radio services 5105 is detailed. Components include web servers 5201 and web content storage 5209 to serve HTML, Javascript, Images, Macromedia Flash and/or other objects utilized by web browser based clients. Profile web services 5202 and a profile database 5210 store user profile information including station customizations, content preferences, and history of recent end-user playback and/or other events. Content sequencing web services 5203 support content refresh for clients that cache content, as well as 'next track' requests for thin clients such as browser based players. The content database 5211 may be used to catalog the available content. Media servers 5204 and media storage 5212 may be used to serve digital media files, such as are described in the related applications, to clients. A broadcast scheduler 5205 decides which tracks should be sent across the satellite link to satellite 5208 for broadcast to satellite radios 5104. Collectively, the web services may be made available across the Internet 5206 or other networks, such as connected cellular networks 5207.

Figure 53:
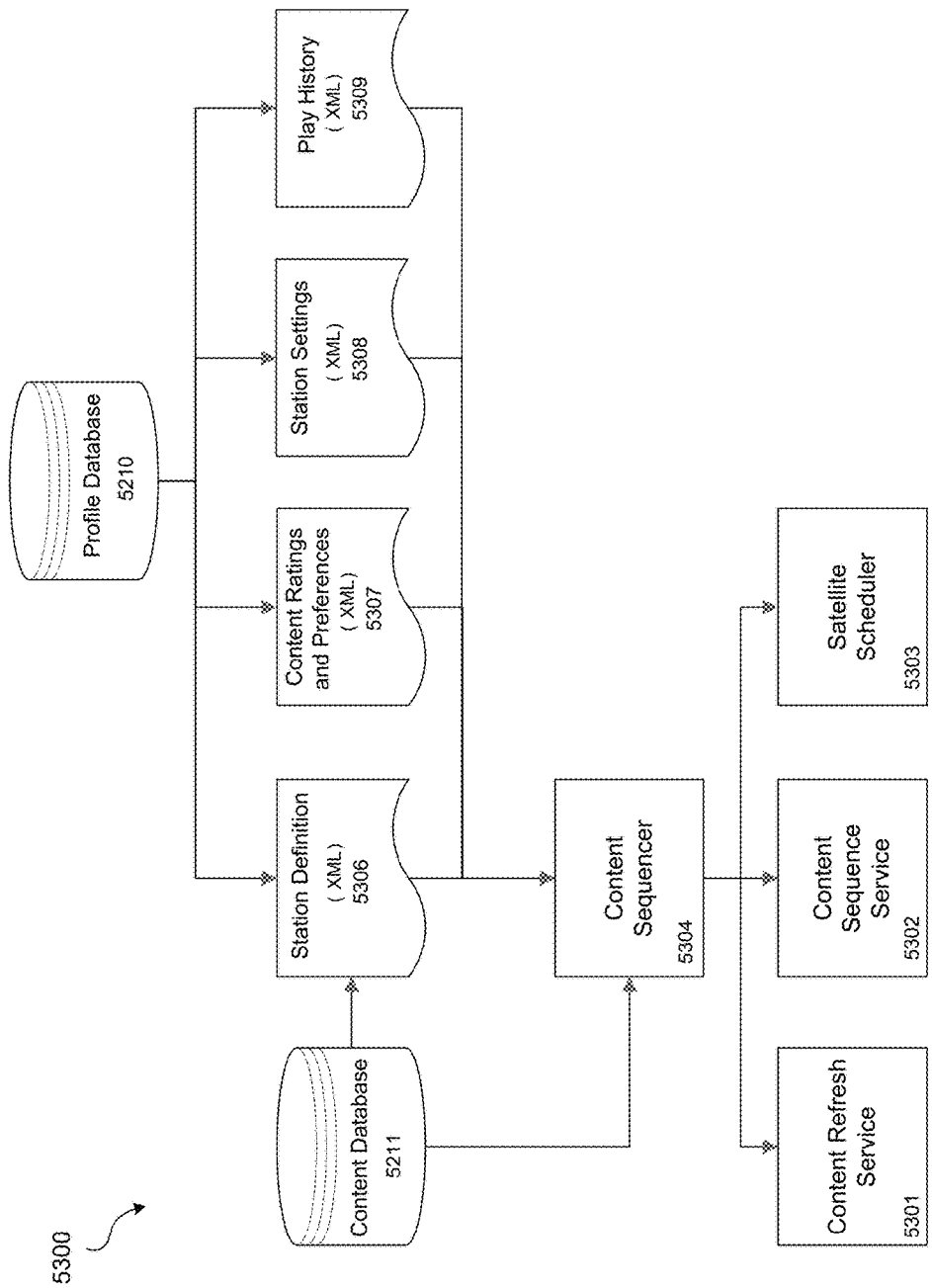
FIG. 53 is an illustration of an embodiment of a subsystem of the radio services illustrated in FIG. 52.

Referring now to FIG. 53, on embodiment of sub-systems 5300 of radio services 5105 related to content sequencing are described. At the core of this system is one or more content sequencers 5304. Content database 5211 and profile database 5210 provide the data used in content sequence 5304. The content database 5211 stores a catalog of available radio audio tracks and may store the station definitions 5306 of pre-programmed radio stations. A profile database 5210 stores user profile information such as content ratings and preferences 5307, station settings 5308 and play history 5309. In an exemplary embodiment, this data is expressed as one or more XML documents or trees (nodes).

The profile database 5210 may store station definitions 5306 where the station definition is custom-made by the user as part of the user profile. Content sequencer 5304 utilizes the content database 5211 in conjunction with the station definition 5306, content ratings preferences 5307, and station settings 5308 to create and maintain a sequence of radio tracks for a particular personalized radio station. The content sequencer 5304 may be used by more specialized components to deliver various services to the clients. A content refresh service 5301 may utilize the content sequencer 5304 to optimize the choice of tracks to download to clients. A primary specialization in one embodiment is that the content refresh service 5301 typically does not choose tracks that are already in the client cache.

Content sequence service 5302 handles "thin" clients such as web browser based players and standalone jukebox applications that need not have their own content sequencer 5304. These clients simply request the radio track for playback and then stream the indicated track. When the track finishes, the client requests the subsequent track to play, and so on.

Satellite scheduler 5303 multiplexes the output of content sequences 5304 for the stations that are broadcast on the satellite link. The satellite scheduler 5303 specializes the content sequencer 5304 to optimize the utilization of the satellite link: content that is most likely to be played by the players and least likely to already be in the cache is prioritized.

Figure 54:
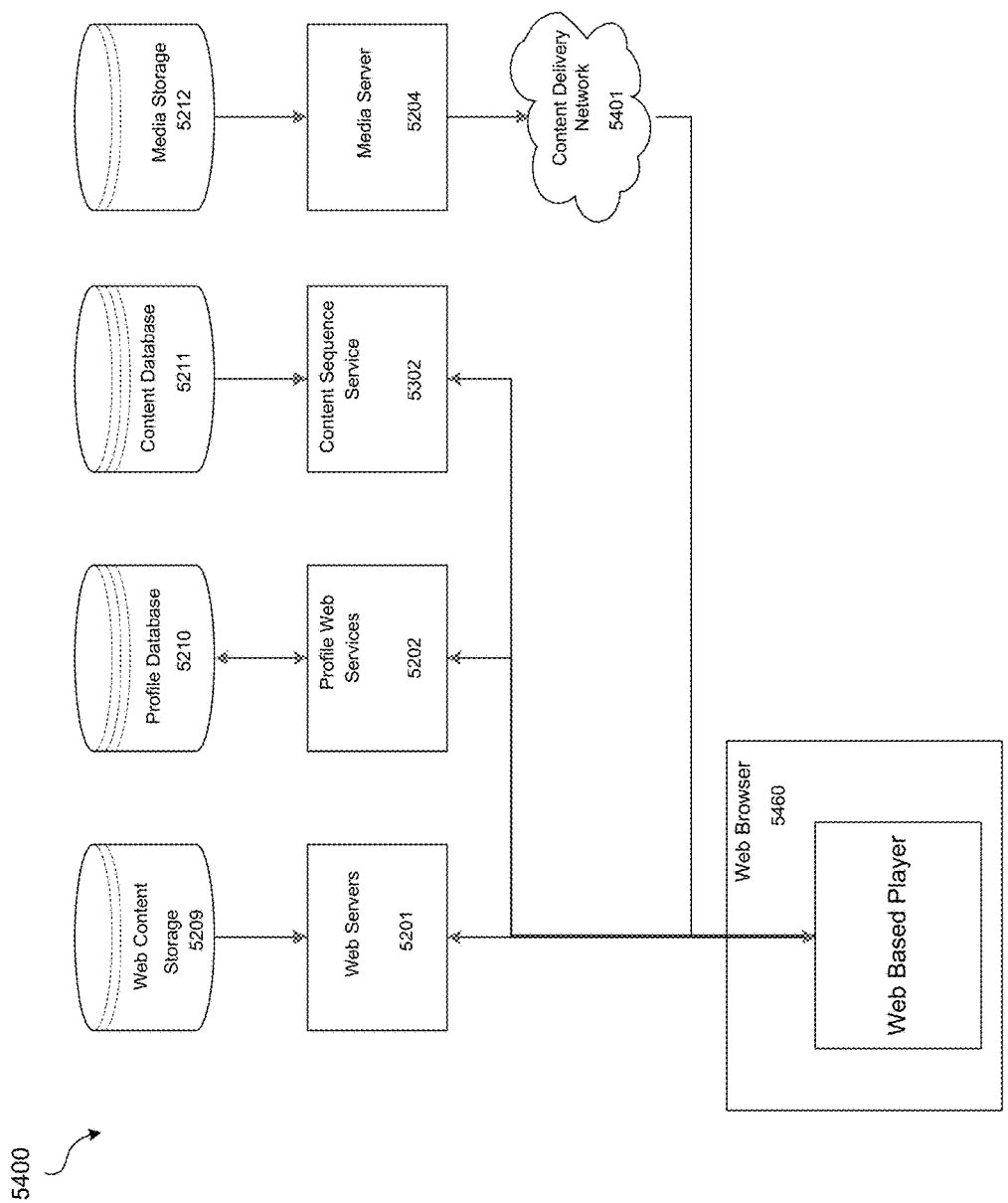
FIG. 54 is an illustration of an embodiment of a web-based personalized radio client in accordance with aspects of the present invention.

Referring now to FIG. 54, the configuration of one embodiment of a web-based personalized radio client system 5400 in a manner consistent with the present invention is described. As shown in FIG. 4, a web based player 5101 may be loaded into a user's web browser 5460 in one embodiment. Web player 5101 may alternately comprise a standalone web based application. The web servers 5201 load a combination of a Javascript programming, Flash objects, HTML, and similar browser content to implement a media player in the browser or standalone application. On Microsoft operating systems, often an Active X control may be employed to drive Windows Media Player or similar functionality within the browser.

In some embodiments, the web based player functionality may be embedded in a software client or hardware devices such as consumer electronics components for a home stereo or entertainment system. However, this configuration, the web based play 5101 is presumed to have a continuous, persistent network connection.

The web based player 5101 interacts directly with the profile web services 5102 to store user preferences in one or more user profiles as they are indicated by the end user through the user interface of the player. The web based player 5101 interacts directly with the content sequence service 5302 to get the next track to play in response to various events triggered by the user interface or the underlying media player for example a user initiated request to skip the current track or the a player report that the current track has finished. The web based player 5101, especially in a web browser based incarnation, provides a convenient platform for the user to create and customize radio stations via the player user interface and generally manage preferences as is described elsewhere herein. The personal computer based web browser may have a large display, a keyboard, and a pointing device (e.g. mouse) to facilitate the management of personalized radio stations.

Figure 55:
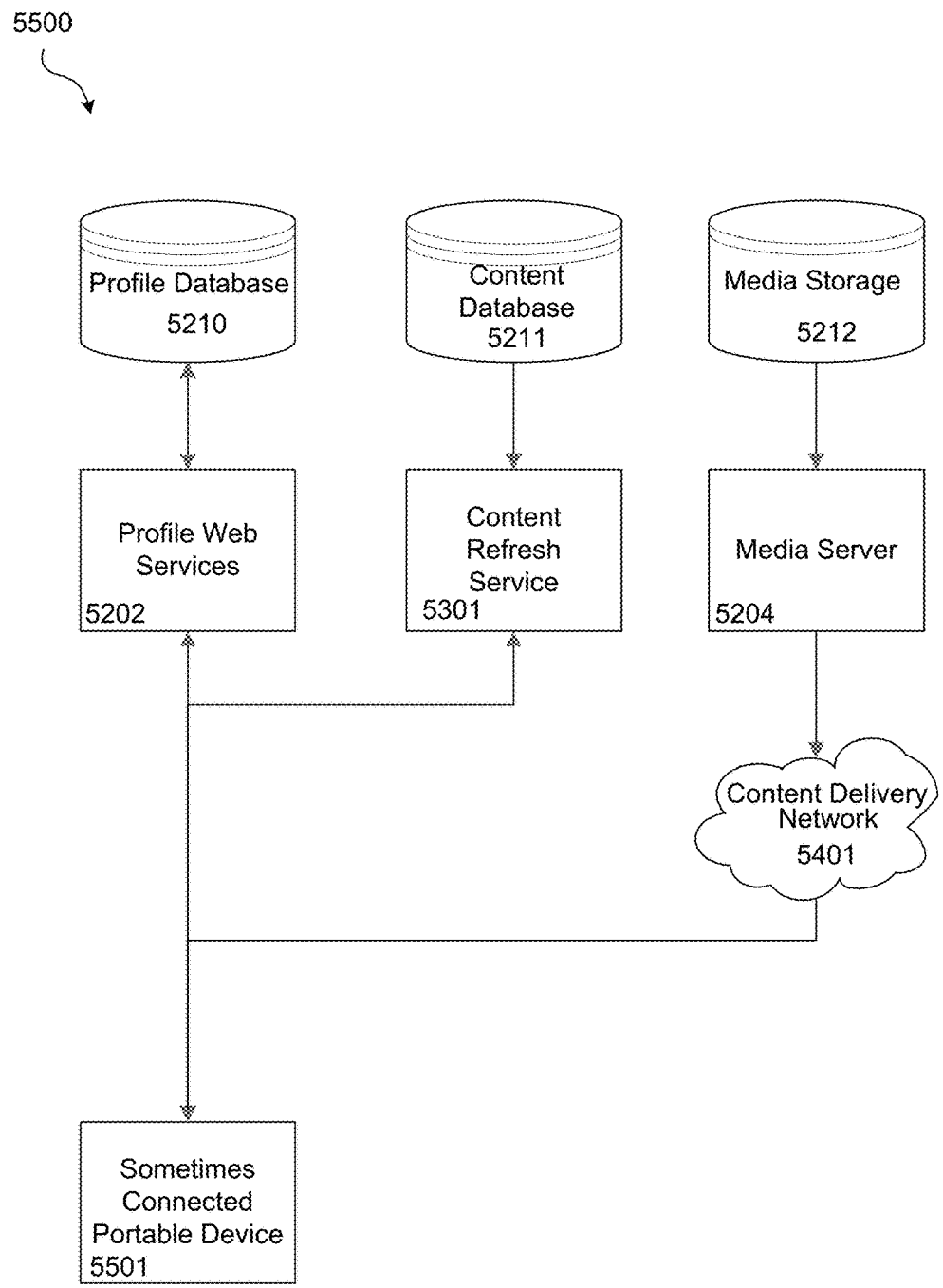
FIG. 55 is an illustration of an embodiment of a sometimes connected portable device in accordance with aspects of the present invention.

Referring now to FIG. 55, one embodiment of a configuration 5500 supporting a sometimes connected portable device 5501 is described. The sometimes connected portable device includes wireless networked players 5102 and cellular phone based players 5103. These players are designed to play and manage user personalized portable radio stations while only intermittently connected to the network.

The sometimes connected portable device 5501 synchronizes user profile data including content ratings and preferences 5307, station settings 5308, and history 5309 while connected. In one embodiment the synchronization is bi-directional. That is, if the profile database 5210 has a more recent version of an element of the profile, it is copied onto the portable device 55001. If the portable device 5501 has a more recent version of an element of the profile, it is copied to the profile database. This synchronization may require merging, or the resolution of conflicting elements. In an exemplary embodiment, the profile web services 5202 handles the merging and conflict resolution.

Once the portable device has synchronized the end-user profile elements, it can request a content refresh through the content refresh service 5301. In an exemplary embodiment, the portable device 5504 sends its current inventory associated with the station to refresh to the content refresh service 5301. The content refresh service 5301 creates a priority ordered list of content for the device to download. The device 5501 then downloads the indicated content from a media server 204. Optionally, the device 501 may request the content from a content delivery network 5401. The device uses the acquired content to supplement the given station. The device then repeats the process for the other stations.

In one embodiment, the stations are refreshed in order of need for content. That is, stations that are played often and lacking fresh content are refreshed first. Information about the share of device listening time associated with a particular station and the overall freshness of its content may be uploaded to the content refresh service 5301 in order to optimize the refresh process.

In one embodiment, the station refresh service 5301 creates a sequence of tracks as would occur in the device if it had access to the entire content database 5211. The service then eliminates from the sequence any tracks that already reside in the player and returns the given sequence to the device as the list of content to obtain.

In an alternate embodiment, the station refresh service 5301 analyzes the inventory for each station and each sub-category within a station and ensures that each category has sufficient content to render a forward sequence of tracks of a target length without undue repetition.

It will be apparent to one skilled in the art that the synchronization of the user profile information including station definition 5306, content ratings and preferences 5307, station settings 5308 and play history 5309, along with the transmission of current station inventory and usage, enables the station refresh service 5301 to optimize the inventory cached on the device. This allows the sometimes connected player 5501 to obtain content during relatively brief periods of connectivity and to render quality radio sequences during relatively long periods lacking any connectivity.

Referring now to FIG. 56, one embodiment of a configuration of a configuration 5600 of a sometimes connected player 5501 is described in detail. The content sequencer 5606 implements similar algorithms as the content sequencer 5304 employed in the server. One skilled in the art will recognize that the two components can share a substantial amount of programming code, and/or may be ported to different programming languages or operating systems as dictated by the target platforms.

As in the server implementation described in FIG. 53, the content sequencer 5606 uses the user profile, including the station definition 5306, content ratings 5307 and station settings 5308, and play history 5309, to sequence the available content cataloged by the content database 5607. The content sequencer feeds the media player 5602 such that the radio station is rendered for the end-user. The user interface 5601 controls the playback functions of the media player, and can also be used to facilitate user creation and editing of the station definition, content ratings and/or station settings.

The synchronization engine 5604 manages the bi-directional synchronization of the personalized profile entities, i.e., the station definition 5306, content ratings 5307 and station settings 5308, and play history 5309. The content inventory manager 5605 handles the station refresh operation by connecting to the content refresh service 5301. The content inventory manager also handles removing content from the content database and local media to make room for newer, fresher content.

In one embodiment, the content inventory manager 5605 uses content sequencer 5606 to rank the content in each station or station sub-category based on how soon the content is likely to be played. Content that is likely to be played soon is considered more important and will not be discarded. Content that is least likely to play is removed from the device periodically, as needed, to make room for incoming content from the content refresh operation or received over the satellite connection. Thus, content inventory manager 5605 ensures that the content stored on the device is optimized over time.

Device Controls and Displays

Functionality of various embodiments of media players as described above, as well as others, may be facilitated by a user interface as further described below. For example, a personal device 100 user interface, as is shown in FIG. 1 may include controls such as sliders, buttons, switches, tactile sensors, capacitive touch sensors or other input controls. Equivalent functionality to these controls, as well as other controls and functionality such as is described below, may alternately be implemented in a virtual form on a video display such as a computer monitor or other visual display device.

A personal device 100 may also include one or more display elements including lights such as LEDs, displays such as LCD panel displays, or displays based on other display technologies. Such displays may include hardware and software for display of black and white or color text, graphics, images, and video. Additional personal device 100 elements may include sound indicators such as piezoelectric buzzers, ceramic speakers or other audible indicator devices. A personal device 100 may also include sound output elements including speakers and/or connectors such as headphone jacks for attachment of headphones, external speakers, amplifiers or other external devices as well as one or more connectors for digitally interfacing the device to an external device such as a personal computer, television, cable or satellite interface box or other digital control or content source. Such connectors may include standard interface connectors such as USB, Firewire or other connectors based on standard or proprietary interface technologies.

A personal device 100 may also include hardware and software configured to allow the device to communicate wirelessly with other wireless devices such as wireless transmitters including satellite transmitters, Wi-Fi or other LAN transmitters, as well as other types of wired or wireless transceivers or hubs. In a typical embodiment, content is received from such a wired or wireless interface and rendered on the device and/or selectively stored on the device along with associated metadata. Content provided to and/or rendered one the device may be controlled by a user profile that may be customized by the device user via the user interface, with the user profile including information related to user customized tracks, artists, stations, or other criteria.

FIG. 1 illustrates the exterior configuration of one embodiment of a personal device 100. As illustrated in FIG. 1, a personal device 100 may be configured to include a series of display and control elements as further described below. Some of the control elements described below may include one or more elements configured to allow the user to effect control by mechanical actuation or tactile contact with control buttons, switches or sensors as well as with virtual controls such as switches, buttons, or other controls such as may be provided on a display screen and controlled by a mouse of other interface device. The control elements may be configured to provide various inputs to one or more personal device 100 operating modules, with the operating modules including software and/or hardware to support user customized content playback. FIG. 1B illustrates a screen shot 100*b*1 of a web based version of personal device 100 and screen shot of a standalone application based version of portable device 100 with similar control functionality.

A personal device 100 may include a visual display element, such as display screen 134, for displaying text, graphics, still images, photos, video or other content. Some embodiments of exemplary device displays are shown and described in further detail below with respect to the drawings. Display 134 may comprise display screen technology, such as an LCD display or other display technologies known in the art, as well as associated electronics, controls, hardware and software to enable display functionality in the device.

Figure 1B:
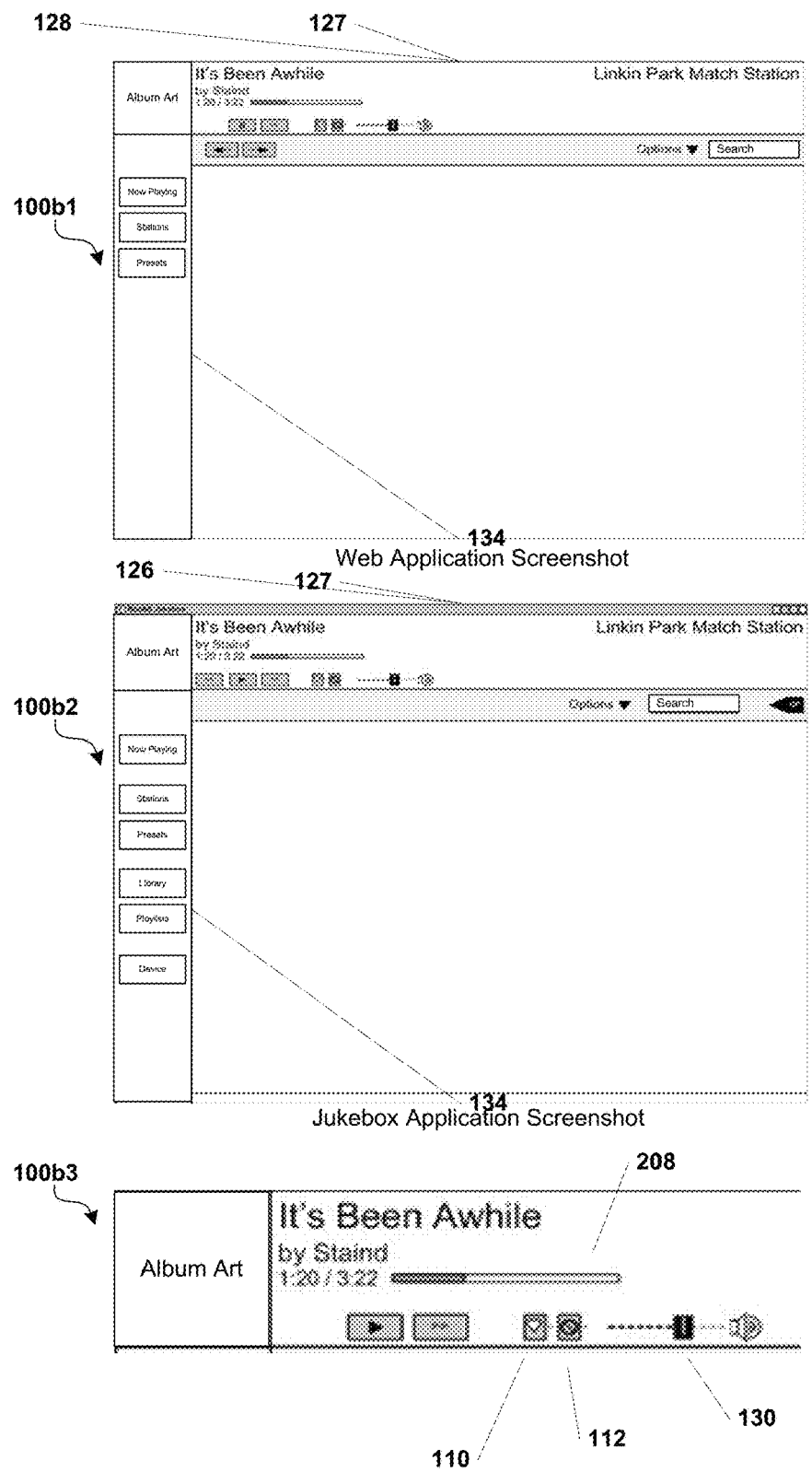
FIGS. 1B-1E are screen shots rendered by the disclosed playback device.
Figure 1C:
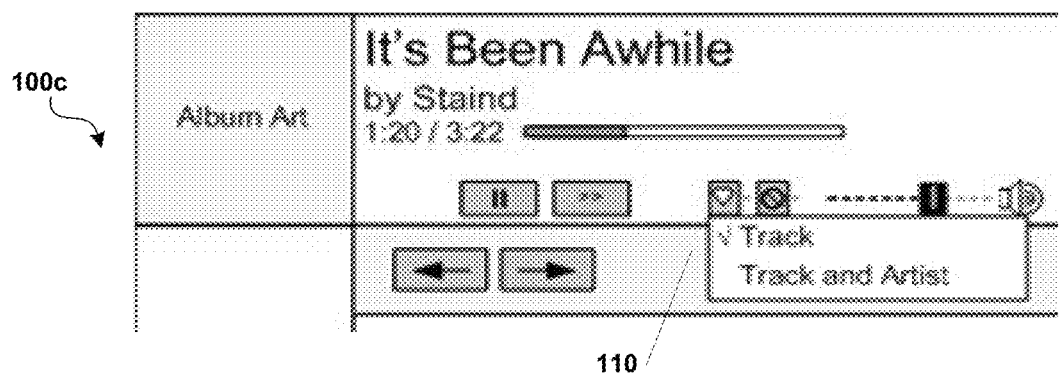
Figure 1D:

In one exemplary embodiment a personal device 100 may include a favorites button 110 as shown in FIGS. 1 and 1B to provide favorites functionality. Screenshot 100*b*3 is a closeup view of the favorites control 110 as may appear on a web player or jukebox embodiment. The favorites button 110 may include a graphic element depicting a heart or other similar symbol associated with a favorite selection choice. The favorites button 110 may be configured for a range of purposes such as selection of a particular track for storage or more frequent playback. In some embodiments operation of the favorites button 110 may be coordinated with a remote system, such as remote system 5200 described previously herein, to remotely select and provide favorites content, particularly in web player or jukebox embodiments. This may be done by creating, managing and storing one or more user profiles on a profile database 5210 on the remote system 5200 to manage the favorites selection.

Furthermore, the personal device 100 may be configured to allow the user to select different functionality for the favorites button 110. For example, in one embodiment the device is configured to allow the user to select from one of two functional options denoted as track mode and track and artist mode as shown in screen shot 100*c* of FIG. 1*c*. In Track mode, pressing the favorites button 110 signals the device to play a particular track more frequently. In track and artist mode the favorites button 110 signals the device to play both the selected track and associated artist more frequently. In some embodiments temporary or permanent storage means may be provided so that the favorites button 110 may be used to select a particular track for temporary or permanent storage in a memory in the personal device 100 as is described in further detail in the related applications, and in particular in U.S. Utility patent application Ser. Nos. 11/955,299 and 11/923,573, incorporated by reference herein in their entirety.

In some embodiments the device may be configure to allow a user to change the functionality of the favorites button 110 to one of the following choices; increase playback of the associated track on the currently selected station; increase playback of the track on all stations; increase playback of the artist on the current station; or increase playback of the artist on all stations.

Figure 12:
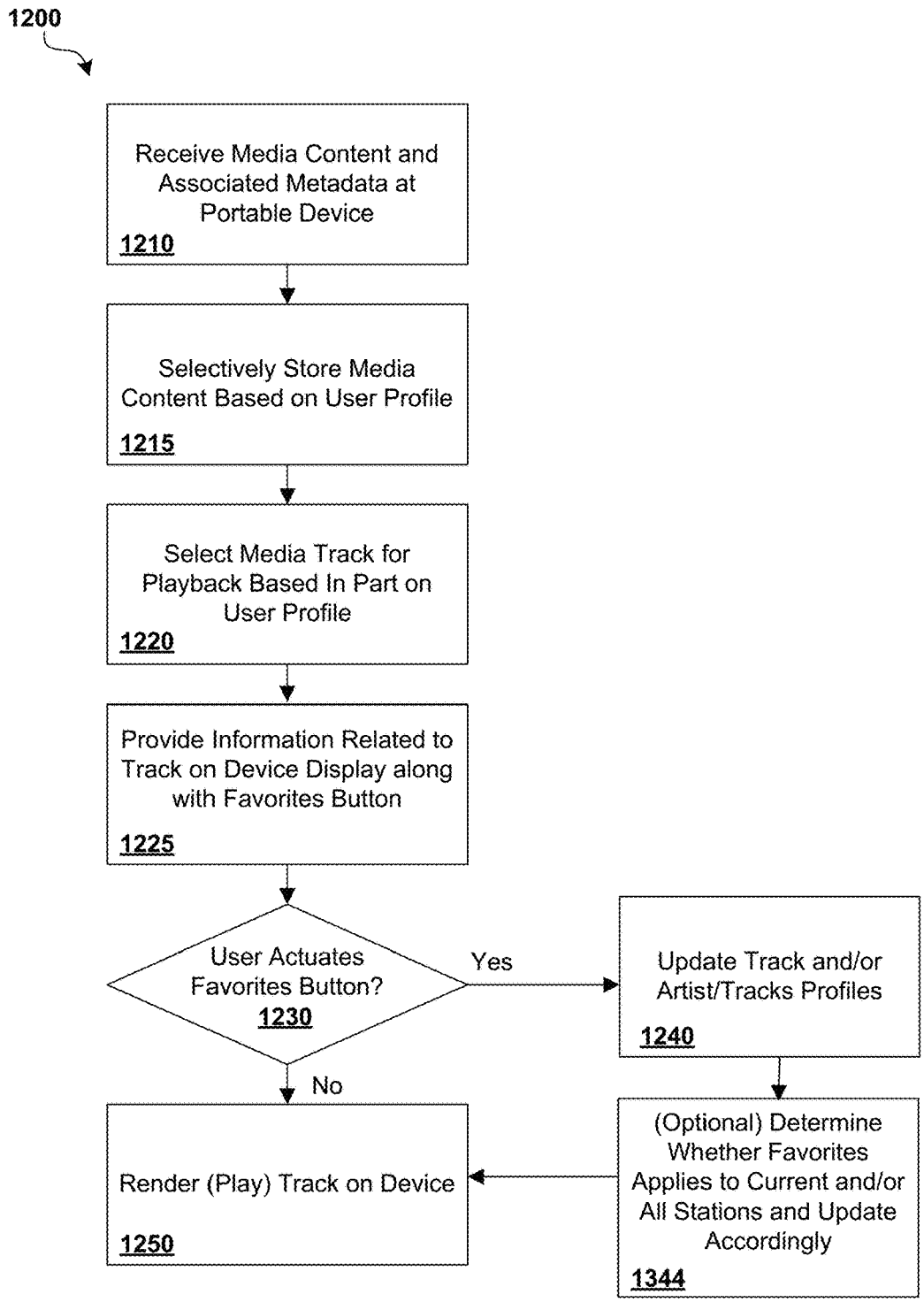
FIG. 12 is an illustration of an embodiment of a Favorites process in accordance with aspects of the present invention.

FIG. 12 illustrates one embodiment of a process 1200 for providing favorites functionality in accordance with aspects of the invention. It is noted that process 1200 is provided for purposes of illustration and not limitation, and therefore other processes to provide similar favorites functionality may also be used. As shown in FIG. 12, media content and associated metadata may be received at the personal device 100 or web or jukebox player via a wired or wireless connection at stage 1210. For example, content may be received from a satellite broadcast transmission or via a Wi-Fi (IEEE 802.11) network or wired Ethernet, USB, Firewire or other network connection. The content may then be selectively stored on the personal device 100 at stage 1215 by using, for example, systems and methods as are described in the related applications and in particular in U.S. Utility patent application Ser. Nos. 11/955,299 and 11/923, 573.

Having stored the content, typically in the form of playback tracks such as audio tracks or video clips, the content may be associated with a user profile based on one or more user selected customization criteria. For example, the content may be associated with a particular radio station or stations selected by the user and/or customized by the user based on particular user preferences. Additional details regarding such user customization and profiling of radio stations is described further below as well as in the related applications, including, in particular, U.S. Utility patent application Ser. Nos. 11/955,299 and 11/923,573.

A media track may then be selected for playback at stage 1220, with the selection typically being made in part based on the user profile. Once the content/track is selected for playback at stage 1220, the user may be provided with information at stage 1225 on the content, such as track name, artist name, album information and/or art, duration, and/or other information associated with the content/track. A favorites button 110 may be provided on the portable device 100 to allow the user to select the track as a favorite at stage 1230.

If the user chooses to select the track by actuating the favorites button 100, the process may continue to stage 1240 where user profiles and/or metadata associated with the track may be updated to indicate that the track is a favorite and therefore should be identified accordingly and played more frequently. In addition, the artist and/or album associated with the track may also be updated at stage 1344 based on selection of the favorites button 110 in conjunction with an artist or album mode of personal device 100. If an artist or album is selected as a favorite, the stored tracks may be searched for associated and tracks and a profile associated with one or more may be updated accordingly to indicate preference of the artist or album for more frequent playback. In addition, favorites selection may be further tailored to specific stations as provided by the radio service and/or as customized by the device user.

When the favorites processing is complete, the device may then play (render) the content at stage 1250, such as by providing an output audio signal to a headphone jack or speaker or providing a video or images on a personal device 100 display screen. Additional details regarding such content selection, playback, and profiling is further described in the related applications, including, in particular, U.S. Utility patent application Ser. Nos. 11/955,299 and 11/923,573. Further, additional details of various embodiments of the storage, selection, metatagging, profiling, processing and other aspects of favorites implementations are further described and illustrated in the related applications. It is noted that in some embodiments the favorites button 110 may be disabled, such as when media content includes talk programs, news, traffic or other content such as content that is included in playlists and libraries, or when would otherwise be desirable to prohibit favorites selections.

In web player or jukebox embodiments of the present invention, favorites functionality such as is described above may be implemented in part in conjunction with systems associated with a radio service, such as the systems as described in the related applications and in particular in U.S. Provisional Patent Application Ser. No. 60/894,879, incorporated by reference herein. In these systems, one or more components of the favorites functionality may be managed by one or more remote server systems in conjunction with a user profile stored on or provided to the remote server systems, with selected favorites content provided directly to the web player or jukebox application from the remote system based on the user profile, which may include information related to user selected favorites. For example, favorites functionality may be provided in conjunction with remote system 5200, with remote selection of favorites content based on a user profile stored in profile database 5210 and selected by content sequencer 5304.

In addition to and/or in place of a favorites button 110, a personal device 100 may include a ban track button 112 as shown in FIGS. 1 and 1B for providing ban functionality as further described below. The ban track button 112 include a graphic such as a circle with a line through the center or other symbol indicating a disfavored or disliked selection or option. The personal device may be configured to allow the user to actuate the ban track button 112 range of purposes relating to banning particular tracks or artists. Furthermore, the device may be configured to allow the user to select different functionality for the ban track button 112. For example, in one embodiment as shown in FIG. 1d the device is configured to provide a screen 100d to allow a user to change the functionality of the ban track button 112 to one of the following choices; ban the associated track from the current station; ban the track from all stations; ban the artist from the current stations; or ban the artist from all stations. In some embodiments the ban track button 112 can further be used to signal the device to skip to the next track. In certain embodiments the number of tracks skipped by actuation of the ban track button 112 may be limited based on DMCA or other constraints or associated requirements, in which case the track will be banned from future playback but will continue until the current play is completed.

Figure 13:
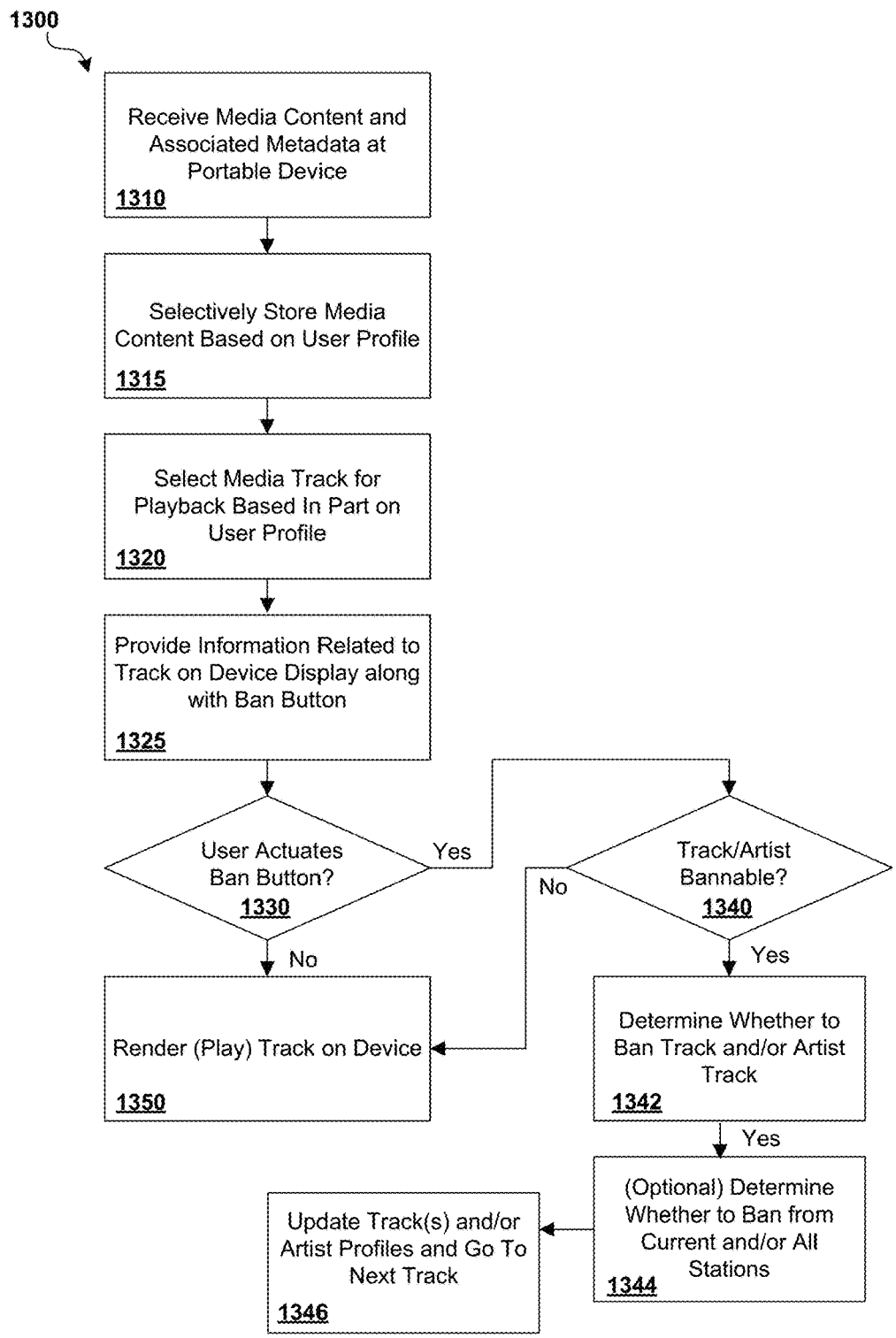
FIG. 13 is an illustration of an embodiment of a Ban process in accordance with aspects of the present invention.

FIG. 13 illustrates one embodiment of a process 1300 for providing ban track (also denoted as "ban") functionality in accordance with aspects of the invention. It is noted that process 1300 is provided for purposes of illustration and not limitation, and therefore other processes to provide similar ban functionality may also be used. As shown in FIG. 13, media content and associated metadata may be received at the personal device 100 or web or jukebox application via a wired or wireless connection at stage 1310. For example, content may be received from a satellite broadcast transmission or via a Wi-Fi (IEEE 802.11) network or wired Ethernet, USB, Firewire or other network connection. The content may then be selectively stored on the device at stage 1315 by using, for example, systems and methods as are described in the related applications and in particular in U.S. Utility patent application Ser. Nos. 11/955,299 and 11/923,573, incorporated by reference herein in their entirety. Having stored the content, typically in the form of playback tracks such as audio tracks or video clips, the content may be associated with a user profile based on one or more user selected customization criteria. For example, the content may be associated with a particular station or stations selected by the user and/or customized by user based on particular user preferences. Additional details regarding such user customization and profiling is further described in the related applications, including, in particular U.S. patent application Ser. Nos. 11/955,199 and 11/923,573.

A media track may then be selected for playback at stage 1320, with the selection typically being made in part based on the user profile. Once the content/track is selected for playback at stage 1320, the user may be provided with information at stage 1325 on the content, such as track name, artist name, album information and/or art, duration, and/or other information associated with the content/track. A ban track button then be provided to allow the user to select the track as a banned track at stage 1330. If the user chooses to select the track for banning, the process may continue to stage 1340 with a test of whether the track is bannable. This test may be based, for example, on a playback rule set associated with a statutory or regulatory framework such as is provided by the Digital Millenium Copyright Act of 1998 (DMCA). In some cases a track may not be bannable under such a rule set, in which case execution may proceed to stage 1350 where the track is played (rendered) on the device by, for example, providing an output audio signal to a speaker or headphone and/or providing a video or images on a personal device 100 display screen. If a track is bannable, execution may proceed from stage 1340 to stage 1342 where a test may be applied to determine whether the user desires to ban only a particular track or a particular track and associated artist.

In some embodiments at stage 1342 the personal device 100 may merely ban the particular track, at which time a track profile may be updated to reflect that the track should not be played back. In addition to or in place of profile updating, the track may be removed from personal device 100 memory and taken out of the pool of tracks available for playback. If the user desires to ban both the track and artist and/or album, an equivalent process may be applied to the pool of available tracks to update all profiles associated with the artist and/or album as well as optionally delete all tracks associated with the artist and/or album.

In some embodiments an optional additional stage 1344 may be provided to determine whether the track/artist/album should be banned from a particular radio station or from all radio stations, with such stations typically provided by the associated radio service and/or customized by the device user such as in conjunction with one or more user profiles. Assuming a track is bannable and ban is selected, the track will not be played by the device at stage 1350, but rather execution will continue to selection/provision of the next track in the playback queue. Additional details regarding content selection, playback, and profiling is further described in the related applications, including, in particular, U.S. Utility patent application Ser. Nos. 11/955,299 and 11/923,573. Further, additional details of various embodiments of the storage, selection, metatagging, profiling, processing, and other aspects of ban implementations are further described and illustrated in the related applications. It is noted that in some embodiments the ban track button 112 be disabled. For example, in some embodiments the ban track button 112 may be disabled in certain operating modes, such as when media content includes talk programs, news, traffic or other content such as playlists and libraries. For ergonomic purposes, in some embodiments the favorites button 110 and ban Track button 112 may be placed adjacent to each other on the device's exterior in a Ban/Favorites control configuration in order to provide efficient user control of track reference selections and associated features.

In web player or jukebox embodiments of the present invention, ban functionality as described above may be implemented in part in conjunction with systems associated with a radio service, such as the systems as described in the related applications and in particular in U.S. Provisional Patent Application Ser. No. 60/894,879, incorporated by reference herein. In these systems, one or more components of the ban functionality may be managed by one or more remote server systems in conjunction with a user profile stored on or provided to the remote server systems. For example, ban functionality may be provided in conjunction with remote system 5200, with remote management of banned content based on a user profile stored in profile database 5210.

Figure 1E:

In some embodiments, a portable device 100 may include further functionality related to displaying and editing favorites and/or banned content. For example, in one embodiment a display screen 100e as shown in FIG. 1e may be provided listing selected favorites and banned content. The user may then be permitted to edit the favorites and banned content by selecting an associated content item in display screen 100e and removing the associated content from the favorites or banned list, such as by updating one or user profiles.

A personal device 100 may include a pause button 128. The pause button may include graphics such as (∥) symbol or other symbol indicating pause or temporary stop of playback. In some embodiments the personal device 100 may be configured to allow content playback to be suspended by actuating the pause button 128 one time. Playback may then be resumed by pressing the pause button 128 a second time. The pause button 128 will generally be functional during playback of local content rather than radio station playback. For example, in some embodiments the pause button 128 may be disabled for certain types of content such as for radio station playback.

A personal device 100 may include an options button 122. The options button 122 may include graphics such as the symbol shown in FIG. 1, or other symbols indicating selection of options. In some embodiments the personal device 100 may be configured to allow for user selection of menu options by actuating the options button 122, resulting in a menu with choices related to the currently displayed screen. Menu options may then be selected or the options button 122 may be pressed a second to exit the options menu. In some embodiments items displayed in the associated options menu are contextual and therefore apply to the station that is selected by the option menu choices, not the station that may currently be playing on the personal device.

A personal device 100 may include a back/home button 120. The back/home button 120 may include graphics such as the symbol shown in FIG. 1 or other symbols indicating backward or home movement in a menu selection process. In some embodiments the personal device 100 may be configured so that the back/home button 120 may be used to allow users to step backward repeatedly to previous screens. For example, by actuating the back/home button 120 a user may be able to return to a previous menu or the main menu by repeatedly actuating the button to retrace their steps. The back/home button 120 may also be used to return directly to the main menu by pressing and holding the button for a longer period of time which causes the personal device 100 to immediately return to the home menu without stepping through intermediate menus. In some embodiments the back/home button follows the same operational metaphor as an Internet browser "Back" button; however, in some embodiments, after the user returns to the main menu may be prevented from further backward steps to previous menus. Such a feature may be interrelated to navigation history monitoring by effecting the clearing of a navigation history buffer or cache each time a user returns to the main menu.

A previous device 100 may include a previous button 126 and/or next button 127. The previous 126 and next button may include graphics such as paired arrows (<<) and (>>) or other symbols indicating movement laterally through menus or other selection options. In some embodiments the personal device 100 may be configured so that the previous button 126 may be active while users listen to local content such as tracks or playlists. In some embodiments users may skip to previous tracks by pressing the previous button 126. In some embodiments users may skip backwards as many times as desired. The previous button 126 may also used to allow users to scrub backward (move backward within the current track). Scrubbing may be actuated by pressing and holding the previous button 126, which will signal the personal device to move playback backward within the current track at a predefined speed. The speed at which scrubbing is done may also be increased by actuating the previous button 126 and holding for a period of time wherein the scrubbing speed may increase based on the duration of actuation. In some embodiments, when there is content in the playlist, the previous button 126 may operate as follows: if the user makes a single click and if the song has played for more than a fixed period of time, such as, for example, five seconds, the personal device 100 will restart the current track; if the track has played for less than the fixed period of time the personal device 100 will skip back to the previous track; if the track is the first one in a playlist the personal device 100 will simply restart the current track. In some embodiments the Previous Button 126 may be disabled when there is no content in the current playlist. In some embodiments the Previous Button 126 may be disabled when a radio station is in current playlist, whether or not the station is being played.

Similarly, the functionality of the next button 127 may be configured to vary depending on whether the users are listening to a radio mode playlist/library track. For example, in some embodiments when the personal device is playing from a playlist or library users can actuate the next button 127 signaling the personal device 100 to skip to the next track. Skipping through an arbitrary number of tracks may be allowed. In some embodiments, if the personal device 100 is playing the last track in the current playlist and the user presses the next button 127, the personal device 100 may begin to play the first track in the current playlist.

The next button 127 may also be used to scrub forward in the current track similarly to the backward scrubbing described above with respect to the previous button 126. In some embodiments, when operating in a radio mode the next button 127 may allow users to skip forward to successive tracks. In some embodiments with multiple levels of service, users with a premium service may be allowed to skip forward as many times as desired. Alternately, other users with a basic or standard level of service may be limited in the number of times forward skipping may be allowed. For example, in one exemplary embodiment users of a basic level of service are allowed to skip forward up to six times per hour using the next button 127. If the user tries to skip forward additional times, a message or indication may be provided notifying the user that the number of forward skips is limited. In some embodiments where advertisements are transmitted, some or all users may be unable to skip forward through advertisements. In some embodiments the general operation of the next button 127 with regard to all types of content (Radio, Playlist, or Library) is as follows: when there is content in the playlist a single or double click will signal the personal device 100 skip to the next track; if the personal device 100 is in play mode, the next track is played; if the personal device 100 is in pause mode, the next track is not played; if there is no content in the current playlist the next button 127 may be disabled.

A Personal device 100 may also include interface connectors such as a headphone connector 118, USB, Firewire, or other data interface connectors such as connector 114, and docking station connectors such as connector 116. The Personal device 100 may also include a reset button configured to allow reset of the device software and/or hardware in the event of a freeze, lockup, or other similar undesired device state.

Figure 2:
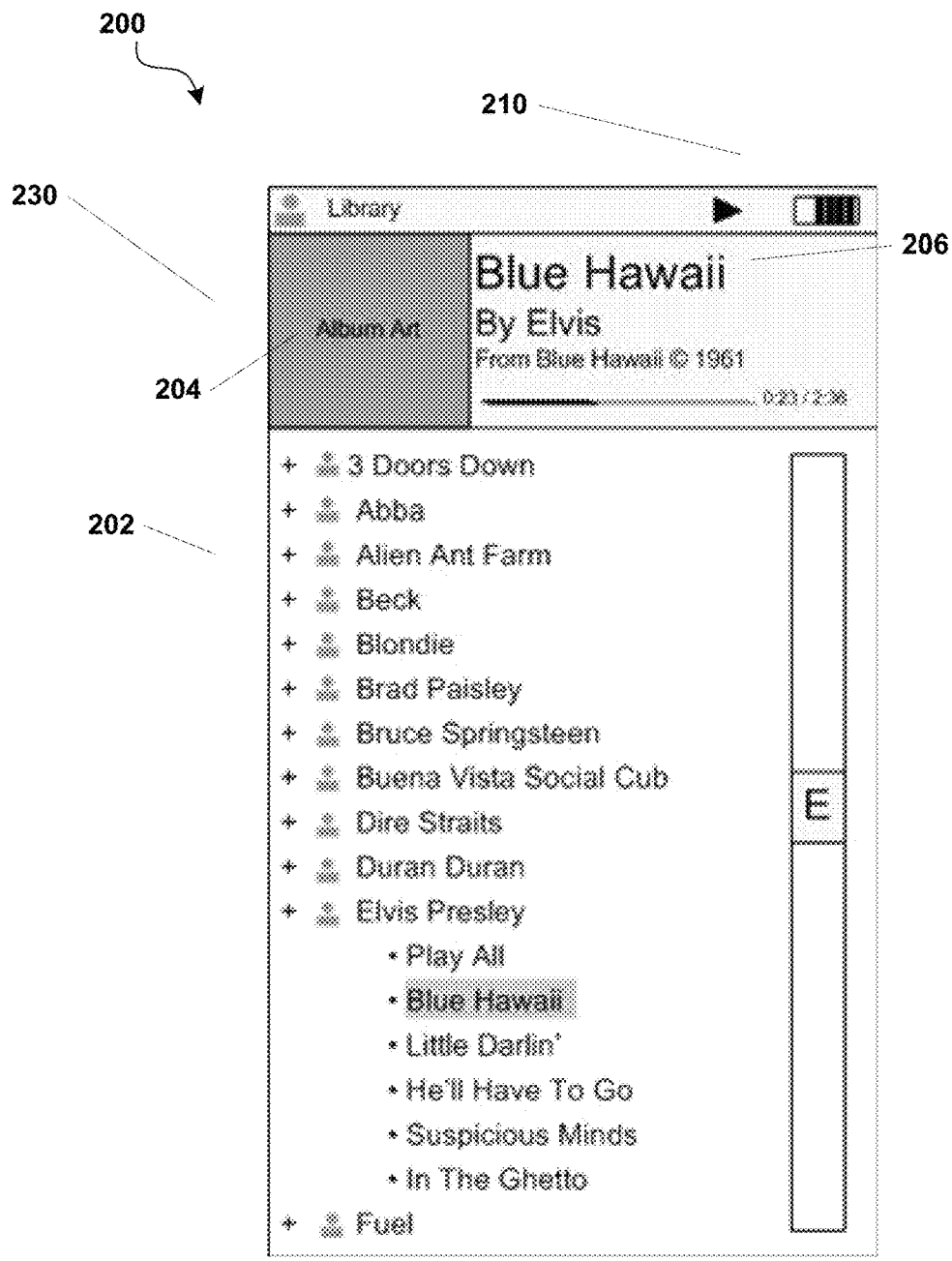
FIG. 2 is a block diagram illustrating one embodiment of a menu screen including content displays and user interaction information in accordance with aspects of the present invention.

One embodiment of a user interaction menu screen for navigating a menu on the personal device 100 is illustrated in FIG. 2, which shows a menu screen 200 with a list of particular musical artists and tracks. As shown in FIG. 2, a menu screen may include a plurality of user selectable choices, such as a list of musical artists 202 with one or more tracks under each artist. Additional displays may provide a range of information associated with pending or currently playing media such as an album graphic 204, track and artist information 206, duration of track played and/or remaining (seek bar) 208 or playback status indicators 210. Related information may also be displayed including text or graphic based displays of artists including photographs, biographical information, album or track covers or other related images, information about related tracks, albums, or artists, artist or album reviews or commentary, as well as other related information that may be of interest to users.

In some embodiments specific displayed elements may be grouped into a contextual player 230 as shown in FIG. 2 where the contextual player 230 may be positioned at the top or bottom of other display screens to show a smaller version of player information. In some embodiments a contextual player 230 provides a mini-screen of Now Playing information, as is further discussed in the following sections, within another display screen, such as a library, preset, radio station, or playlist screen. The contextual player 230 may be configured to display a minimized version of Now Playing information so that users do not need to switch back and forth between Now Playing and other content selection screens unless they want the entire display to include Now Playing information. As shown in FIG. 2, in some exemplary embodiments contextual player 230 resides near the top of the display and includes album art, track name, seek, artist and copyright information. In some embodiments the contextual player 230 remains visible until the user navigates to another window. If the user navigates back, the contextual player 230 may not be redisplayed. In some embodiments, features as described above with respect to music soundtracks within a contextual player 230 may also be implemented in conjunction with display of still images or video.

In addition, the menu screen shown in FIG. 2 may also include a visual scroll bar 220 indicating relative position, speed and/or motion of the scroll wheel. The personal device 100 may be configured to allow the visual scroll bar 220 to show one or more pieces of information associated with a list or other menu parameters such as the length of the list, amount of the list that is currently visible, letter, number, or symbol of the selection that is currently being viewed or other parameters related to showing position within the menu screen.

Figure 3:
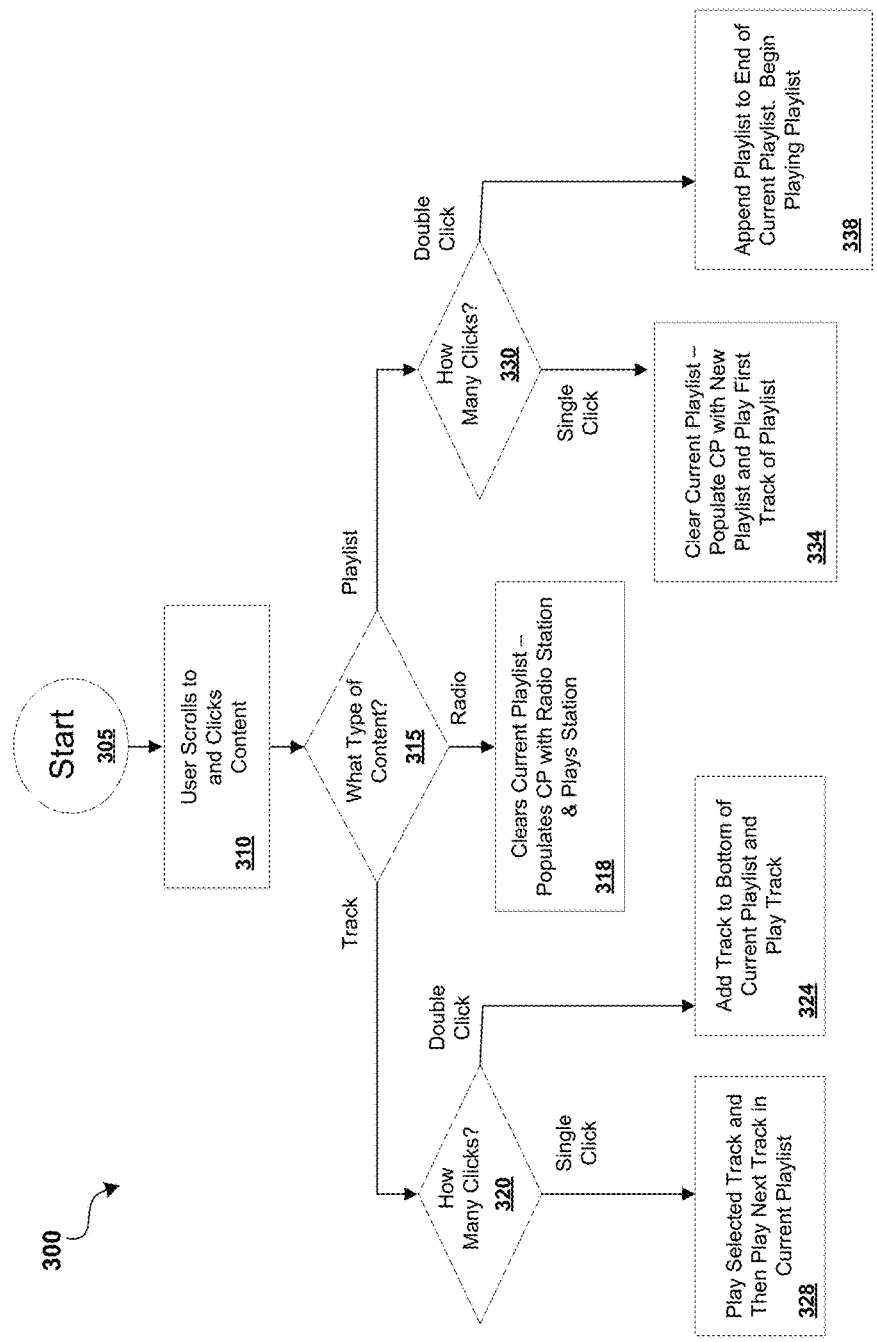
FIG. 3 is a flowchart illustrating one embodiment of a user menu interaction flow involving content selection in accordance with aspects of the present invention.

One embodiment of a process 300 for content selection and control is shown in FIG. 3. Process 300 may begin at a start stage 305, with the user scrolling to a desired selection and clicking the associated content at stage 310. At stage 315 the particular type of content may be determined, with the content options typically being selection of track for playback, selection of a playlist for playback, or selection of a radio function for playback. If track or playlist are selected, a determination of the number of clicks may be made at stages 320 or 330 respectively. For track mode and a single click the personal device 100 will then play the selected track, to be followed by the next track in the current playlist at stage 328. If the user enters a double click the track may be added to the bottom of the playlist at stage 324 and then be played. Similarly, in playlist mode if a single click is provided by the user the current playlist may be cleared at stage 334 and the personal device 100 then populated with a new playlist, with playback continuing with the first track of the new playlist. Alternately, if a double click is provided in playlist mode and selected playlist may be appended to the end of the current playlist at stage 335 and playback of the current playlist begun.

In some embodiments, the personal device 100 configured may be configured so that content is displayed and/or arranged in a tree structure, as shown in FIG. 2, that functions in a way analogous to the tree functions in Microsoft Windows Explorer. In some embodiments, the Top Node or Branch are folders. A single click with on the folders expands or collapses the folder. A double click expands the folder, appends all of the content in that branch to the end of the current playlist, and then plays the first item of the appended content. If the folder is expanded, a double click does not collapse it; the user must make a single click to collapse the folder. Also within the structure are Bottom Nodes or Leaves. These are items of content that the user can click on to play. In some embodiments the top leaf of each branch may act as a "play all" function that selects all content within the branch for playback.

Additional graphical elements may be included in displays and may include volume sliders, configured to be shown on the display when a user changes the volume control, and seek bars configured to show the progress of the track, such as seek bar 208 as shown in FIGS. 1b and 2. The volume slider may be configured to be shown on the display for a limited period of time after a user changes volume and then be hidden until the next volume change. The seek bar may be configured to show the progress of playback of a track. In some embodiments the seek bar may be configured to show the progress of a track scrub as discussed previously.

A Personal device 100 may include displays and associated hardware and software to allow a user to interact with the personal device 100 by entering text or other data information. One exemplary embodiment of text and data entry is described below with respect to FIG. 4. When text or other data entry is required, the personal device 100 may be configured so that the display screen 400 is divided into two or more sections such as two columns shown in FIG. 4. In this example, when the screen is displayed the focus is on the top left arrow 402. If the user scrolls down, scrolling proceeds through the numbers and letters shown. When the desired character is reached, the user may then click an actuation component of the device and the character will be displayed in a text entry box 406 in the other column. If the user enters an incorrect character the user can scroll to a delete character and click delete. In some exemplary embodiments a personal device 190 may be configured so that if the user misses a character within a string the user must repeatedly enter delete characters until the cursor is moved to the desired location, then retype all successive characters.

To change columns, personal device 100 may be configured so that a user scrolls to the top of the current column making the arrow come back into focus. The user may then press actuation device, changing the focus to the right arrow 404, where scrolling may then continue down the other column. In the example shown in FIG. 4, the user cannot scroll to the text entry box since all of the entry is performed from the left column; however, the user may scroll to the security settings pull-down mean 408, the OK button 410 and the back button 412, which will return the user to the previously displayed menu or screen.

A summary of button, display, and operational functions for one embodiment of a personal device 100 is provided in TABLE 1 below. It will be noted that the above described display and button operational descriptions and associated figures are intended to be examples of some embodiments of the present invention; however, these examples are not intended to limit the spirit and scope of the invention. It will be apparent that a variety of other embodiments are possible within the spirit and scope of the present invention.

TABLE 1

Button Interaction Matrix

| Button Pressed | Action |
|---|---|
| Back | MainMenu:<br>Disabled—the navigation history is cleared once the user navigates to the main menu, so the user cannot go back to a previous screen<br>All Other Screens:<br>The device displays the previous screen. If the user presses and holds the button, the device displays the main menu. |
| Options | Main Menu, Settings Main Screen<br>Disabled—no menu is displayed since there are no options.<br>All Other Screens:<br>Displays the options menu with the options described in each feature's table of Options Menu. |
| Scroll (pressed in) | Provides additional functionality as described with respect to scrolling. |
| Next | The device plays the next track to the Current Playlist or next song on the radio station. If the device is playing the last track in the Current Playlist and the user presses the Next button, the device will play the first track in the Current Playlist. The button is disabled if the current playlist is empty. |
| Previous | The device plays the previous track in the Current Playlist. The button is disabled if 1) the device is playing a radio station, or 2) the current playlist is empty. |
| Favorite | If the device is playing a music radio station; the device tells the associated radio service that the track (or track and artist) is a favorite. There is no other flow change. This button is disabled if 1) the device is playing a talk, news, or traffic station, 2) the device is playing local content, or 3) the device it not playing any content. |
| Ban | If the device is playing a music radio station, the device tells the associated radio service to ban that track and/or artist. The device then skips to the next radio track. This button is disabled if 1) the device is playing a talk, news, or traffic station. 2) the device is playing local content, or 3) the device is not playing any content. |

Device Operational Modules and Functions

Personal device 100 may include various operational modules as described in further detail below for providing functionality including receiving, storing and rendering media content and information, implementing user controls and displays, creating and storing data structures such as media content directors structures, playlists and user profiles, as well as for interfacing to other devices or systems. Modules may include hardware, software, firmware analog electronics, digital electronics, mechanical and/or optical components.

In web player or jukebox embodiments of the present invention, the functionality as described below may be implemented in part in conjunction with systems associated with a radio service, such as the systems as described in the related applications and in particular in U.S. Provisional Patent Application Ser. No. 60/894,879, incorporated by reference herein. In these systems, one or more components of the below described functionality may be managed by one or more remote server systems in conjunction with a user profile stored on or provided to the remote server systems, with selected content provided directly to the web player or jukebox application from the remote system based on the user profile. For example, user customized content may be provided in conjunction with remote system 5200, with remote selection of content based on a user profile stored in profile database 5210 and selected by content sequencer 5304.

Library

One aspect of the present invention relates to storage of content on the personal device 100. A personal device 100 may include one or more modules providing library functionality that may include access to and downloading of content, storing, arranging, archiving, linking, managing, displaying outputting and playing content. Content associated will the library will typically be user owned and/or licensed content. For example, content stored within the personal device 100 library may include content downloaded or provided through a radio service as well as content transferred by users via, for example, their personal computers or other content storage and transfer devices. Content within the library will typically be divided into three storage areas: music, video and photos (still images or graphics). Library information and access may be done by configuring the personal device 100 to allow access to the device's library through one or more menu screens as shown in FIG. 7, which displays three library related user screens 700A-700C. FIG. 7d illustrates an analogous library screen 700d1 for a jukebox embodiment. Because the library functionality relates primarily to user owned or licensed content, typical wet layer or jukebox embodiments will include library functionality as is described below; however, in some embodiments some or all of the described library functionality may be provided in a web player or jukebox embodiment.

Figures 7A, 7B, 7C:
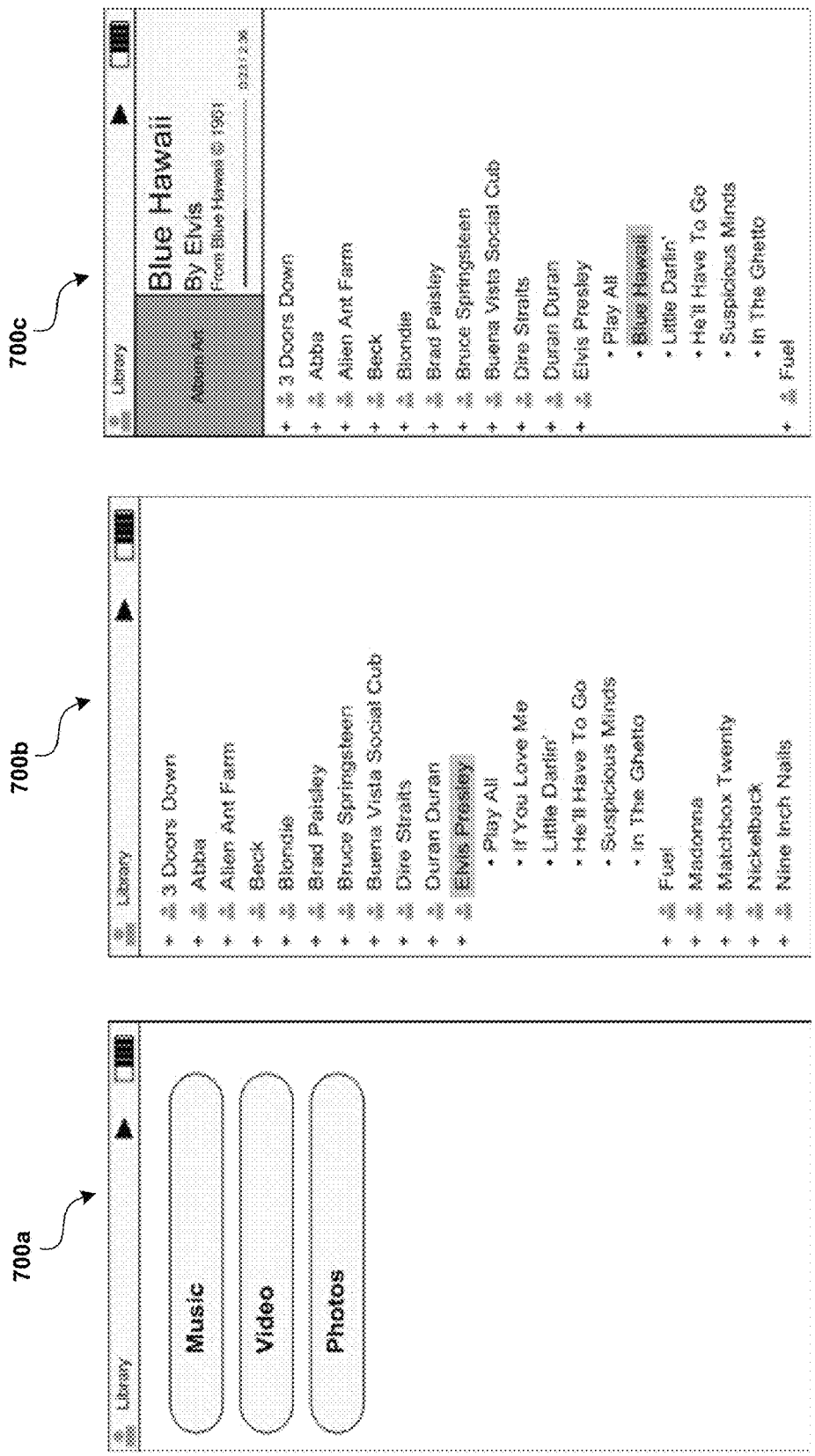

FIG. 7A illustrates a library content selection screen 700A. Such a screen may be configured to include one or more submenus allowing a user to select from different types of content within the library including music, videos, photos, as well as other types of content that may be viewed on or played by the personal device 100. FIG. 7B illustrates a view of one form of content library structure 700B. In some embodiments content libraries may be structured as shown in FIG. 7B in a tree configuration where content associated with a specific source or artist is contained within a sub-field under the particular source or artist. In addition, viewing or other options associated with particular sources, artists, or content may be displayed in a menu screen or subscreen or in a contextual player vie as shown in FIG. 7C, screen 700C. To further illustrate embodiments of a library and library access functions with respect to a music library, a personal device 100 can be configured to display a music library in format with a tree configuration as shown in FIG. 7B. A default organization may be by Artist/Album; however, the personal device 100 may be configured to allow the user to change this view to one of several views by selecting a menu option. Tracks may be played from the library display by selecting an artist, album, track or other tree icon and the tree branch may include an icon for "Play All," as shown in FIG. 7B allowing a user to play all tracks in the list. Similar Play All functionality may also be provided for other list arrangements such as when the user is viewing the library in artist or album view. Individual tracks may also be played by clicking on the individual track to begin playback.

Personal device 100 may further include library search interfaces and functionality, wherein the user may be prompted to enter a search term and have search results associated with the user's library content provided. In one embodiment of a jukebox applications screen 700d2 as illustrated in FIG. 7d, a user may enter a library search term with the portable device 100 filtering the library content and displaying only content matching the entered search criteria. For example, if a keyword "Jimmy" is entered in screen 700d2, the library may be searched and all library content associated artists, tracks of albums with names related to "Jimmy" may be displayed.

In addition, a personal device 100 may be configured to provide a contextual player display window in conjunction with library selection as shown in FIG. 7C. Information displayed in the contextual player view may include information stored in conjunction with the track as metadata such as track name, artist name, album, copyright year and other related parameters. The contextual player may also include other information or controls such as a seek bar and track duration (time played/time remaining/total time). The personal device 100 may be configured to allow a range of other library features, some of which may be similar to or related to features discussed in connection with playlists as further described below. TABLE 3 below lists library options that may be configured in the personal device 100 in some embodiments. A personal device 100 may also be configured to include similar features and options when playing content based on video or photographs.

TABLE 3

Library Options

| Option Level 1 | Option Level 2 | Description |
| --- | --- | --- |
| View By | Expand All | Video |
| | Collapse All | Photo |
| | All Tracks | Photo options |
| | Artists (default) | Thumbnails |
| | Albums | List |
| | Artists/Albums | Slide Show |
| | Genres | (Should contain different kinds of |
| | Track Types | transition |
| | Playlists | effects zoom, fade, pan-fade slide, |
| | Album Art | wipe, |
| | Videos | etc) |
| | Photos | Play Now |
| | | Date |
| | | Name |
| | | Randomly |
| Shuffle Play All | — | Shuffles all of the device's library content, puts it in the Current Playlist, and plays the content |
| Play Now | — | Plays the track that is selected in the content area. |
| Play Next | — | Adds selected track to Current Playlist. The device inserts the track after the track that is being played. |
| Add to End of Playlist | — | Adds selected track to the end of the Current Playlist. This is the same as double-clicking a track. |
| Delete | — | Deletes the selected track. When user selects this, the device displays an "are you sure" message. |
| Save Playlist | — | Saves the content in the Current Playlist as a playlist. If the playlist is a saved playlist, then it saves the changes to the playlist |

Playlists

Figure 5C:
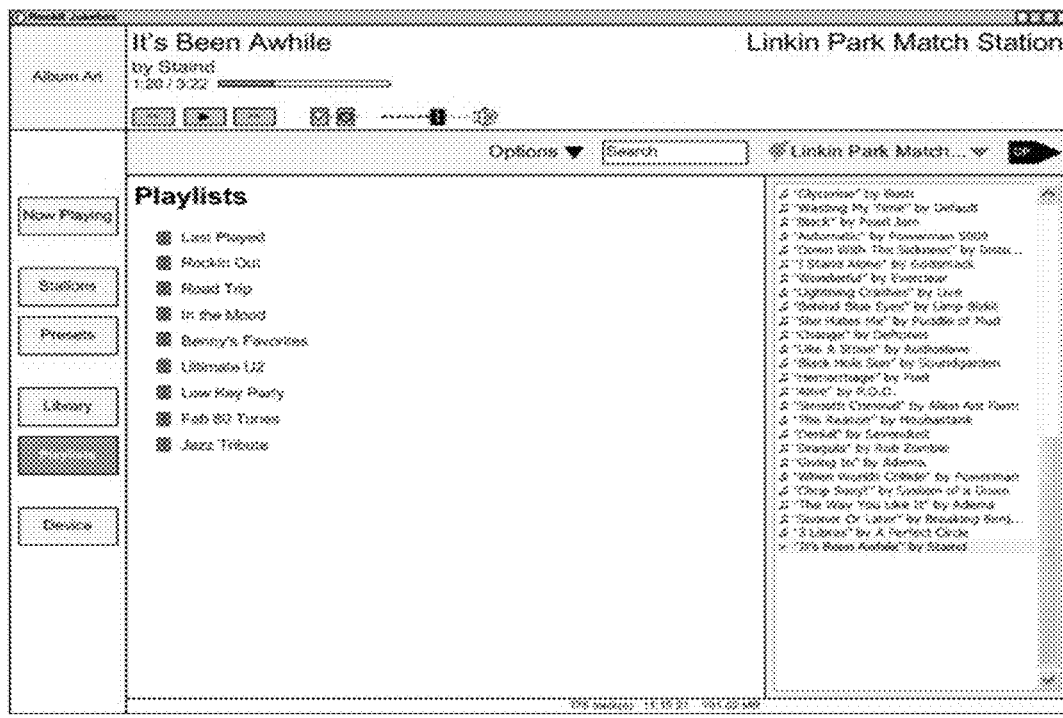

One aspect of the present invention relates to creation, storage, maintenance, editing and display of playlists. A personal device 100 may include one or more modules providing playlist functionality, and the device may be configured to create, store, maintain and play one or more playlists of media content based on user preferences. The device may be configured to have a "current playlist" either active or pending, from which content will be delivered based on user inputs. The current playlist may be one playlist selected from a selection of playlists stored on the device. In addition, the device may be configured to tag the current playlist as a "last playlist" when switching from device operating modes such as from now playing or library modes to a radio mode, when switching from a radio mode back to now playing or library modes or when a user clears the current playlist and starts another playlist. FIGS. 5A and 5B illustrated embodiments of playlist display screens for a portable device embodiment, and FIG. 5C illustrates an analogous screen display 500c for a jukebox embodiment.

FIG. 5A shows a playlist screen 500A with a list of available playlists, and FIG. 5B shows a playlist screen 500B with a contextual player. As shown with respect to FIG. 5, a device may be configured to display a playlist of media content and allow a user to select a particular playlist 510 for playback, at which time a contextual player may be displayed in part of the screen such as in a window at the top or bottom of the screen. The device may include a playlist options menu whereby a user may select various playlist features as detailed below in TABLE 3.

TABLE 3

Playlist Options

| Option Level 1 | Option Level 2 | Description |
| --- | --- | --- |
| Play | — | Plays the highlighted playlist based on either a single or double click. |
| Delete | — | Deletes a playlist from the device. The tracks themselves are not deleted from the Library. |
| Save Playlist | — | Saves the content in the Current Playlist as a playlist. If the playlist is a saved playlist, then it saves the changes to the playlist. |
| Rename | — | Rename the playlist. |

In some embodiments a personal device 100 may be configured to include modules allowing a user to create a library of media content and create playlists from content stored in a library as described previously. In some embodiments, the personal device 100 may be configured to allow users to transfer content such from a separate device or application, such as by transferring a playlist from a jukebox or web based application to a separate portable device, to then be included in the portable device's playlist or library. A device may be configured to allow users to create and save a playlist via a data menu 400 as shown in FIG. 4. For example, users may add content to a current playlist then name and save the playlist by selecting from an options menu. The personal device 100 may then list the saved playlist by name or identification number in playlists screens as shown in FIG. 5. In some embodiments the playlists way be numbered sequentially by default (i.e. Playlist 1, Playlist 2, etc.) when new playlist is entered. The personal device 100 may also be configured to allow users to rename a playlist. This may be done by providing a screen to allow the user to scroll to a desired playlist and select a rename option, wherein the personal device 100 then displays a text entry screen with a blank box in a manner similar to that shown in FIG. 4. The user may then enter text to create the playlist.

The personal device 100 may also be configured to allow the user to edit an already created playlist. This may be done by, for example, providing a screen on the personal device 100 to allow the user to scroll to a playlist, then click to enter the playlist. At this point, the user may then add, remove or move tracks within the playlist as described below in the features shown in TABLE 4. To complete the process, the user may then be provided with a menu option to save and name the edited playlist. In some embodiments a personal device 100 may also be configured to allow a user to combine two or more playlists by selecting the playlists to be combined and then electing a menu option effecting a combination of the selected playlists.

TABLE 4

Playlist Options

| Option Level 1 | Option Level 2 | Description |
| --- | --- | --- |
| Choose View | Playlist<br>Large Album Art<br>Artist<br>Visualization | Various formats/layouts for the Now Playing screen. |
| Clear Playlist | — | Clears the current playlist screen. If the device is playing a track this action stops the play of that track. |
| Save Playlist | — | Saves the content in the Current Playlist window as a playlist. |
| Shuffle Playlist | — | Shuffles the current playlist order |
| Play Last Playlist | — | Plays the last set of content in the Current Playlist. If there is any content in Current Playlist, it clears the content before loading the last set. |
| Repeat on/off | — | Toggle button<br>On state: When playlist ends, device plays it again from the top.<br>Off state: When playlist ends, device does not play any more tracks. |
| Add to Presets | — | Adds current radio station to Presets page. This option is disabled when the user is playing local content. |
| Reorder Track | — | Enables users to move tracks up or down the current playlist. This is disabled if the user is playing a radio station. |
| Remove Track | — | Removes the track from the Current Playlist. |

TABLE 4 lists some exemplary playlist related options that may be provided by personal device 100 modules as user menus and displays and may be controlled via the previously described personal device 100 controls.

In some embodiments, the personal device 100 may also be configured with one or more Now Playing menu screens as shown in FIG. 6. Now Playing menu screens may include a playlist view 600A (6A), a large album art view 600B (6B), an artist view 600C (6C), a visualization view 600D (6D) and/or a view combining features of these displays with other related features showing information and/or graphics related to the currently playing or pending media content. In some embodiments, playlist editing options as shown in TABLE 4 may be accessible through an option provided in a Now Playing menu screen.

Playlist related features as shown in TABLE 4 may be implemented in the personal device 100 by providing modules in conjunction with interactive menus and functions related to user selection of playlist options. For example, in some embodiments, a personal device 100 may be configured to allow a user to remove a track from the current playlist by selecting the track and then selecting a track delete menu option, whereupon the track may be removed from the playlist (but not removed from the library). A personal device 100 may also be configured to allow users to reorder tracks by first selecting a track and then providing a menu option to allow the user to move a track up or down in the playlist. Playlist order may also be changed by a shuffle task. A shuffle task may be implemented by configuring the personal device 100 to randomly rearrange the playback order of tracks of media content within the playlist and then display and play the content based on the re-ordered playlist.

The personal device 100 may also be configured to efficiently perform other playlist related operations. For example, in one embodiment a menu screen may be provided that allows a user to combine playlists by selecting two or more playlists and then selecting a menu option to combine them. In addition, a menu option may be provided to single click to clear an old playlist, and then play a newly selected or next in sequence playlist in a new window. In some embodiments playlists may be transferred from an application version of the present invention to a device version, such as by transferring a playlist from a jukebox application to a portable device so that the portable device contains the same playlist information. In some embodiments the transfer may also be effected in the opposite direction.

Figure 14:
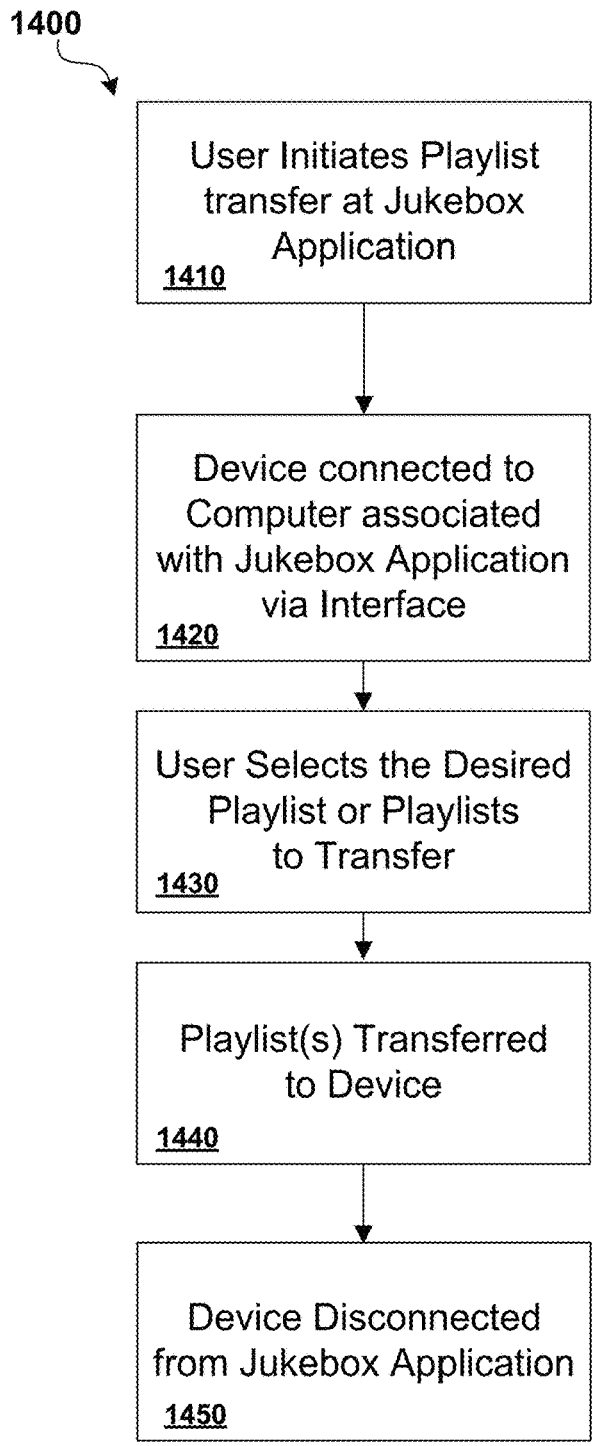
FIG. 14 in an illustration of an embodiment of a Playlist transfer process in accordance with aspects of the present invention.
Figure 15:
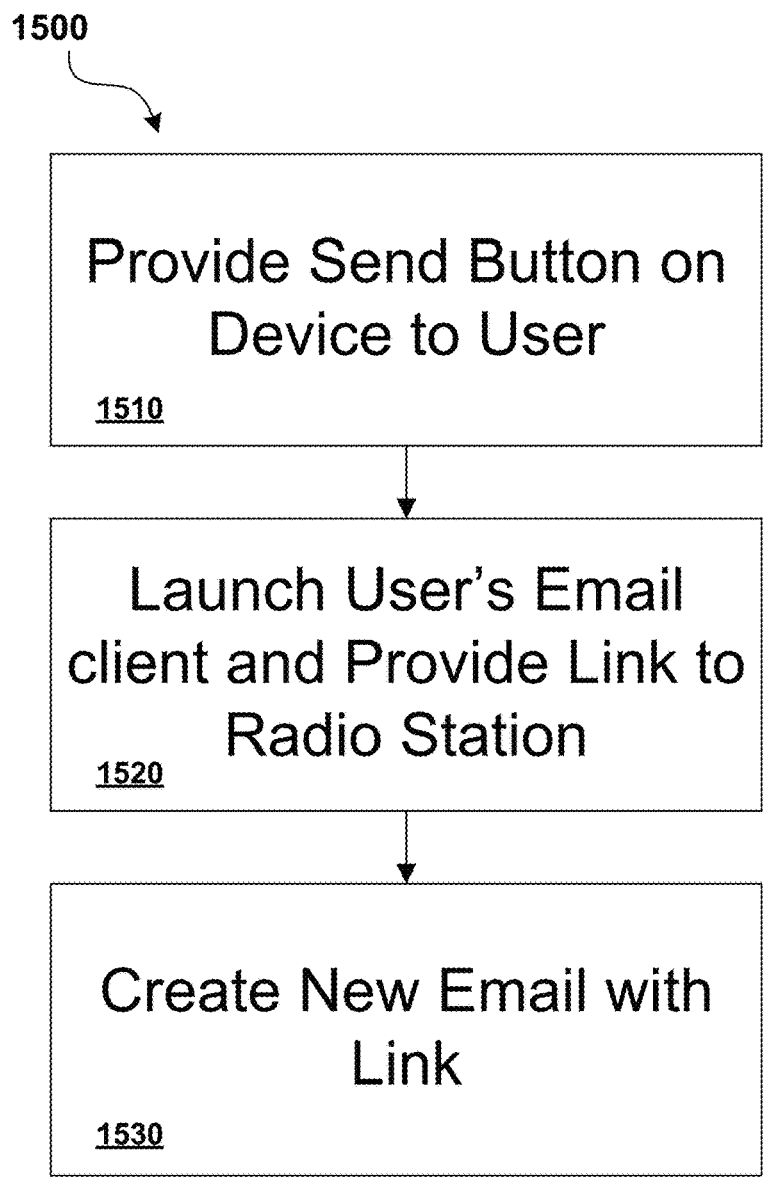
FIG. 15 is an illustration of an embodiment of a Station send process in accordance with aspects of the present invention.

FIG. 14 illustrates a process 1400 for transferring a playlist from a web player or jukebox application to a portable device. At state 1410 a user initiates playlist transfer by selecting a playlist transfer option. This may be done by navigating to a playlists screen such as is shown in FIG. 5d and selecting a playlist transfer option (not shown). A portable device may then be connected to the computer on which the jukebox application is running at stage 1420, such as via a USB interface or other wired or wireless interface. The user may then be provided a list of playlists to transfer and may prompt the user to select one or more of the playlists to transfer to the device at stage 1430. The playlists may then be transferred to the device at stage 1440 and the device then disconnected from the jukebox application and/or associated computer at stage 1450.

Radio Station Modes

In some embodiments a Personal device 100 may include radio station features implemented with one or more modules including modules configured to select, provide, receive, store, arrange, display, play or otherwise process content such as music as well as related text, graphics, images, or video. In one embodiment, radio features may include one or more predefined radio stations based on particular music formats such as country, classic rock, top 40 or other musical classifications including those described and illustrated herein. Content associated with the predefined radio stations may be provided by a radio service such as system 5200 as shown in FIG. 52. Radio stations may also be created and customized by users as is further described below. In some embodiments operation of the radio station features may be coordinated with a remote system, such as remote system 5200 described previously herein, to, remotely select and provide customized radio station content, particularly in web player or jukebox embodiments. This may be done by creating, managing and storing one or more user profiles, including station customization information, on a profile database 5210 on the remote system 5200, and selecting and providing corresponding content in conjunction with a content sequencer such as content sequencer 5304.

Figure 8D:
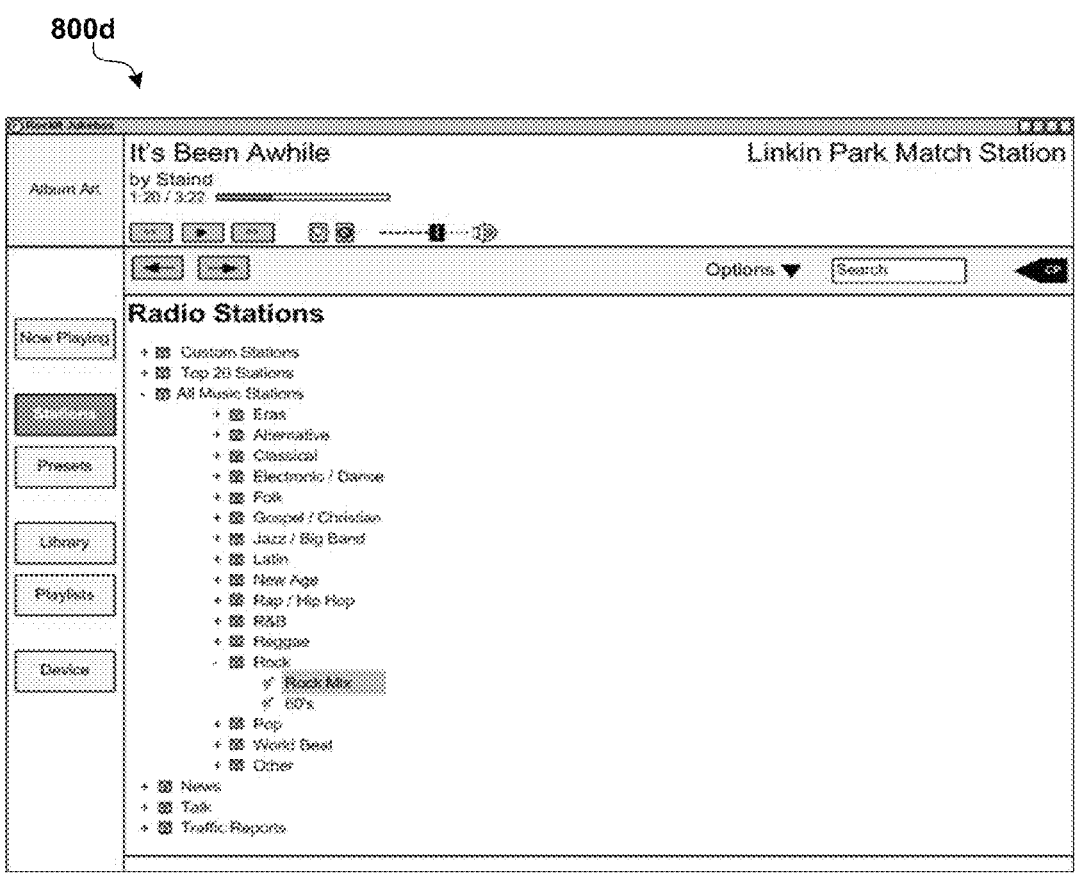
Figure 8E:
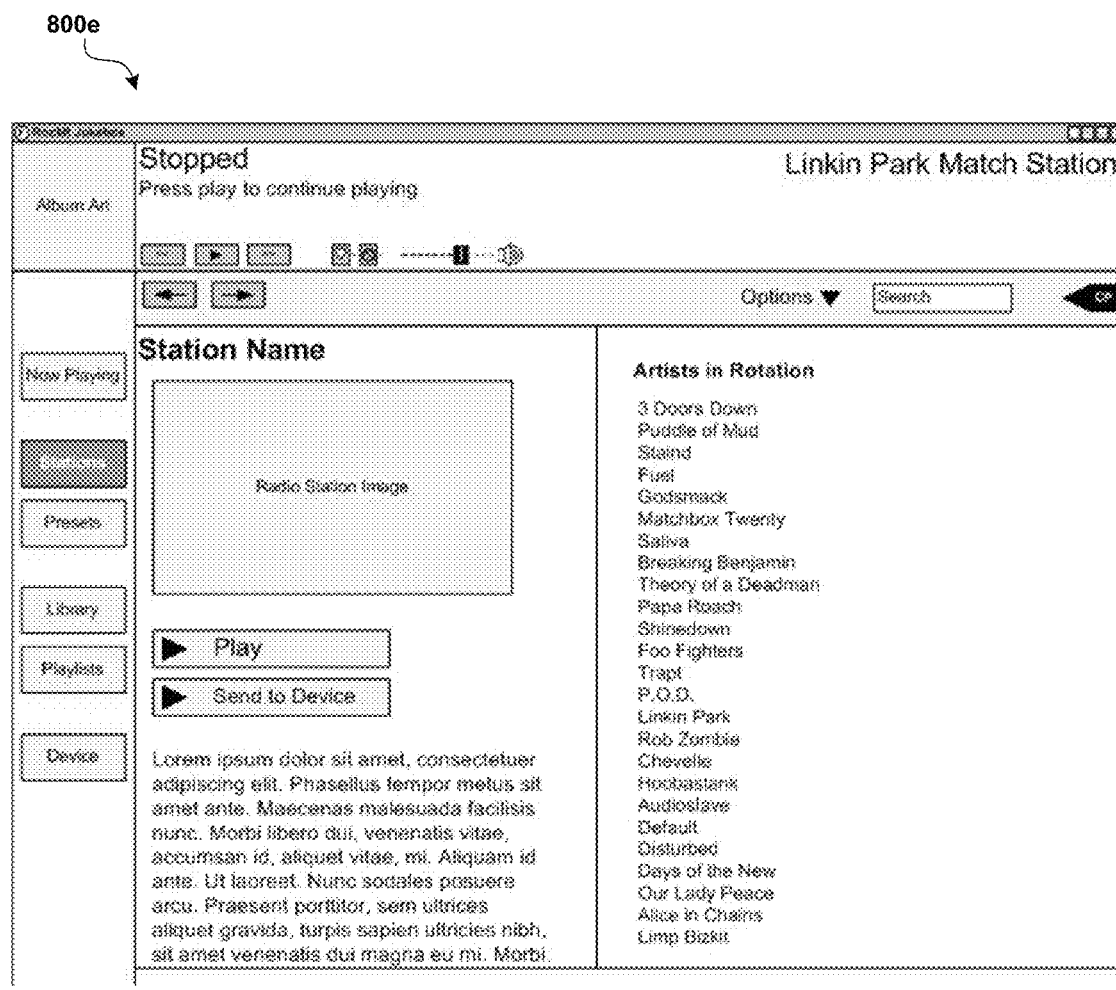

FIG. 8 illustrates some embodiments of representative display screens associated with radio station features and functions. FIG. 8A shows one form of menu screen 800A displaying a selection of radio stations a user may choose from for playback on the personal device 100. A personal device 100 may be configured to allow a user to navigate a menu such as the menu shown in 8A and select a particular station by clicking on the associated highlighted icon. FIG. 8B illustrates a similar screen 800B wherein a radio station has been selected and a contextual player is displayed at the top of the screen with information on the track currently playing on the selected station. FIG. 8D is a screen capture of one embodiment of a radio station main screen 800d implemented in a jukebox application embodiment, and FIG. 8E is an embodiment of a radio station display screen 800e in a jukebox application showing station details.

A personal device 100 may be configured so that content playback in a radio station mode may be effected by controls similar to those implemented with respect to a playlist. However, in some embodiments where a personal device 100 is operating in a radio station mode some user options may be limited as compared to when the personal device 100 is operating in playlist modes due to copyright or licensing prohibitions. For example, a personal device 100 may be configured so that in radio mode a user may be prevented from doing one or more of the following functions: skipping to a previously played track; scrubbing backward in the currently playing track; or pausing a track.

In some embodiments, a personal device 100 may be configured to display news talk radio stations as well as one or more traffic stations. FIG. 8C illustrates two display screens 800C associated with a traffic station embodiment. A personal device 100 may be configured as shown on the left screen in 8C to allow selection of one or more traffic stations within the stations menu. In general, radio stations will be displayed on the top menu; however, traffic stations may be shown in a lower level based on regional folders or submenus. This allows for grouping of regional stations based on various parameters such as freeways, zones, etc., and creation of different folders for each region (such as the San Diego, Calif. region as shown in 8C).

A personal device 100 may be configured so that individual stations within each region may be denoted as corridors. Each corridor may have its own audio clip and/or regional map so that when a user selects a corridor the personal device 100 plays the associated audio clip and/or displays the regional traffic map as shown in 8C. In some embodiments the audio clip will stop upon completion until being re-initialized by the user, whereas in other embodiment the audio clip may cycle for a fixed time period. In addition, the map display may be retained upon completion of the audio clip until the user presses the back button or otherwise selects another screen. Because traffic reports are only valid for a limited period of time, the personal device 100 may be configured to allow playback of audio clips associated with particular corridors and time periods for only a limited time. If the limited time has been exceeded, the personal device 100 may provide a message to the user indicating that the information is no longer up to date, or the personal device 100 may retrieve updated information for playback if new information is available.

TABLE 5 below lists some additional features and functions associated with some embodiments of a personal device 100 radio function.

TABLE 5

Radio Options

| Option Level 1 | Description |
| --- | --- |
| Play Station | Plays the selected station |
| Add to Presets | Adds station to Presets list |
| Edit Station | Display sliders to edit the tracks played on the station. |
| Mix This Station with Current Station | Adds the station described in the station (or artist) page as an influencer to the station in the Current Playlist. |
| View Station Manager | Display a screen where users can delete stations from device. |
| Synch Now | Tells the device to connect to the network and synch content. |
| Turn DJ's on/off | Toggle switch to play the DJ or suppress the DJ on music stations. |

In addition to providing basic radio station playback, a personal device 100 may be configured to provide enhanced features such as DJ toggle, station editing, and deletion and storing station presets.

In some embodiments a station may include content from a disc jockey (DJ) such as voice or other commentary in addition to or between playback of music or other content. The DJ content will typically be provided in addition to media content such as audio and/or video tracks and/or associated data or other content. Personal device 100 may be configured to provide a menu option allowing the user to toggle the DJ content on or off based on a user's preference. When the DJ toggle menu option is set to the off position, the personal device 100 will be configured to blank or otherwise remove the DJ content from the transmission so that only music or other content is heard. Alternately, when the DJ option is turned on the personal device 100 will be configured to include the DJ content portion of the transmission with the other media content provided.

In some embodiments a personal device 100 may include menu options to allow a user to edit a station based on parameters such as those shown in FIG. 9. FIG. 9A shows one embodiment of an edit station screen 900A, wherein the personal device 100 may be configured to allow the user to edit station parameters to tailor the station's delivered content to a user's preferences, with an "auto" option set as the default value. As described in the related applications, and in particular in U.S. Utility patent application Ser. Nos. 11/955,299 and 11/923,573, metadata may be provided to personal device 100 along with content, with the metadata identifying one or more parameters related to characteristics of the associated content. These parameters can be used by personal device 100 to customize radio stations as is described in further detail in the related applications. In applications where the provided content is audio content such as music tracks, the parameters used for customization may include content criteria such as energy level, popularity, year, favorites or other parameters associated with particular track characteristics. Alternately, in some embodiments customized station content may be managed by a remote system, such as system 5200 described previously, in conjunction with one or more user profiles. The user customized content may then be provided to the web player or jukebox application based on content selection based on the user profile. The user profile may be created and modified in conjunction with the customized station creation and editing user interface controls further described below.

For example, in one embodiment a personal device 100 may provide controls to allow a user to influence a station's content selections by choosing from an energy level based on tempo, beat and rhythm by choosing one of a selected set of values such as; maximum, more, auto, less. Likewise, a popularity level may be provided based on how well known the particular content is with selection options such as; hits, familiar, auto, unfamiliar, fringe. A year of release preference may also be specified based on whether the song is a current release, a classic (mostly older songs or songs released at the beginning of an era) or something in between. Choices for the year menu option may includes; current, recent, auto, older, classic. A menu option may also be provided to allow users to select songs from their favorites list more often with selection options including; maximum, more, auto.

Figure 9A:
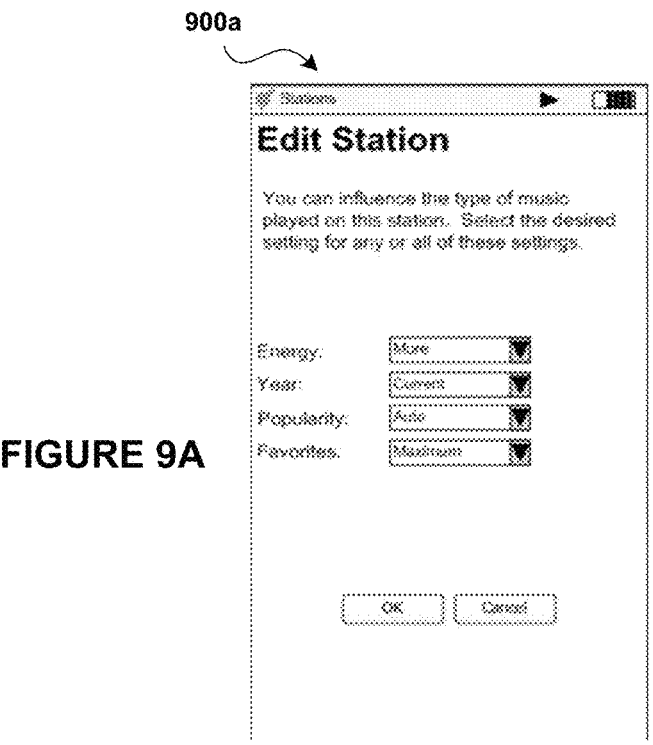
FIGS. 9A-9E are illustrations of embodiments of Radio Station management screens in accordance with aspects of the present invention.
Figure 9B:
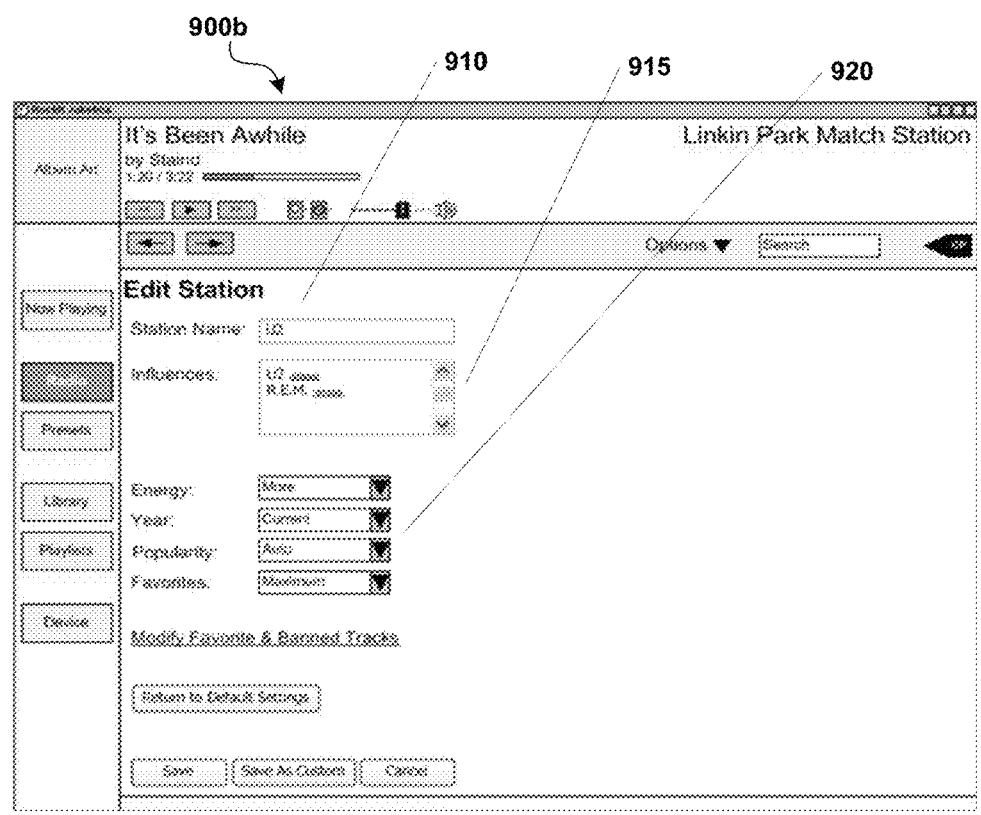
Figure 9C:
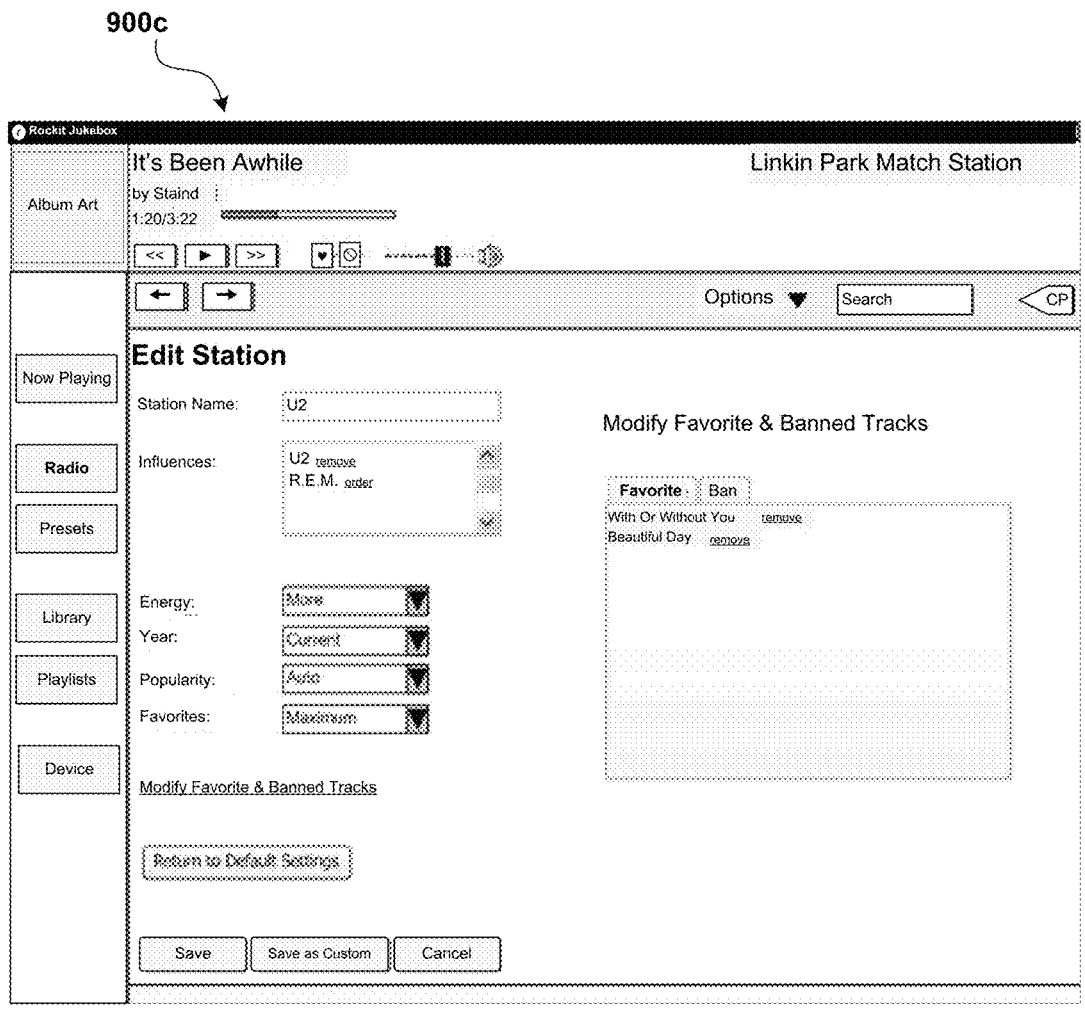

FIG. 9B illustrates another embodiment of an edit station screen 900b in accordance with a web player or jukebox embodiment. Edit screen 900b may include station name option field 910 allowing the user to fill in a customized or other identifier for the station, and then store the station and associated information in a user profile for use in content playback as illustrated elsewhere. Edit screen 900b may also include an attribute options field 915 allowing users to set influences to adjust preferences for the station such as based on a favorite artist or artists, genres, or other criteria. Edit screen 900b may further include a set of pulldown menus, sliders, or other controls 920 to allow the user to set one or more influences for the customized station, as well as a set of pull down choices or other similar controls allowing the user to select customization parameters as described above. For example, screen 900b may provide selections based on energy level, year, popularity, quantity of favorites in playback or based on other criteria such as particular artists or genres.

In some embodiments a personal device 100 may be configured to allow the user to mix one or more stations to create a composite station or have the current station influence the radio station in the current playlist. For example, mixing process according to one embodiment may be implemented as follows: a user is provided with a menu option in a station selection menu to mix the selected station with the current station at stage. The personal device 100 generates a message indicating that the station is being mixed; and, once mixed, the personal device 100 begins to play the mixed station and the mixed station name is added to the stations list.

In some embodiments the personal device 100 may be configured to provide for exception handling when the user attempts to improperly mix stations based on allowed mixing criteria. Some potential exceptions conditions and personal device 100 responses may include; 1) station is already mixed into the current station—in this case the personal device 100 displays a message indicating the station has already been fixed and/or provides a user option to mix another station with the current station; 2) station is the currently playing station—in this case the personal device 100 displays a message stating the station is the same as the station currently playing and/or provides a user option to mix in another station with the current station; 3) no station in the current playlist—in this case the personal device 100 adds the station to the current station playlist and begins playing the station, and the personal device 100 may provide a user message indicating that the station has been added to the current playlist and/or provide a user option prompting the user to mix in another station with the currently playing station.

Figure 9D:
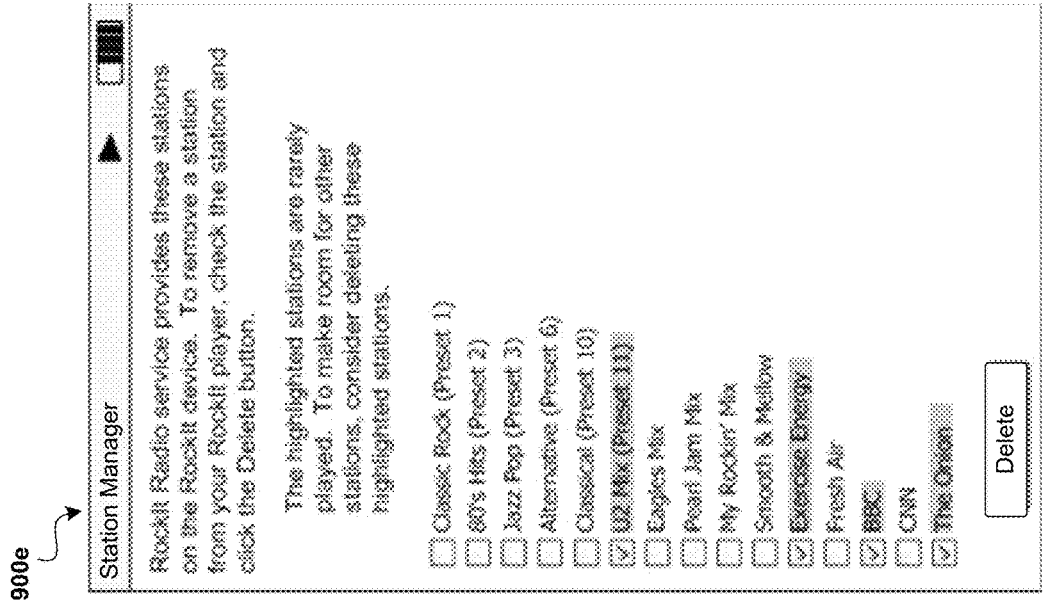

In some embodiments a personal device 100 may include a station manager function and associated display screens and menus 900d as shown in FIG. 9D. A personal device 100 may be configured to allow a user to select the station manager function, wherein a display screen is provided allowing the user to see a list of radio stations and delete one or more stations from the personal device 100. In some exemplary embodiments the stations are listed in order of presets first, then stations selected by the user by pressing a send to device option, whereby the stations selected are listed in chronological order with the most recent selection at the bottom of the list. The personal device 100 may also be configured to allow a user to select a station by checking a box or other indicator associated with the station and then actuating a delete button to remove the station. In some embodiments the personal device 100 may be configured to interface with other personal devices 100, and/or applications such as a web player or jukebox application, to download stations and/or synchronize the personal device 100 with content selections or preferences made on the other device or application.

Figure 9E:
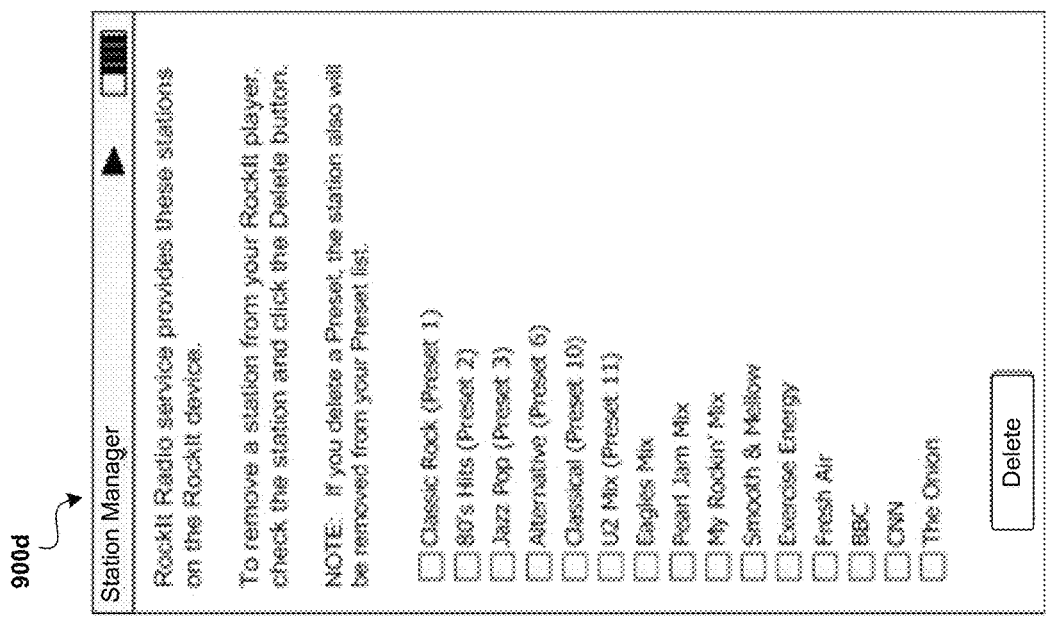

Because the personal device 100 will inherently have a finite amount of memory, in some embodiments the personal device 100 will be configured to respond to conditions where the memory is full and no additional stations can be stored. In this case, the personal device 100 may prompt the user with a message such as "The device ran out of room, could not add or refresh X stations, and you must delete other stations to make room for the new stations or additional content." To make room for addition stations the personal device 100 may then allow a user to delete stations as shown in FIG. 9E. As shown in FIG. 9E, the personal device 100 may provide user options and menus 900e in the station manager to delete stations based on those least or rarely used. Such a screen may provide a display of stations rarely used with those rarely used highlighted and/or selected as shown in display 900e. The personal device 100 may then allow the user to delete the selected stations, or remove one or more of the selected stations from deletion pending status by unchecking the selected box.

In some embodiments a personal device 100 may be configured to provide a menu screen allowing a user to send a station or stations to others, such as through email. For example, in a web player or jukebox embodiment a user may be provided with send functionality as further illustrated in by process 1500 as shown in FIG. At stage 1510 the user is provided with a send button or similar selection option to initiate sending of the desired station or stations. If the user selects this button the web player or jukebox may open a new email in the user's email client application at stage 1520 and generate and add a link to the email referencing the desired radio station. The user's email client may then open a new email including link to the radio station featured in the content area at stage 1530. From the email client the user may fill in the desired email address and/or any other information and send the email, including the link, to the desired recipient.

Presets

A Personal device 100 may include modules to implement features and functions related to presets. For example, a personal device 100 may be configured to allow a user to add a radio station to a presets list, where the presets list stations may be mapped to buttons or functions on related components such as preset buttons on a car docking station, home docking station, or other type of device docking station. FIG. 10 illustrates some embodiments of display screens and functions associated with preset functionality. As shown in FIG. 10A, a presets list screen 1000A may include a sequence of numerically ordered buttons or stations that can have radio stations mapped to them. For example, as shown in FIG. 10A, a station entitled "70's Hits" may be mapped to preset button station entitled "Adult Alternative" is mapped to preset 2, etc. If no station has been trapped to a preset the display may indicate that the preset is empty by including a phrase such as "Empty" with the station and/or lightening or otherwise modifying the appearance of the text or symbol of the associated station as shown in FIG. 10A. In some embodiments, only radio stations, and not playlists, can be mapped to presets. In some embodiments a personal device 100 may be configured to include twelve available presets as shown in 10A; however, other preset configurations are possible and envisioned in alternate embodiments.

A personal device 100 may also include a display screen 1000B as shown in FIG. 10B, wherein a contextual player is included at the top or bottom of the presets list displaying information about the currently playing station and track as previously described. In some embodiments users may be able to add presets in one or more display menus similar to those shown in FIG. 10A; however, in some exemplary embodiments a user cannot add presets on a screen such as is shown in FIG. 10A, but rather presets are added during a synchronization process with a web player or jukebox application. Alternately, a personal device 100 may be configured so that a user may add presets from a menu associated with a radio display screen such as the screen shown in FIG. 8, where the personal device 100 provides a menu option to allow a user to select a particular radio station from the list of stations and then select an option to add the station to the next available preset position or slot. The personal device 100 may also generate and display a confirmation message if a slot is available, or an error message if no additional presets are available.

A personal device 100 may include additional functions related to presets as shown below in Table 6.

TABLE 6

| Presets Options | |
| --- | --- |
| Option Level 1 | Description |
| Reorder Preset | Allows a user to move preset up or down the list. |
| Clear Preset | Deletes selected station from Presets. Does not delete the station from the device. |
| View Station Manager | Display a screen where users can delete stations from device. |
| Turn DJ's on/off | Toggle switch to play the DJ or suppress the DJ on music stations. |

In some embodiments a personal device 100 may be configured to allow a user to clear a preset from the presets list by selecting a menu option providing a clear function. If the clear function is actuated the station will be removed from the presets lists but not from the personal device 100 itself. A personal device 100 may also include a menu option associated with presets to allow the user to toggle DJ content on and off as previously described. In addition, a personal device 100 may provide menu buttons and functions to allow a user to rearrange the order of presets within a presets list. In some embodiments, a personal device 100 may be configured to allow a user to move presets up or down within the list by selecting a station, navigating, by use of a scroll wheel, capacitive touch sensor or other navigational control, within the list, and then clicking with the wheel or touching a predefined position on the sensor to place the station in the new preset position.

Now Playing Modes

One aspect of the present invention relates to playback of content on the personal device 100. A Personal device 100 may include one or more modules providing playback functionality including Now Playing functions related to currently playing, previous and pending content. Now Playing functions may also include text, graphics, photos or other images, or video related to Now Playing content.

In some embodiments, a personal device 100 may be configured to display Now Playing screens showing the user what song is currently playing, what songs have been played, and upcoming songs in the current playlist. Now Playing functions may also include displays showing tracks that have been previously played; however, in some embodiments, such as those including radio mode functions, the display may be limited to showing one upcoming track due to licensing requirements.

Figure 6A:
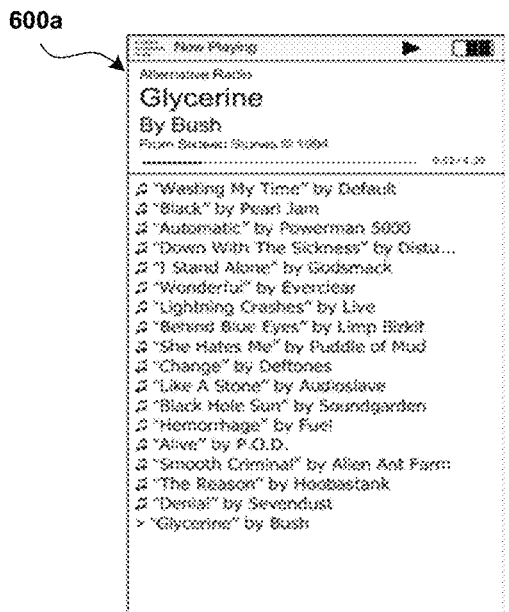
FIGS. 6A-6E are illustrations of embodiments of Now Playing screens in accordance with aspects of the present invention.
Figure 6B:
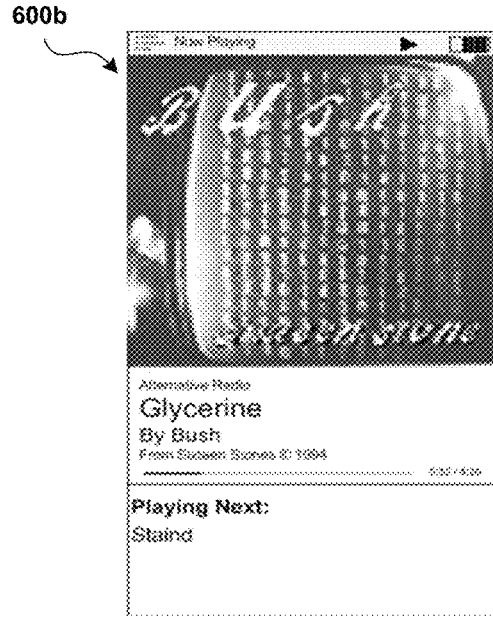
Figure 6C:

In some embodiments a personal device 100 may be configured to include four or more display screens as shown in FIG. 6, including a Playlist view 600*a* as shown 6A, a Large Album Art view 600*b* as shown in FIG. 6B, an Artist view 600*c* as shown in FIG. 6C and a Visualization view 600*d* as shown in 6D. The personal device 100 may allow the user to select the desired view from an options list with Playlist view selected as the default view. Depending on the view selected, the personal device 100 may display one or more items of the following information; current track; artist; album, album artwork; elapsed track time; total track time; copyright information; data; and other operational and content related information. If a user skips forward or backward while viewing a Now Playing screen, the personal device 100 may update the screen to reflect the associated changes. For example, a Now Playing indicator may be displayed adjacent to the track to which the user has skipped. When playback of the track is complete, the personal device 100 may then play the next track in the list. If a user scrolls through the list, a highlight bar may be placed on the track to which the user has scrolled indicating the currently selectable track. If a user previews a track by, for example, actuating a single click with a scroll wheel as previously described, the personal device 100 may perform some or all of the following functions: displaying; the previewed track in the metadata at the top of the Now Playing screen; blanking or not displaying the previewed track at the bottom of the screen; clearing all tracks from the currently playing indicator; and maintaining the highlight bar at the same position where it was displayed before the user previewed the track. When the previewed track ends, the personal device 100 may continue operation as shown, for example, in the flowchart in FIG. 3. In certain embodiments some of this functionality may be limited for radio station operation due to DMCA or other regulations or licensing requirements.

In some exemplary embodiments the personal device 100 may be configured so that when a user views the Playlist Now Playing view the personal device 100 displays all of the tracks that it has played. The personal device 100 may also display a "current track" icon next to the track that is currently playing or paused. Further, if the personal device 100 is playing local content it may also display upcoming tracks. If nothing is current playing, the personal device 100 may display a current track icon next to the track to be played upon actuation of the play button.

In some embodiments the personal device 100 may be configured with a repeat or replay function allowing the user to select to repeat the current playlist. If the repeat function is enabled the personal device 100 will continuously repeat playback of the current playlist at the beginning of the list upon completion of playback of all tracks in the playlist. If the repeat function is disabled and the last track in the current playlist ends, the personal device 100 may stop playing content and display one or more screens as further described below. The personal device 100 may also display a current track icon or other indicator next to the first track in the current playlist, herein the indicated track may then be played if a user actuates the play button.

In some embodiments a personal device 100 may be configured with an options menu accessible by pressing an options button such as options button 122 as shown in FIG. 1. The personal device 100 may further allow the user to dismiss the menu by selecting a menu item or clicking the options button a second time. In some exemplary embodiments Now Playing menu options may include one or more of the options shown previously in TABLE 4.

As described in TABLE 4, the personal device 100 may include a remove track function to remove a selected track from the current playlist without deleting the track from the library. The remove track function may be further configured so that if a user is playing a saved playlist and removes a track from this playlist the track is permanently removed from the saved playlist, without the user being required to select a save playlist option to change. A personal device 100 may also include a reorder track function to enable users to reorder the tracks within the current playlist. The reorder track function may be configured to allow a user to move items up or down within a playlist as previously described. In some embodiments this function may be disabled if the personal device 100 is playing content in a radio station mode, wherein content provided in a radio station mode may not be rearrangeable. A personal device 100 may also include a shuffle function configured to allow a user to reorder the playlist before playing content in the playlist. A Now Playing view may also configured to update the displayed screen to reflect the order of content in the reordered playlist.

As described previously, a personal device 100 may be configured to display one or more views or screens associated with the Now Playing functions. Some embodiments of these views are described in further detail below.

Figure 6D:
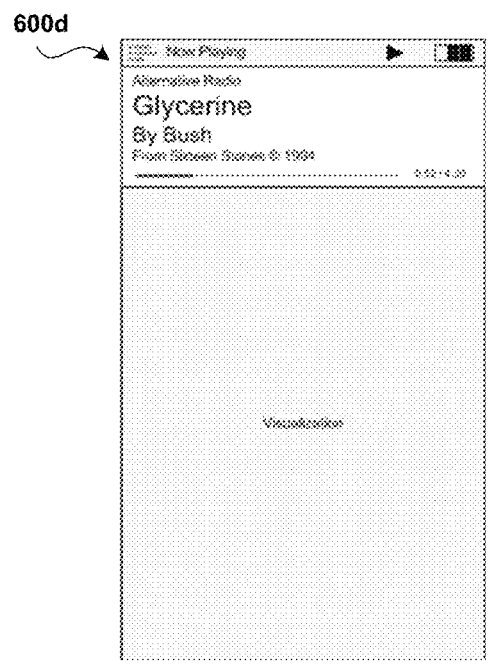

A personal device 100 may include a Playlist view 600*a* as shown in FIG. 6A showing a list of currently playing tracks. In some embodiments the personal device 100 may only display the track name, not the artist name. The Playlist view may display the longest version of the track information because the screen in this mode may not require any room for album art or other images, text or graphics. A personal device 100 may also include a Large Album Art view 600*b* as shown in FIG. 6B. The Large Album Art plays an album cover associated with the current track, and may also include metadata for the current track and the upcoming track and/or artist. If the personal device 100 is playing local content it may also be configured to display the name of the upcoming track as shown at the bottom of display 600*b* shown in FIG. 6B. A personal device 100 may include an Artist view 600*c* as shown in FIG. 6C. The Artist view may include a photo or other image or graphic of the artist as well as text and/or images displaying biographical or other information about the artist. A personal device 100 may also include a Visualization view 600*d* as shown in FIG. 6D. The Visualization view may display a large visualization beneath the current track metadata. In some embodiments the personal device 100 may be configured so that the Visualization view takes up the entire content area so that the personal device 100 does not display as upcoming and/or previous track information, and only displays information associated with the current track. In some views, however, the Visualization component the display screen may be limited such as is shown in FIG. 6D to allow users to see metadata associated with the current track in a Contextual Player in addition to the visualization.

In some embodiments a user may select the Visualization view mode with an options button as previously described. In some exemplary embodiments, visualization views may include one or more of the following options as shown below in Table 7.

TABLE 7

Visualization View Options

| Option Level 1 | Options Level 2 | Description |
| --- | --- | --- |
| Next Visualization | | The device displays the next visualization. The users cycle through the choices. |
| Auto drive | — | Automatically cycles through visualizations |
| Full Screen On/Off | — | On: Visualization covers the entire screen so users do not see any track metadata. Off: Visualization covers 80% of the screen so users see metadata. This version is represented in FIG. 6D. |

Figure 6E:
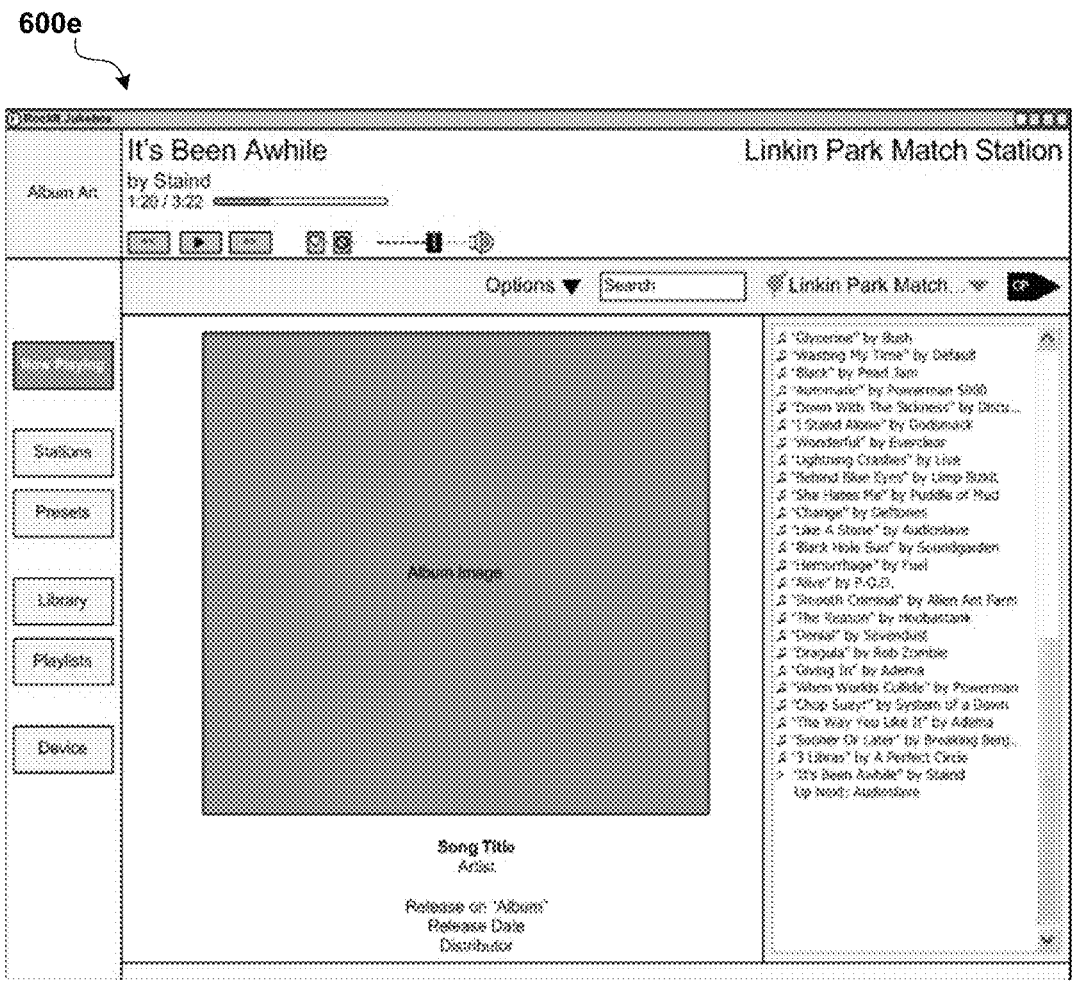

Similar views and functionality may be provided in web or jukebox applications. For example, FIG. 6E illustrates a corresponding large album art view 600e for a jukebox application.

In some embodiments a personal device 100 may be configured so that the personal device 100 automatically begins content playback from the point at which content was stopped at the end of the previous playback session. In addition, in normal operation a personal device 100 may be configured so that it will be in either a playback mode or a paused mode. In some embodiments, however, the personal device 100 may be configured to provide "stopped" states, as further described below, associated with local content. The stopped states described below will not generally be associated with radio modes because radio modes will typically be configured to always be in either a play or paused state, not a stopped state.

Figures 11A, 11B:
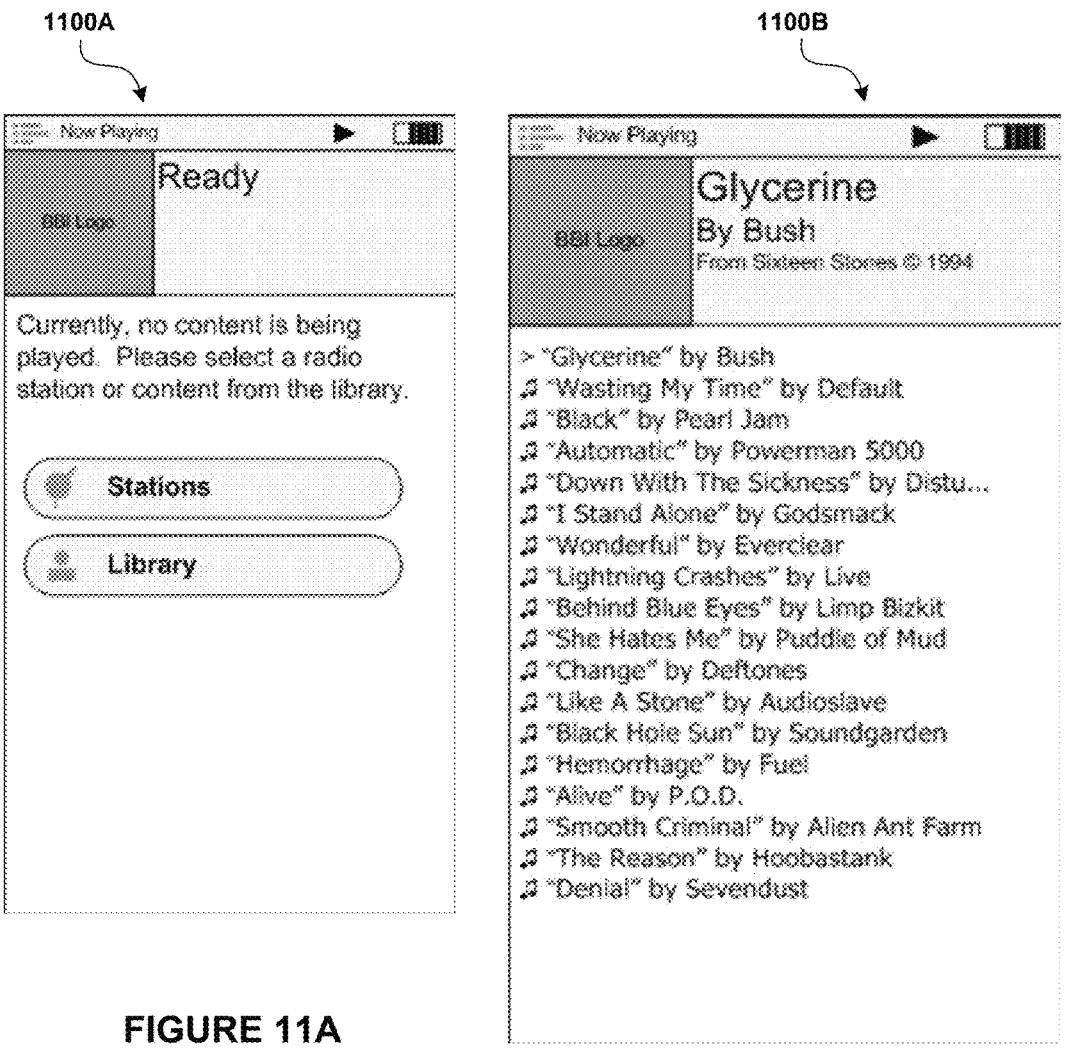
FIGS. 11A and 11B are illustrations of embodiments of stopped state screens in accordance with aspects of the present invention.

In some embodiments a personal device 100 may be configured with two stopped states; one associated with the current playlist being cleared of content and one associated with termination of playback in the current playlist without a repeat or replay function being enabled. In the first scenario, a personal device 100 may be configured so that all track from the current playlist are cleared, rendering the current playlist empty and putting the personal device 100 in a stopped state. This state may be entered, for example, by the user clearing all tracks from the current playlist as described previously and not adding any new tracks. In response, the personal device 100 may provide an indication, such as display of a message screen 1100A as shown in FIG. 11A, indicating that no content is currently being played. As shown in FIG. 11A, the personal device 100 may also provide a screen that advises a user to either select a radio station or content played from the personal device 100 library, along with associated buttons or other menu options allowing the user to select one of the available options.

In the second scenario, a personal device 100 may enter a stopped state by completing playback of a currently selected playlist and not having a repeat or replay function enabled. This may occur by, for example, a user turning off the repeat function as previously described and allowing the personal device 100 to complete playback of the current playlist. Once the personal device 100 has completed playback of the last track in the current playlist the personal device 100 may display a current indicator icon next to the first track in the current playlist, as shown in message screen 1100B in FIG. 11B. In this state the personal device 100 will not, however, play the indicated track until a user selects a play function to restart playback of the displayed playlist. As shown in FIG. 11B, the personal device 100 may also display the content for the indicated track in the Now Playing screen. The personal device 100 may also display a time indicator in the metadata section that indicates total and elapsed time in a form such as "0:00/0:00."

Details of Exemplary Embodiments of Web Player and Jukebox Applications

Details of exemplary embodiments of web player and jukebox (standalone application) GUI features and functionality are further described below. While the functionality described below may be described specifically in terms of a web player or jukebox embodiment, unless noted otherwise, similar functionality may also be provided on the alternate embodiment. The features and functionality described as follow may be facilitated by a user profile including user customized information related to tracks, artists, stations, and other user customizable criteria, with the user profile configured conjunction with the user interface described below. The user profile may be stored on the web browser jukebox application hosting computer and/or on a remote system associated with a radio service, as was described previously. Likewise, functionality associated with user customizable content criteria may be managed by the remote system. In these embodiments, one or components of the user customization functionality may be based on a user profile stored on the remote system, such as remote system 5200, with remote selection of user customized content based on a user profile stored on a profile database 5210 and selected by a content sequencer 5304. It is noted that below described features and functionality are described with respect to some embodiments, other embodiments having other and/or different features and functions may also be provided within the spirit and scope of the present invention.

Figure 16:
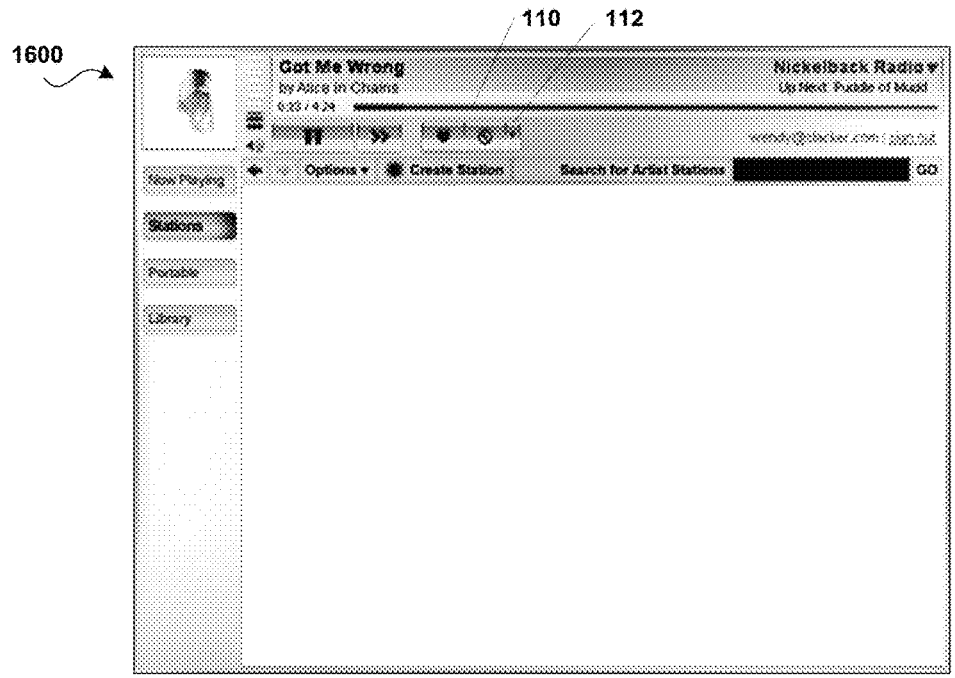
FIG. 16 is an illustration of an embodiment of a web based control function screen in accordance with aspects of the present invention.

FIG. 16 illustrates a screenshot 1600 of an exemplary configuration of web player. The web player displays standard music transport controls including play/pause, skip forward, and volume. In addition, there is a favorites button 110 that enable users to indicate if they like (heart or favorite) a track and a ban button 112 to allow a racer to indicate that they dislike (wish to ban) the track. The Play/Pause button is configured as a toggle button. It displays the play icon during playback while at other times it displays the pause icon.

The Play icon is displayed when no station is being played while the Pause icon is displayed when the web player is playing a radio station. If a radio track or library track is paused, then the web player resumes playing the track from where the track was paused when the play button is actuated if a station is listed but not playing, then pressing the play button plays the station. If no station or song is in the current playlist, then the play button is disabled until a user selects a station. When a track is paused (radio or local content playback), the web player displays the text "(Paused)" after the track name.

Figure 17:
FIG. 17 is an illustration of an embodiment of next/skip forward function screen in accordance with aspects of the present invention.

Next/Skip Forward functionality may be provided to a low users to skip to the next track by pressing the Next button 127 as shown in screen shot 1700 of FIG. 17. In one embodiment, subscribers to a premium service (premium subscribers) can skip as many times as desired, whether playback is radio tracks or saved library tracks. Basic subscribers are limited to 6 skips per hour, per licensing agreements, and users cannot skip advertisements. If a user tries to skip for a 7th time, the device displays a message as shown in FIG. 17. There may also be a "don't show again" checkbox. The message can only be suppressed permanently by getting a premium level subscription. If, users click the "Get Unlimited Skipping" button as shown FIG. 17, the web player launches a browser (or displays the details in that new screen so that users can upgrade to a premium service.

In some embodiments intros and outros may be provided. Intros and outros are DJ clips about the song to be played or just played, not advertisements. Users cannot skip advertisements. If a user skips an intro, the song it introduced is also skipped. If the user has a basic subscription, skipping an intro counts towards the 6 skip limit. If a user skips an outro, the next song is played as scheduled. If a user has a basic subscription, this skip DOES NOT count toward the 6 skip limit.

When users with account level below premium skip a track, the web player displays the message "#skips left." The # is dynamic, from six to one skip left. In addition, when the users first navigate to a station, the web player displays the number of skips left. The message is displayed in the track player where the artist is displayed. The artist name is hidden. The skip limit message is displayed for a few seconds and then the artist name is displayed again. When the users run out of skips and tries to skip again (the 7th skip) the web player displays a message for 3 seconds in the track player area. This is in addition to the message box, shown in FIG. 17 showing "Skip Limit Reached" on the song line, and "Upgrade to Premium Radio and get unlimited skipping" on the artist name line. Users can click the message to learn more about premium subscriptions. The web player then launches another browser (or tab) and displays the details in that new screen. The Next (>>) button is never disabled when a station is playing, even if the user runs out of skips.

In accordance with some embodiments, when there is content in the playlist, the Next button works as follows: a single click will skip to the next track (double click acts as two single clicks). The next button is disabled when there is no content in the current playlist.

Skip Rules for Basic users: The user gets 6 skips per hour on each station, regardless of the track length. There are a few limitations: if the user skips in the last 3 seconds, it is considered a full play, if the user skips in the last 4-10 seconds, it is considered neither a full play nor a skip (doesn't affect your limit); The user gains one skip back two ways: 1) every 3 songs played in full on that station (regardless of song length), or 2) every 10 min—whether or not the user is listening to that station. So if the user does not skip on a station (whether or not you listen to it), they gain all of the skips back in one hour. You cannot gain more than 6 skips. Thus if you listen for 2 hours without skipping, you still will only be able to skip 6 times. If the server reboots, you will regain all your skips. If you are idle for a long period of time and the server ends your session, you will regain all skips when you return.

Favorites

Figure 18:
FIG. 18 is an illustration of an embodiment of a favorites functions screen in accordance with aspects of the present invention.
Figure 19:
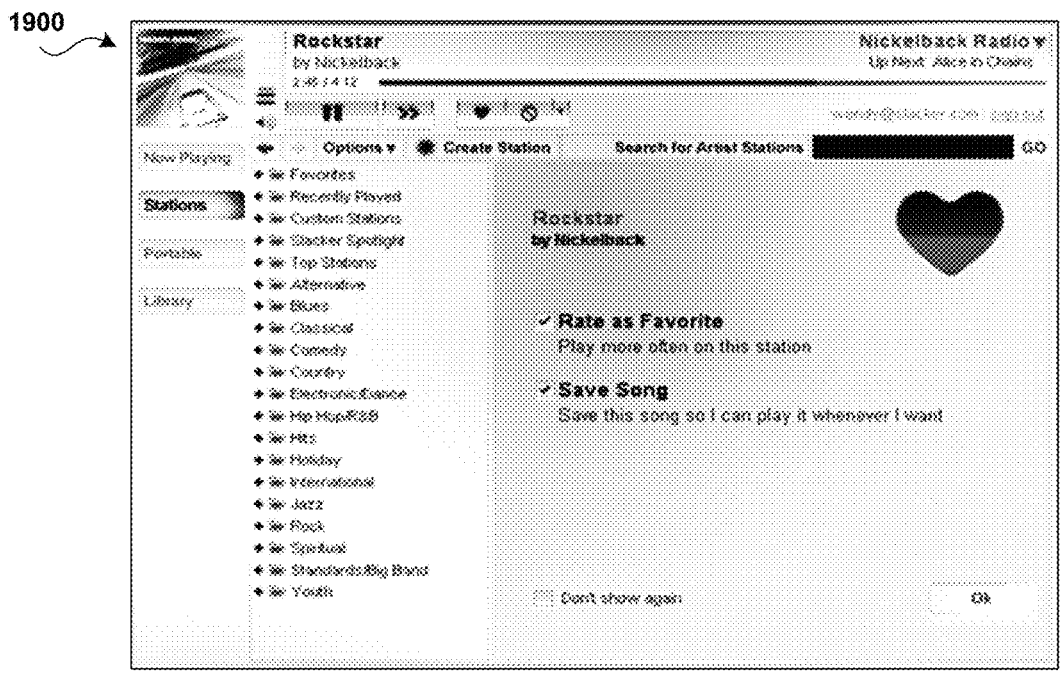
FIG. 19 is an illustration of an embodiment of a favorites function screen in accordance with aspects of the present invention.

The web player is provided with a favorites button as described previously. In accordance with one embodiment FIG. 18 illustrates a favorites display screen 1800 for users having a basic subscription. FIG. 19 illustrates a favorites display screen 1900 for users having a premium subscription. Favorites functionality on the web player is as follows:

For all users: When listening to a radio station, users press the favorites button tell the radio service to play the track more often on this radio station. Once this button is pressed, the icon changes color and remains this color for the duration of the track. If the station plays that track again, the icon is automatically colored again to show that the user previously marked it as a favorite. If the user clicks the button when the heart is yellow, nothing happens. The button is grayed out when users are listening to saved Library tracks.

In addition, a tool tip may be provided in conjunction with the favorites button. When the mouse hovers over the button, the tool tip displays the message, "Rate as favorite." If the web player is not playing a track, the tip is "No song currently playing." When the user presses this button, the web player displays feedback in two areas: the track player and the content area.

Figure 20:
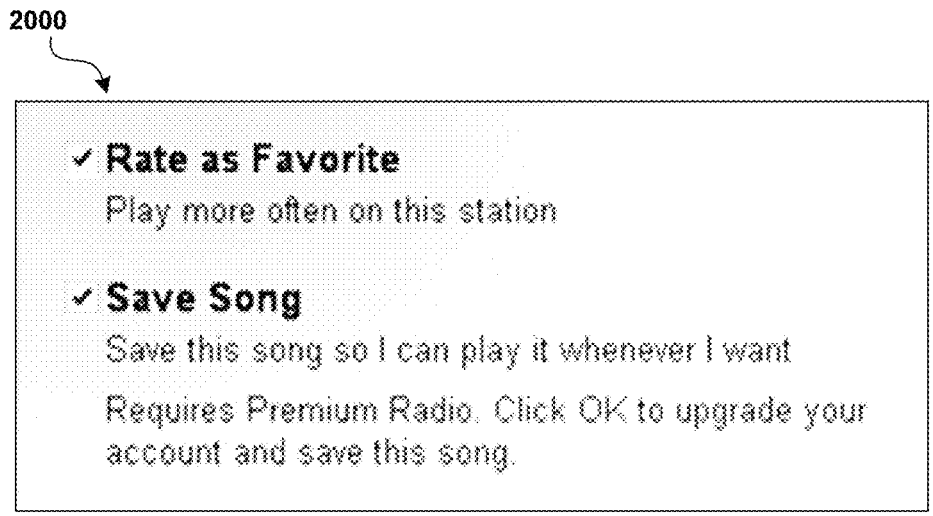
FIG. 20 is an illustration of an embodiment of a rate favorites function screen in accordance with aspects of the present invention.

Content Area Feedback—First, the web player displays a message in the content area. The message describes the actions that the user can perform: rate a song as a favorite and save a song. The "Rate as Favorite" item always is a checkbox. It is checked by delimit for all subscription levels. The "Save Song" item is a checkbox for basic subscribers and a hyperlinked mote for premium subscribers. The checkbox is unchecked by default. If the user checks the checkbox, the message displays additional text about this feature. FIG. 20 illustrates a screen shot 2000 of additional details of rate as favorites and save song functionality.

If the user then clicks OK, the web player launches a browser (or new tab in a browser) and displays a premium upgrade screen.

If a hyperlinked note—If the user clicks the link, the web player will launch another browser or tab and display a page where user can download a software player and/or upgrade service.

A "Don't show me this again" may also be provided as shown in FIG. 19. This functions as follows: for less than a premium level subscription—this checkbox is never displayed. Users will see the message ever time they press the favorite button; for Premium level subscription—this checkbox is displayed. It is unchecked by default. If the user clicks the favorite button when the heart is yellow, the web player will display this message, even if the user previously checked this checkbox.

Figure 21:
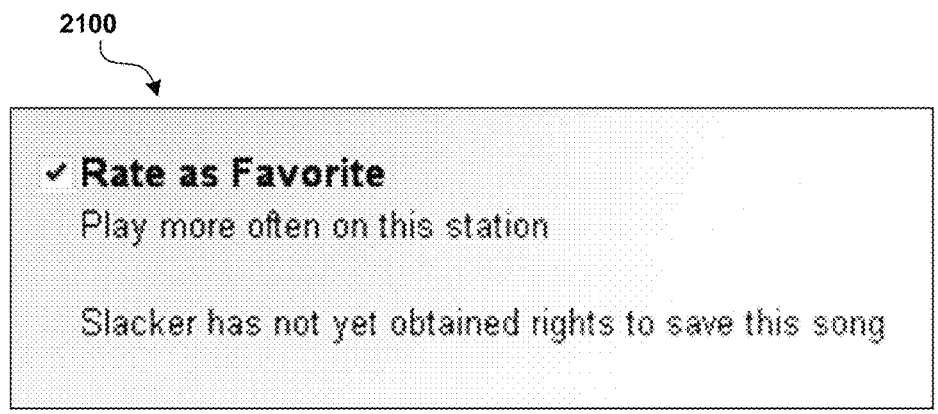
FIG. 21 is an illustration of an embodiment of a rate favorites function screen in accordance with aspects of the present invention.

Can't Save Song—There are some songs that may not be saved to the library due to licensing restrictions. When the user favorites (i.e., actuates the favorites button) a song that cannot be saved, a can't save song message as shown in screenshot 2100 of FIG. 21 may be provided.

This message may also have a "don't show again" checkbox for users with premium accounts. If a user has a premium subscription, has checked the "don't show again" checkbox, and clicks the write button, the message won't be displayed. However, the following text may be displayed in the track player, "Slacker (radio service) has not yet obtained rights to save this song."

Figure 22:
FIG. 22 is an illustration of an embodiment of a favorited song screen in accordance with aspects of the present invention.
Figure 23:
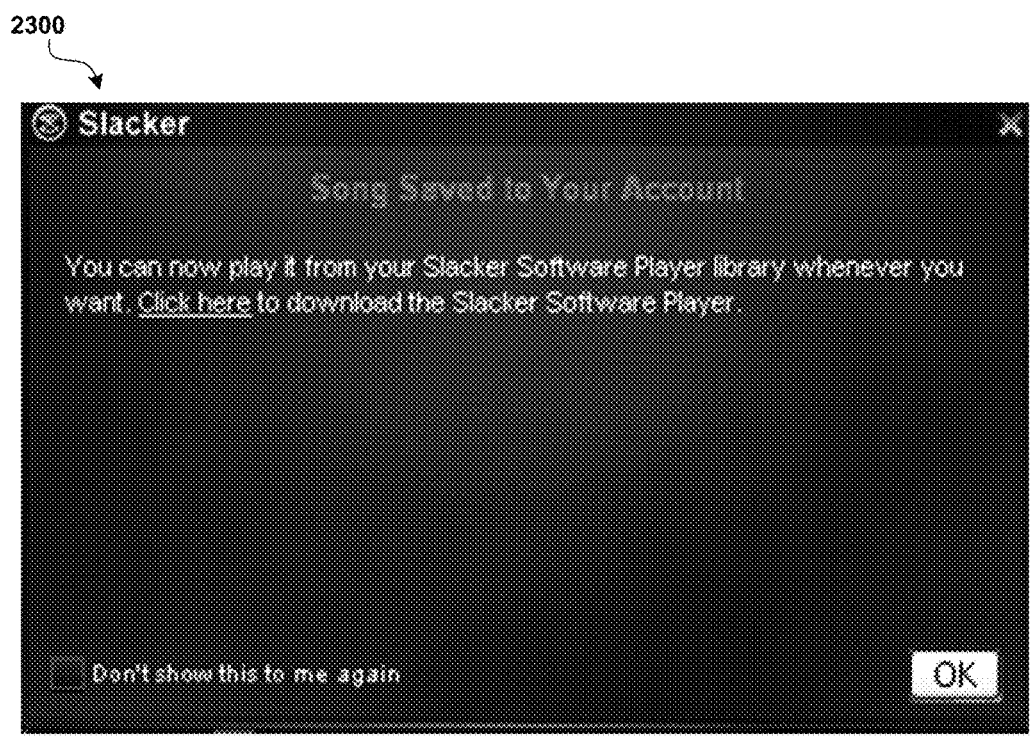
FIG. 23 is an illustration of an embodiment of a song saved screen in accordance with aspects of the present invention.
Figure 24:
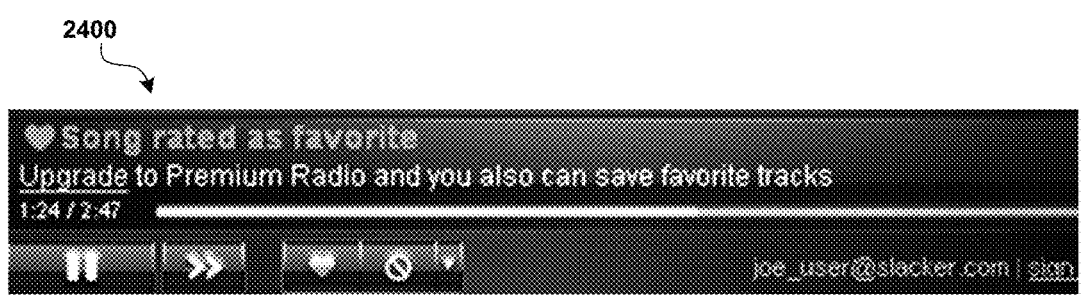
FIG. 24 is an illustration of an embodiment of a favorited song screen in accordance with aspects of the present invention.

Track Player Feedback—Once the user clicks the OK button on the message in the content the web player clears all of the text in the track player including the seek bar) and displays a message in that area. This message is displayed for 3 seconds in another color. After 3 seconds, the message is hidden and the standard track player content is redisplayed. Additional information associated with songs selected as favorites is shown in FIG. 22, FIG. 23 and FIG. 24. For users with a premium service, a song favorited message as shown in FIG. 22 is provided. The first time a user favorites a song with premium subscription the web player displays the message shown in FIG. 23, along with a don't show checkbox to dismiss the message.

For users with less than a premium level, a message as shown in screen shot 2400 is provided displaying the "Song rated as favorite" on the song line, and "Upgrade to Premium Radio and you also can save favorite songs" on the artist line. Users can click the message to learn more about premium subscriptions. The web player launches another browser (or tab) to displays an up-sell page.

Ban

The web player also provided with a ban button 112 as described previously. In some embodiments, when a user clicks the ban button, the web player bans the track from being played on the station. This feature is available to basic and premium subscribers. The ban button is grayed out when users are listening to saved Library tracks. When a user bans a track, the web player also Skips to the next track. This skip may be counted toward the number of skips allowed per hour due to DMCA laws. If the user has maxed out the number of skips, the user still can ban a track, but the track will not be skipped. Refer to the Next/Skip Forward button as described previously for details on skips and skip messaging. There may also be a tool tip for this button. When the mouse hovers over the button, the tool tip displays the following message: "Ban song from station." If the web player is not flying a track, the tip is "No track currently playing."

Some embodiments may include intros and outros. Intros and outros are DJ clips about the song to be played or just played, not advertisements. Users cannot ban advertisements. If a user bans an intro, the song it introduced is banned. If the user has a basic subscription, banning an intro counts towards the 6 skip limit. If a user bans an outro, the song it followed is banned. If a user has a basic subscription, this ban does not count toward the 6 skip limit. When the a user presses the ban button the web player can display feedback in two areas: the track player and the content area.

Figure 25:
FIG. 25 is an illustration of an embodiment of a ban function screen in accordance with aspects of the present invention.

Content Area—the first time a user presses the ban button, the web player displays a message that covers the area of the station page (the radio tree is still displayed). The message describes the ban feature. Users click OK to accept the ban or cancel to stop the ban. There may also be a "don't show me this again" checkbox at the bottom of the message, which is unchecked by default. The web player will display this message every time a user bans a track until the user checks this checkbox. FIG. 25 illustrates a first time ban screen 2500 showing the result of a ban selection in the content area.

Figure 26:
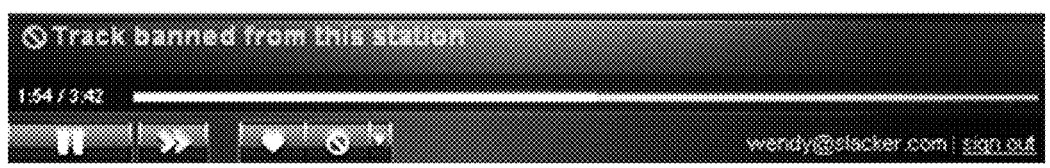
FIG. 26 is an illustration of an embodiment of a banned song screen in accordance with aspects of the present invention.

Track Player Area—once the user clicks the OK button to ban the track, the web player clears all of the text in the track player (including the seek bar) and displays a message for 3 seconds: "Song banned from this Station." After 3 seconds, the message is hidden and the standard track player content is redisplayed. This is illustrated in screen shot 2600 shown in FIG. 26. If the user clicks the Cancel button, the track is not banned, so the Web Player won't display a message in the track player.

Pull Down Menu—There may be a pull down menu to the right of the ban button. Users click the arrow to display the following menu:

Save This Song
Rate Song as Favorite
Ban Song (Or Urban Song)
Ban Artist (Or Urban Artist)
Add This Artist To Current Station The first time the user selects this menu item, the web player displays a message box. There may be one version for premium subscriptions and one for less than premium subscriptions (basic or not logged in). The premium subscription version of the message may have a "don't show again" checkbox.

Stations

Web player and jukebox application typically include the ability to receive, create, customize and render one or more radio stations, including user customized stations. In addition, stations created by the radio service may also be provided and rendered on the web player or jukebox application. In some embodiments, every radio page displays a list of radio stations on the left in a tree format. To the right of the station tree is the area for a station page. When the user signs in, the web player displays the station page for the last station played (in the previous session). When the user navigates to this screen for the very first time, all of the sections are collapsed except for the Top Stations folder. After the first time, the web player remembers the last configuration the tree and displays that configuration. Users scroll up and down the list, expanding and collapsing the various folders. When the user navigates to the desired station and clicks the station, the web player displays the station screen to the right and plays the station. The tree follows the standard interaction rules of trees in Windows Explorer.

If at any place in the UI the user clicks any control that requires the web player to contact the radio service and the web player detects that the computer has lost the internet connection, the web player displays a message indicating that, "Slacker Radio is unable to connect to the Internet."

Station Categories—There may be six categories of stations: Favorites; Recently Played; Custom Stations; Slacker Spotlight; Top Stations; Genre Stations. Each of these categories are described further below.

Favorites—Stations that the user has designated as a favorite by selecting the menu option Save to Favorite in a station page Options menu. These stations are listed in the order the user added them. The user can use the Move UP and Move Down right-click menu items to reorder these items. When the user selects Move Up (or Move Down), the station moves up or down one slot. If the user wants to move the station two slots, then the user selects the move menu option twice. In addition, users can drag-and-drop these stations to move them within the folder.

Recently Played—List of the last 10 played stations. If the user hasn't played 10 stations, then there will only the number of stations played. The most recently played station is on top.

Custom Stations—This is a list of the stations created by the user. These are displayed in alphabetical order.

Slacker Spotlight—This is a list of special event stations. This list can vary.

Top Stations—This is a list of the top stations as determined by the radio service DJ's and/or marketing team associated with the radio service. The number of stations in this list can vary.

Genre Stations—There are a number of genre station folders for genre stations based on particular criteria. The list is sorted alphabetically.

Adding Stations to the Portable Device—As discussed previously herein, a Portable Device can receive radio stations from a web player in several ways. These include radio stations shipped with the Portable Device; provided via Portable Device Manager tool; and/or via a Send to Portable feature. Each of these is further described below.

Shipped with Device—Each Portable may be shipped with radio stations pre-loaded. When users connect to the radio service (via Wi-Fi or USB), these stations are refreshed. These stations can be modified and/or deleted like all of the other radio stations.

Portable Manager Tool—The Portable Manager is a tool that enables users to add, modify, re-order, and delete stations on their Portable Device from the web player or jukebox application.

Send to Portable Feature—In each station page Options menu is the item "Send to Slacker Portable." If the user has activated a Portable, the radio service queues this station. The next time the user refreshes the Portable, the station is added to the Portable.

Refresh Schedule—Users can refresh the Portable by selecting the Connect button in the Portable's Main Menu. In addition, the Portable will attempt to refresh the content automatically every time it is connected to AC power (outlet or computer).

Station Auto Time-out—The web player has an auto time-out due to inactivity. If the web player does not detect any activity on the browser for 6 hours, the web player stops playing the station and displays a message. The message says "Are you still looking? Press Play to continue." There is a Play button on the message. If the user presses the Play button, the station begins playing the station again. There is also an X (close) button on the message. If the user clicks the close button, the message is removed. There is no page change on the web player. The web player remains in an idle state. The track player displays the name of the station, but no artist, track, or up next information. The web player will display this message if a track is paused for 6 hours. If the user presses Play, the web player plays the track from the point the track was paused. If the user presses the X button, the actions are as described in the previous paragraph.

Genre Stations

Figure 27:
FIG. 27 is an illustration of embodiment of a genre station screen in accordance with aspects of the present invention.

When the user selects a station, the web player displays the station page. The screen displays the following information: Station Name; Image associated with Station; Play button; Station Options; Station description; Artists On This Station. FIG. 27 illustrates a screen shot 2700 of a Genre Station with associated content. Each radio service station has unique content associated with it including a graphic and description text.

Station Name—The station page displays the name of the station in two areas; above the play button and below the station picture. Above the play button—if the name of the station is longer than one line, the web player truncates the name and puts ellipses after the name. Below the station picture—if the name of the station is longer than one line, the web player wraps the name so the entire name is displayed. The web player appends the word "radio" after the station name for genre stations. The web player only displays the station name (e.g., Alternative or Pearl Jam) on this line. It does not display the station type on this line. The station type is displayed on the next line (in the right column only, not displayed below the station picture). The are the designator types: Genre station: Radio; Artist match station: Radio; Custom station: Mix.

Station Graphic—When the user places the cursor over the station art, the arrow changes to the hand graphic (to show it's clickable) and the web player displays the following tooltip: Click to scroll through "Now Playing" views. When users click this art, the web player displays the Album Art Now Playing view. Then the user can click the Now Playing art to cycle through the Now Playing views. If the user starts looping through the Now Playing views from the station page, the user will loop back to the station page. When the user is viewing the station page, the Station sidebar button is highlighted. While the user is viewing a Now Playing page, the Now Playing sidebar button is highlighted. If the user starts looping through the Now Playing views from a Now Playing view, then the station page is not included in the loop. If the web player does not have an image for the station page, then the web player displays the most popular album graphic. If the web player has no image at all to display, then the web player displays a smaller, landscape orientation of the radio service logo, which is blended into the background.

Station Options—The Station Options menu includes the following items:
Edit Station;
Send to Slacker Portable (or Remove from Slacker Portable)
Share This Station
Save to Favorites (or Remove from Favorites if this station is a favorite)
Delete Station (only active on custom stations)

Edit Station—when the user selects this item, the web player displays the Edit Station feature as further described below.

Figure 28:
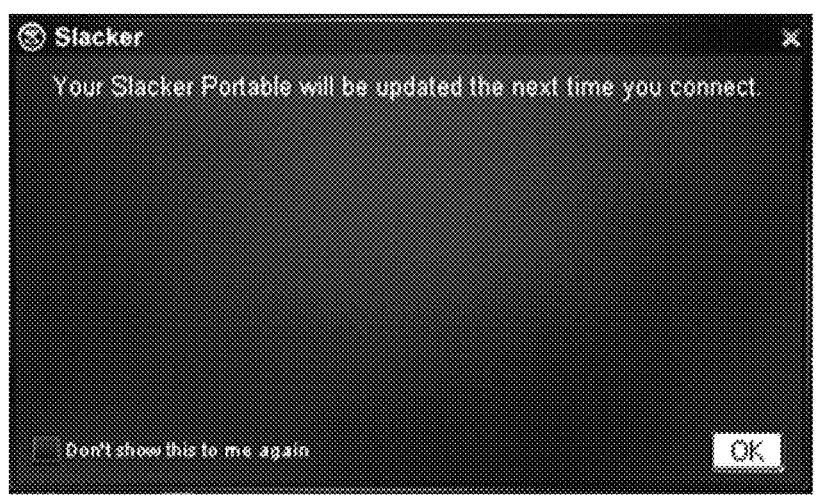
FIG. 28 is an illustration of an embodiment of an update portable screen in accordance with aspects of the present invention.

Send to Portable—If the user has not activated a Portable the web player will display a message in the content area to tell users about the Slacker Portable. There is a link in this message. If the user clicks the link, the web player will launch a new browser window or tab with content to up-sell the Slacker Portable. If the user has activated a Portable web player, will tell the Slacker service to add this station to the Portable the next time the user refreshes the Portable. In addition, the web player will display a confirmation message as shown in screen shot 2800 of FIG. 28.

Figure 29:
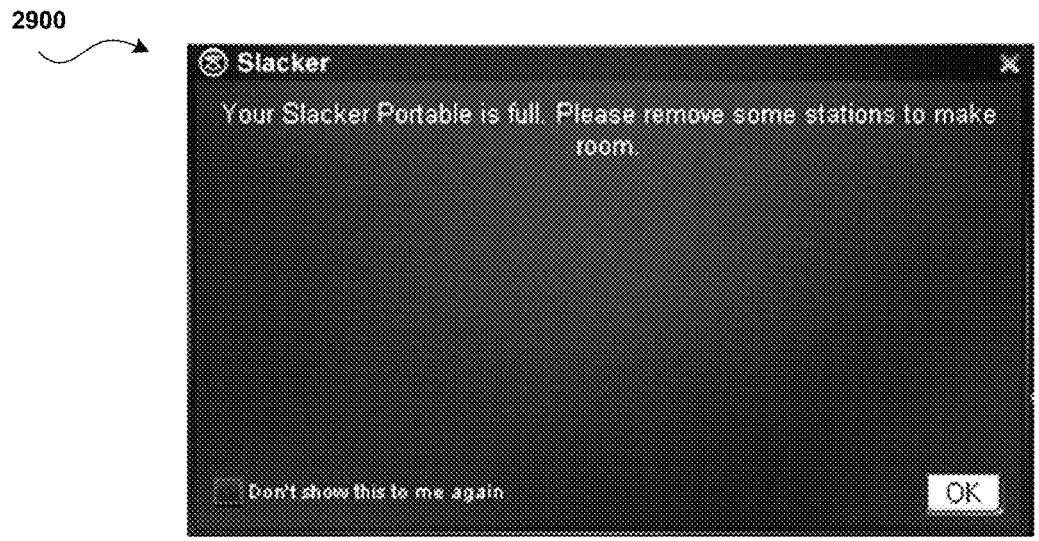
FIG. 29 is an illustration of an embodiment of a portable full message screen in accordance with aspects of the present invention.

When users view the Station Options list again, the menu item will say Remove from Slacker Portable. Users select this item to remove the station from the Slacker Portable. Users also can add and remove stations via the Portable Manager. If the Slacker Portable already is holding the maximum number of stations, then the web player displays the following portable full message shown in screen shot 2900 of FIG. 29 when the user selects the Send to Slacker Portable menu item.

Figure 30:
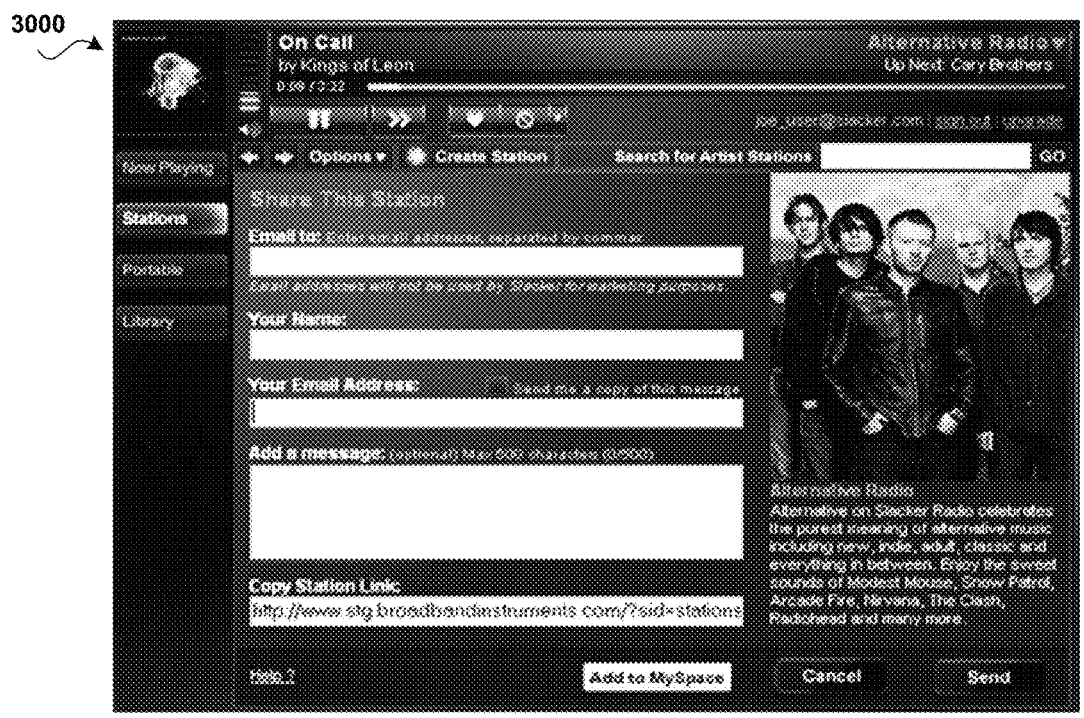
FIG. 30 is an illustration of an embodiment of a share station screen in accordance with aspects of the present invention.

Share This Station—As described previously, a screen may be provided to allow user to share a station. A screen shot 3000 of this functionality is shown in FIG. 30. When the user clicks a Share This Station button, the web player displays a form in the content area. The user fills out the form and clicks Send. The Email to, Your Name, and Your Email Address are required. When the user clicks Send (or Cancel), the user returns to the screen from which the user initiated the task.

Figure 31:
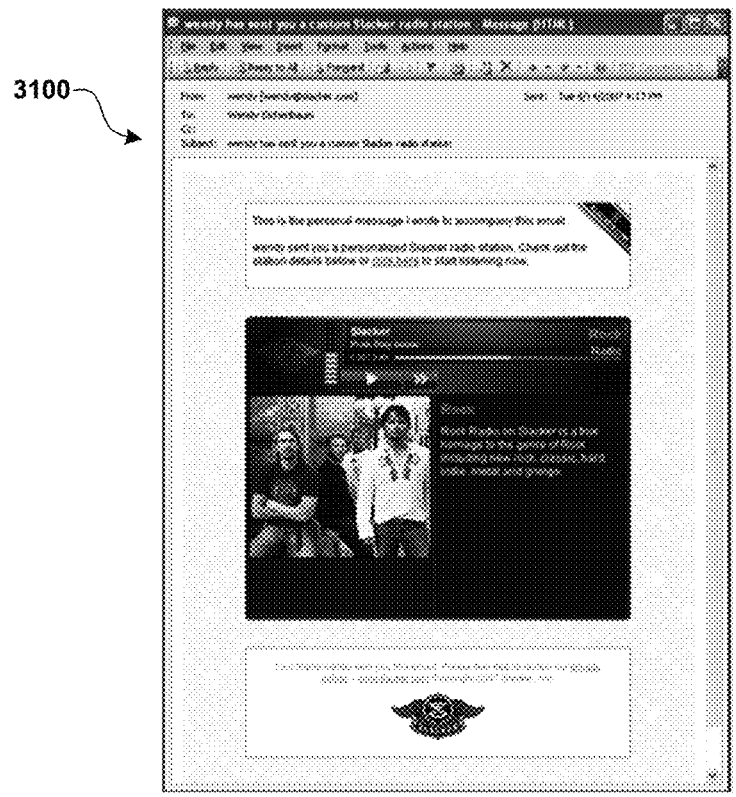
FIG. 31 is an illustration an embodiment of a share station email in accordance with aspects of the present invention.

When the recipient receives the email, he or she clicks the link. A new browser window opens, even if the user is currently running a web player or jukebox application. The web player is displayed in the Window and plays the station. FIG. 31 illustrates a screen shot 3100 of a share this station email.

Figure 32:
FIG. 32 is an illustration of an embodiment of an add to myspace screen in accordance with aspects of the present invention.

A display screen may also be provided to allow users to add a mini version of the web player to their MySpace page or a similar social networking web page. To do this, they click the Add to MySpace button. When they do this, a screen 3200 as is shown in FIG. 32 is displayed. Users click the radio button next to desired style of player that will appear in their MySpace page. Next they highlight all of the text (code) in the text box. Finally they go to their MySpace page, go into edit mode, and enter the code in the "About Me" section. When they save their changes, they will see the player listed on their MySpace site in the "About Me" section. The player is the size they chose on the radio service website. The size cannot be changed on the MySpace page. The player is typically configured to only play one station, the station on which they selected Share This Station. To change the station; delete the code on the MySpace page, select another station on the radio service and follow the add steps. To change the player side; delete the code on the MySpace page, select the same station on the radio service but choose the other player size before copying the code for the MySpace page. To provide multiple stations, paste code from multiple add procedures in the "About Me" section.

Save to Favorites—When the user selects this feature, the web player designates this station as a favorite and lists this station in the Favorites stations folder. This feature does not affect what music is played on this station. If a station is favorited, then this menu item becomes "Remove from Favorites." Users select this item to remove the station from the Favorites folder.

Delete Station—Delete Station removes the station from the station tree. Once the user deletes the station, the user cannot play it again. If the station is on the Portable, the station will be removed from the Portable the next time the Portable is refreshed. This item is displayed only on custom stations. It is not displayed if a user has made the station a favorite. The user must remove the favorite designation before the user can delete the station.

Play Button—when the user presses the play button, the web player clears out whatever content is in the Current Playlist, adds the station, and plays the station. The button has a glow whenever in active state or the mouse pointer hovers over the button. When the user plays the station, the web player displays a different version of the button. The arrow is hidden and the text says Playing rather than Play.

Artists On This Station—This is a list of the artists that are played on the current station, with each artist hyperlinked. When the user clicks on the link, the web player displays an Artist page, if the radio service does not have enough content to play an artist mix station for that artist, then the artist is not listed in this field.

Figure 33:
FIG. 33 is an illustration of an embodiment of a related artists screen in accordance with aspects of the present invention.

Each screen lists up to ten related artists as shown in screen shot 3300 of FIG. 33. The user pages through each screen, up to five screens (50 artists) worth of related artists. To page through the screens, the user clicks on one of the circles to the right of artists. There is a circle for each screen. The current screen is highlighted, if there is only page worth of related artists, then the web player does not display the circles. The user can also scroll up and down the list with the arrows.

Related Artist—when a user right clicks over an item in the list, the web player displays a right click menu with the following options: Add This Artist To Current Station; Ban This Artist From Current Station. These operate as follows:

Add This Artist To Current Station Option—When the user selects this item, the web player adds this station as an influencer to the radio station in the current playlist. If the station is the currently playing station, then the menu item is grayed out. The flow is as follows:

1. User selects the Add This Artist To Current Station menu item.

2. Web player displays a message in the track player "Station settings saved" and the word "ADDED" appears next to the mouse cursor.

3. When mixed, web player begins playing that mixed station. The station name in the upper right-hand corner of the web player is changed to reflect the new station. The new name is the Artist's Name with the word Mix appended to it; Pearl Jam Radio would become Pearl Jam Mix. (if the web player is playing a song while the user mixes in artists, the song is not interrupted. If the currently playing station already was a mix station (not an original genre or artist station), then the name does not change. The radio service just saves changes to that currently playing station.

Ban This Artist From Current Station—This options tells the radio service not to play the artist on the station, as described previously with respect to the ban function.

Artist Station

Artist stations are mix stations that play the music of a particular artist and of other artists that are similar to that artist. These stations are named by the name of the principal artist. For example, the station based upon the group Pearl Jam is called Pearl Jam Radio. These stations are not displayed in the left column tree. To access these stations, users click an artist hyperlink in the Related Artists section or they use the search feature. Artist station pages have the same fields as a genre station pages. The list of artists is titled Related Artists for artist stations, but titled Artists On This Station for genre and custom stations. The interaction model is the same.

Figure 34:
FIG. 34 is an illustration of an embodiment of an artist station screen in accordance with aspects of the present invention.
Figure 35:
FIG. 35 is an illustration of an embodiment of a first time play screen for an artist station in accordance with aspects of the present invention.

In addition, just below the image, the page displays a short description of the principal Artist/Band. Users can click the "more . . . " link at the bottom to view the full band description. This description is displayed in the content area. Users return to the station page by clicking the OK button at the end of the description. FIG. 34 illustrates a screen shot 3400 of an Artist Station. The first time a user plays an artist station, the web player displays a message that covers the station page. The station tree is still displayed and describes what is playing. Users click the OK button to dismiss the message and show the station page again. There is also a "don't show again" checkbox that is unchecked by default. FIG. 35 illustrates a screen shot 3500 of a first time play artist station message.

Custom Stations

The web Player also allows users to create and play custom stations. When the user plays a custom station, the web player display's the Custom Station screen. The screen is formatted similar to the way the Artist and Genre station screens are formatted. The screen displays the image of one of the artists on the station and a station description (which is a list of a few of the artists on this station). Users can change the image and station description in a station editor screen. Every time a user creates a custom station, the station is added to the Custom Stations folder (in the station tree). When a station is created, the folder is expanded so users can see the station was added.

Creating and Editing Custom Stations

Both web player and software player (jukebox) embodiments may include a set of displays and controls to allow users to create and customize stations. The description below applies to either embodiment. A custom stations tool allows users to edit Slacker (radio service) created stations including genre and artist stations. In addition, users can be provided with displays and functionality to create and edit their own custom stations. There are a number of controls that allow users a wide customization. Users can add, modify, and delete the following components: Station Name; Artists in Rotation; Favorite Track List; Ban Artist & Track List; as well as Attribute Sliders.

Figure 36:
FIG. 36 is an illustration of an embodiment of a create station screen in accordance with aspects of the present invention.

Create a Custom Station Tool—the Create Station tool enables users to create a custom station from scratch. The user interface initially displays the Artists tab with no artists listed as shown in screen 3600 of FIG. 36. The user then uses the tab to populate the station with the desired artists. To do this, they type a name of a group in the text box in the "Enter an artist name here to add your station" column and press the Add button or hit Enter. The web player or jukebox displays that artist in the right column. The web player will add that artist whether or not the radio service has content for that artist.

Figure 37:
FIG. 37 is an illustration of an embodiment of an add artist screen in accordance with aspects of the present invention.

FIG. 37 shows another add artist screen 3700. In the left column, the web player displays the added artist at the top (in yellow to show it's been added on the right). Below the artist, the web player displays related artists. Related Artists list only displays related artists for which the radio service has content. At this point, the user can perform several tasks on this screen. The user can click the Add> button by any related artist to add that artist to the station. The artist's name is displayed on the right column and the artist is displayed in yellow on the left column. The highlight bar is displayed on the artist in the right column. If the user adds an artist that is in his banned list, the artist is removed from the banned list. The user can Click the artist's name in the left column, which performs a search on that artist. The artist is placed in the search box (at top of left column), related artists are displayed below, and the artist is added to the station (right column). The user can Click the artist's name in the right column. This performs a search on that artist. The artist is placed in the search box (at top of left column) and related artists are displayed below. The user can Click the X button next to artist in the right column. This removes the artist from the station user can Click the Add 20> button. This adds the first 20 artists displayed in the related artists list that have not already been added to the station. This button is hidden in two cases: no related artists are listed in the left column, or search results are listed in the left column.

Figure 38:
FIG. 38 is an illustration of an embodiment of an add artist screen in accordance with aspects of the present invention.

Users may add banned artists when they click the Add 20> button. This happens if the banned artist is one of the first 20 unselected artists in the left column. If a banned artist is added, the artist is removed from the banned list. If users type in an artist but there is no exact match, then the tool displays a list of possible matches. The list is the same list that is generated when users use the "Search for Artist Stations" search box. From this list, the user can perform the same tasks as above: Click the Add> button to add the artist to the station (so displayed in right column); Click the artist's name to display artists related to that artist. The artist is not added to station. FIG. 38 illustrates a screen shot 3800 of the search results for particular artists based on keyword Elvis, including multiple artists with the same or similar names.

If at any point during the create or edit station process the user clicks the back button, the web player displays a dialog box. The message warns users that they are about to leave the create/edit session and all of the work will be lost, i.e., "You are about to leave the Slacker Station Creator. You Will loose any unsaved information. Do you wish to continue?" The user can either indicate OK, they want to leave and loose changes, or No to return to the create/edit session to continue working or save changes.

Figure 39:
FIG. 39 is an illustration of an embodiment of a rate songs screen in accordance with aspects of the present invention.
Figure 40:
FIG. 40 is an illustration of an embodiment of a station fine tune screen in accordance with aspects of the present invention.

Rate Songs Tab—This is an implementation of a "Power Ratings" feature which enables users to rate their favorite songs. The radio station then will play the favorite songs more frequently. FIG. 39 illustrates a screen shot 3900 of a rate songs screen allowing users to provide ratings associated with artists/songs. On this tab, users locate songs by their favorite artists and then rate the songs. Users type in an artist in the search box and click Go (or press Enter). The Rate Songs feature populates the column on the right with songs by that artist. The initial sort is by popularity, with the most popular songs at the top. Users can resort the order by clicking the column headers. They may click on the Song column to sort songs alphabetically and they may click on the Popularity column to sort songs by popularity. The radio service will not display more than 100 songs per artist.

Users then click on the heart icon to rate the song as a favorite. This affects the station the same way as if the users clicked the Favorite button while listening to station as described previously. However, on this tab, users don't have to wait to hear a song in order to favorite it. In some embodiments users cannot use this feature to save songs to their Library; they still have to hear the song playing on a station in order to save it to the Library.

When the users click the heart icon, the heart turns yellow. These songs will appear in a Favorite tab when the users Edit the station. If the user clicks on a yellow heart, then the heart turns white and the song is un-favorited. In addition if the user selects a song by an artist that not listed in the Add Artists>Artists playing on this station list, then that artist will be added to the list.

In the left column is a list of artists related to the currently selected artist. If the user clicks a related artist, the artist is displayed in the search box at the top and the artist's songs are displayed on the right.

Fine Tune Tab—users also can further customize the station on the Fine Tune Tab, as shown in screen shot 4000 in 40, with the settings further described below. On all of the settings, there is a question mark at the top right. This is contextual help. When users click on it, the web player displays a message box with a description of the setting. The box is modal. Users must click the OK box a dismiss the box and return to the tab.

Attribute Sliders—These are the sliders shown in screen shoot 4000 and described previously herein that enable users to modify various attributes of a station. The sliders will influence the types of content the station plays by playing more content that is classified by the setting. For instance, if the user selects the setting Current for the Year attribute, then the station will play more current tracks than older/classic tracts. Sliders will be provided for particular stations based on station programming criteria and therefore not every slider will be displayed for every station. Specific selection criteria for one embodiment is further described below.

Artist Discovery—this tells the radio service frequently to play related artists rather than just the artists the user added on the Artists tab. The default setting is Off. Settings include: Off; Some; More; Max.

Popularity (Song)—this setting tells the radio service to play more tracks based upon how well known they are. The default setting is Settings include: Auto; Fringe; Unfamiliar; Familiar; Hits.

Favorites—This setting tells the radio service to play songs listed in the Favorite list more often. The default setting is Auto. Settings include: Auto; Minimum; More; Maximum.

Year—This setting tells the radio service to play more tracks based upon the year they were released. If the user selects Current, then play mostly recent songs (or songs released end of the era). If the user selects Classic, then play mostly older songs (or songs released at the beginning of the era). The default setting is Auto. Settings include: Auto; Classic; Older; Recent; Current.

Figure 41:
FIG. 41 is an illustration of an embodiment of a publish station screen in accordance with aspects of the present invention.

FIG. 41 shows a screen shot 4100 of a Create Station Publish display. From this display the user can customize the station, such as by changing the station image or adding a description, and then the user can Share the station with a friend.

Station Image—the user can select the image displayed on the station page. The "Choose a station image" column artists that the user added on the Artist tab. The artists are listed in the order that they were added. The first artist is the default (selected) artist. To change the artist, the user clicks on the radio button for another artist. Users also upload their own image by clicking load button and a java applet starts. The area that displays the list of images & station image now displays the following message: "Drag & Drop your custom image here, or click the "Browse" button to find an image on your computer to upload. Icon Images should be less than 200 k max dimensions of 200×300 pixels and either GIF or JPG format." At the bottom of this area is the browse button. The user can drag an image to the box or can click browse to display a standard file open window. The image is displayed at the end of the station image list and is selected.

Figure 42:
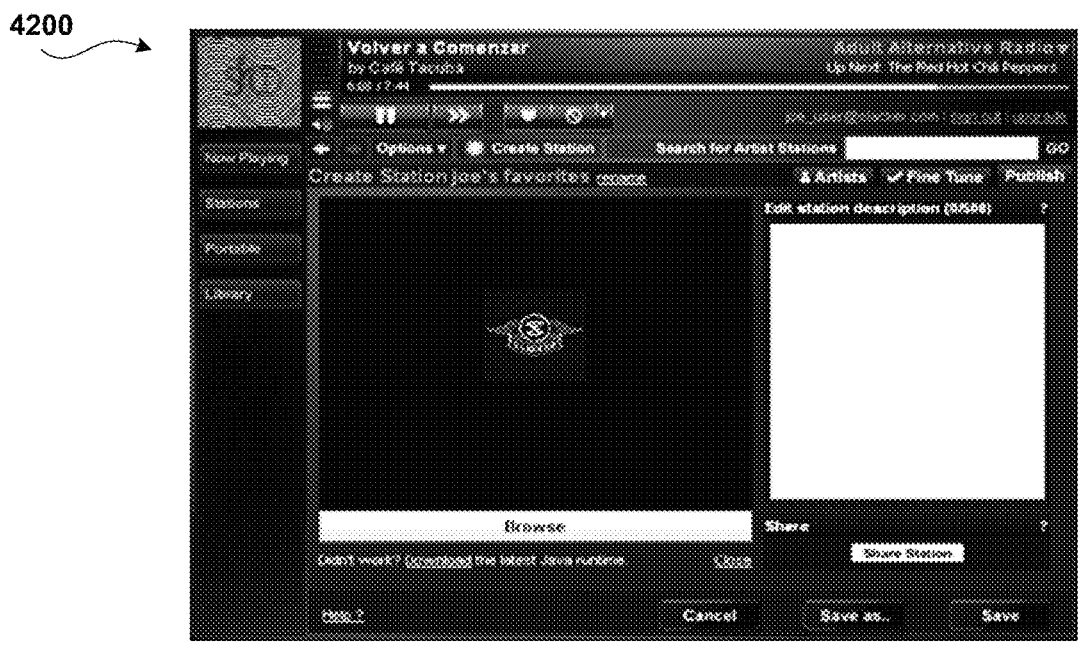
FIG. 42 is an illustration of an embodiment of a create station upload screen in accordance with aspects of the present invention.

FIG. 42 illustrates a screen shot 4200 of a create station upload image screen, if the user uploads an image before saving the station (naming the station), then the web player displays a name station dialog box. The user names the station, the web player saves the station, and then the web player returns to the Publish tab with the upload image functionality displayed. The user can enter a description of the station, up to 500 characters. There is a counter to show how many characters the user has entered. If the user does not enter a description, then the station page uses a generic description: "station NAME plays the best music from artists added. (list of artists added to station)"

Sharing stations—the user can send the station to a friend as was described previously. When the user clicks the button, the web player displays the Share This Station feature. The form is displayed in the content area (on top of the create station feature so you no longer can see the feature). When the users have filled in the form, they click Send or Cancel. In either case, the user returns to the Publish page. If the user is in the create phase (not yet saved the station), the web player first displays a dialog box to name the station.

Saving a Station—when the user is done customizing the station, the user clicks the "Save as . . . " button. The web player displays a dialog box that asks the user to enter a station name. The Save button on this dialog box remains inactive until the user enters text for the station name. This is the only way for users to name the station. The feature does not tack on any words after the user's name. (E.g., "radio" is not added to the end of the station name.) However, in the Edit Station mode, there is another way to change the station name as described below.

If the user has not entered at least 15 artists, then the radio service adds more artists until there are 15 artists. The users will see these artists the next time they edit the station. Users can then remove these radio service added artists. The radio service, however, will keep adding artists until the list has at least 15 artists. Once the users have saved the stations, the web player displays the station page for that station, and in the track player on the track name line, the web player displays a message, "Station settings saved."

Edit a Custom Station

This feature enables users to modify the stations they created with the Create Station tool or the "Add This Artist To Current Station" tool. It also enables users to customize genre and artist stations. To edit a station, users display the station page for the desired station and then select Station Options>Edit Station. In addition, users can edit the currently playing station by selection Options>Current Station>Edit Station. Once the user enters the edit mode, the web player displays an Edit Station screen the Artists tab on top.

Users can turn a genre or artist station into a custom station. To do this, the user goes into edit mode for the target station. After making the desired changes, the user presses Save As, and is prompted to rename the station. When done, the station is listed in the custom folder. The original version of the station is still available and located in station tree.

Rename Station Link—Users can rename custom stations. If they rename genre and artist stations, then the genre and artist stations become custom stations. When the user clicks this link, the station name turns into an edit box with the existing name in there. The user types in the desired name and clicks Enter to accept the changes. The user still must click the Save or Save As button to save the changes.

Save vs. Save As—Users have no choices when saving a station, Save and Save As. The Save button saves changes to the station under current name and then exits the Edit mode. The user is returned to the screen he or she was viewing before going into the Edit mode. There is one exception to this flow. If the user made changes to the Artist>Added tab on a genre or artist station (single artist, not artist mix), then the web player displays a message box. The box prompts the user to enter a new name. The user can enter the new name and click the Save button. The web player saves the changes and exits the Edit screen. Of the user can click the Cancel button to return to the Edit screen. The Save As button saves the station as a new custom station. When the user clicks Save As, the web player checks the station name. If the user has renamed the station page during this edit session, then the web player completes the save task. However, if the user has not renamed the station, then web player displays a message box that prompts the user to enter a new name. The user can enter the new name and click the Save button. The web player saves the Changes and exits the Edit screen. Or the user can click the Cancel button to return to the Edit screen. When a user clicks Save or Save As, the web player re-displays the station screen for the station just edited. And in the track player on the track name line, the web player displays a message, "Station settings saved." If the user clicks the Back button, the web player does not return the user to the Edit screen. Instead the web player displays the screen that was displayed prior on which the user clicked the customize button.

Figure 43:
FIG. 43 is an illustration of an embodiment of an artists screen for editing a station in accordance with aspects of the present invention.

FIG. 43 illustrates a screen shot 4300 of an Artists Tab station customization. To edit a station, users go to the station page, and select Station Options>Edit Station. The Edit station feature is then displayed. On the right column, the web player displays the following: Custom Station: the artists the user selected during the last session and any artists the radio service added if the user selected fewer than 15 artists; Artist Station: all of the artists playing on that station; Genre Station: all of the artists playing on that station, with a different tab format. Users add and search for artist the same way as described with respect to Create a Custom Station.

If there are fewer than 15 artists in the station, then the web player displays a message at the bottom of right column. It tells the users that if they add at least 15 artists, then the radio service typically play only music from the artists they selected. The message is hidden once the user adds the $15^{th}$ artist. If the user deletes artists so that there are fewer than 15, then the message is redisplayed.

Figure 44:
FIG. 44 is an illustration of an embodiment of an artists screen for editing genre stations in accordance with aspects of the present invention.

FIG. 44 illustrates a screen shot 4400 an Artists tab for editing Genre stations. The Artist tab is formatted differently for customizing Genre stations. Users cannot add other artists, they can only remove undesired artists. To remove an undesired artist, the user un-checks the artist. On the next edit session, the un-checked artists will not be displayed.

"Add This Artist To Current Station" Stations—Users still can create custom stations using the "Add This Artist To Current Station" feature. When they edit a station created with this feature, the right column lists all of the artists they added. If the user added fewer than 15 artists, then the radio service pre-fills the list so there are 15 artists. Users can add and remove artists just as they do with any other custom station.

Figure 45:
FIG. 45 is an illustration of an embodiment of a fine tuning screen for editing stations in accordance with aspects of the present invention.

FIG. 45 illustrated a screen shot 4500 of a Fine Tune Tab for editing customised stations. The users can adjust the Fine Tune attributes same way as described previously with respect to creating a custom station. The number of sliders will vary depending upon the type of station. For example, sliders may include: Genre Artist stations: Popularity (Song), Favorites, and Year sliders; custom stations: Artist Discovery, Popularity, Favorites, and Year.

Figure 46:
FIG. 46 is an illustration of an embodiment of a publish screen for publishing customized stations in accordance with aspects of the present invention.

FIG. 46 illustrates a screen shot 4600 of a Publish Tab for custom stations. Users can adjust the Publish attributes same way as described previously with respect to creating a custom station.

Figure 47:
FIG. 47 is an illustration of an embodiment of a publish screen for publishing a genre station in accordance with aspects of the present invention.

FIG. 47 illustrates a screen shot 4700 of a Publish Tab for Genre stations. Users cannot edit the image of genre stations, however, they can share the station as described previously with respect to creating a customized station.

Figure 48:
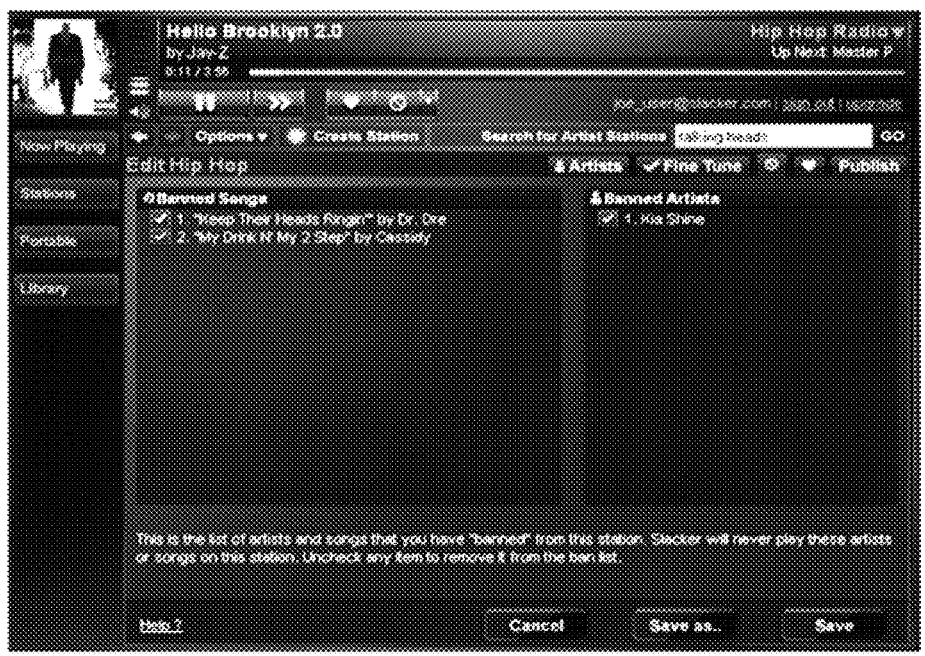
FIG. 48 is a screen shot of an embodiment of a banned tab for editing stations in accordance with aspects of the present invention.
Figure 49:
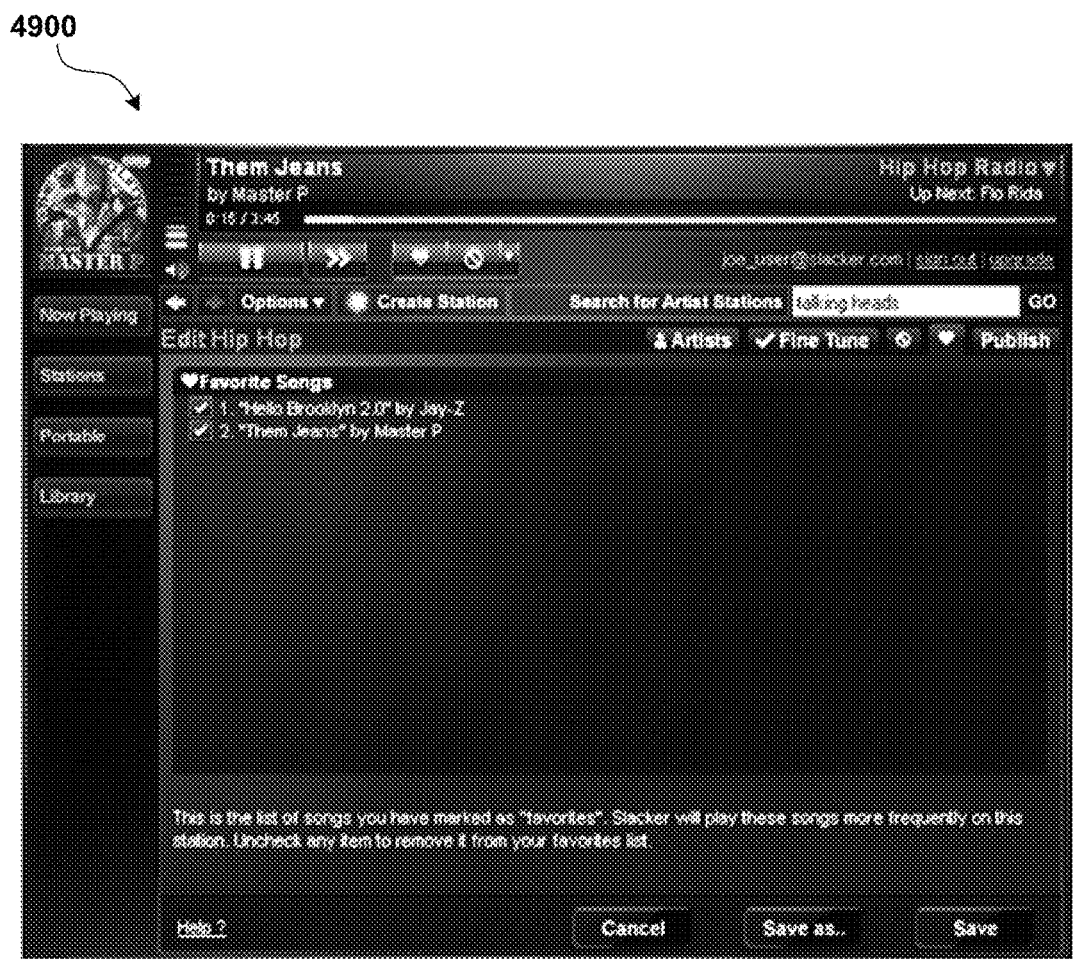
FIG. 49 is a screen shot of an embodiment of a favorites tab for editing stations in accordance with aspects of the present invention.

FIG. 48 illustrates a screen shot 4800 of a Banned Tab for editing customized stations. FIG. 49 illustrates a screen shot 4900 of a corresponding Favorites Tab. As shown in 48 and FIG. 49, the tracks are listed in alphabetical order by track title (not artist), and are listed in alphabetical order by artist name. Users can edit favorites or banned tracks by checking or unchecking the corresponding checkboxes.

Figure 50A:
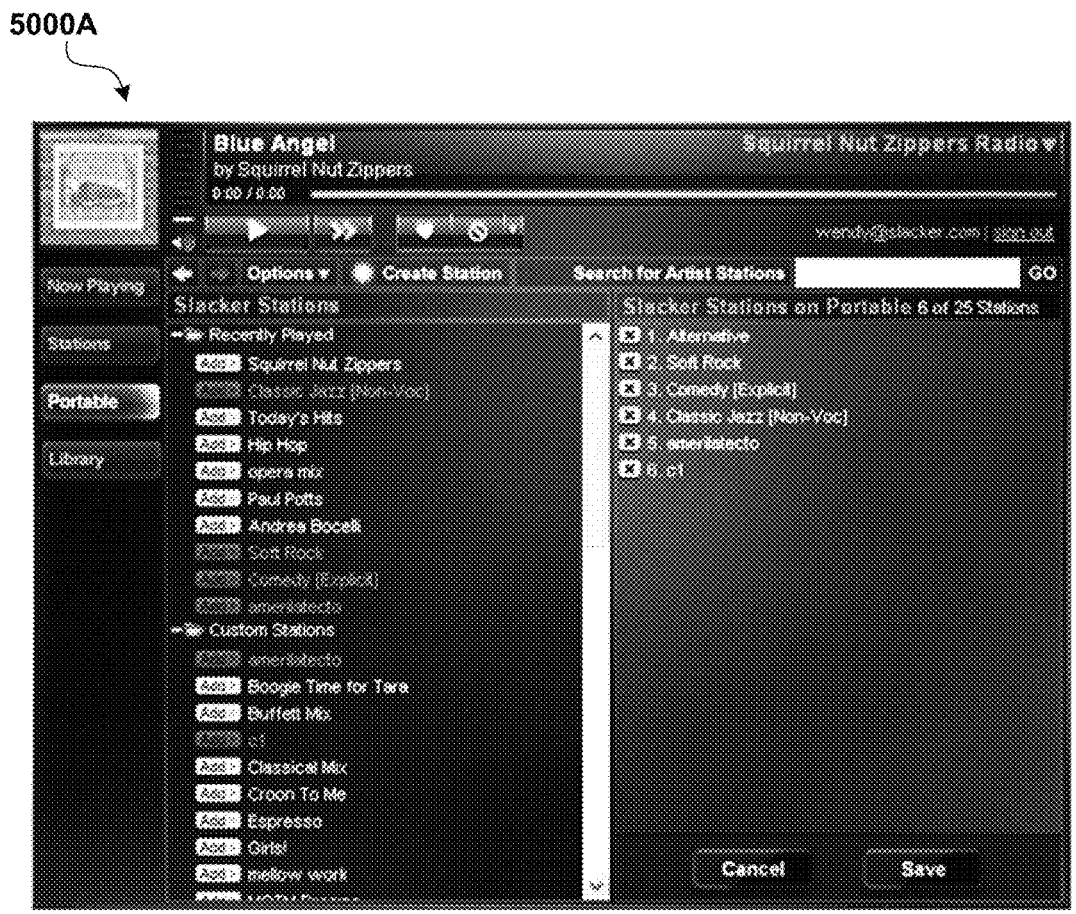
FIG. 50A is a screen shot of an embodiment of a portable manager screen for managing stations in conjunction with a portable device in accordance with aspects of the present invention.
Figure 50B:
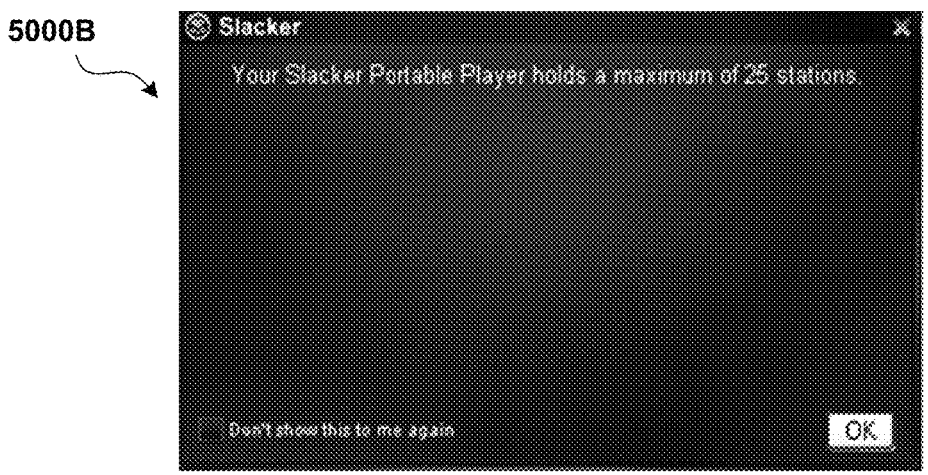
FIG. 50B is a screen shot of an embodiment of a portable device full screen in accordance with aspects of the present invention.

FIG. 50A illustrates a screen shot 5000A of a Portable Manager screen for managing stations, including user customized Stations, between a web player or jukebox application and a portable device, such as portable device 100. The Portable Manager enables users to add, modify, re-order and/or delete stations on a connected Portable Device. As shown in FIG. 50A, the left side of screen 5000A includes a list of stations in a station tree. The list includes all of the genre stations, custom stations, recently played stations and favorites. To the left of each station is an Add>button. The user selects the Add button to add the station the right column, which illustrates stations to be transferred to the portable device. The user can remove a station from the right column by clicking an X button to the left of the station name, and/or can drag and drop stations to re-order the stations in the portable device. If the user tries to add more stations than can fit on the portable device, the web player or jukebox application may display the message 5000B shown in FIG. 50B indicating that the portable device is full and no additional stations may be added.

When the user has completed the station editing, they may then select the Save button as shown in FIG. 50A to have the updated station information saved and/or transferred to the portable device. If the portable device not currently connected, a message screen 5000C as shown in FIG. 50C may be displayed indicating that the portable device will be updated during the next connection. When the user connects a portable device to the radio service, such as via a USB or Wi-Fi (802.11) connection, the radio service will update the station information in the portable device, such as is described in the related applications and in particular in U.S. Provisional Patent Application Ser. No. 60/894,879. This may be done by syncing a station list managed by the Portable Manager with a station list on the portable device so that the most recent station list is stored on the portable device.

In some embodiments, user owned or licensed content may also be managed and synchronized to the portable device via a web player or jukebox application. FIG. 50D illustrates a screen shot 5000D of a Library Manager screen for transferring content from a user's PC to a portable device. Users may add or delete personal library content and then update the portable device to include the associated content.

It is noted that in various embodiments the present invention may relate to processes such as are described or illustrated herein and/or in the related applications. These processes are typically implemented in one or more modules comprising systems as described herein and/or in the related applications, and such modules include computer software stored on a computer readable medium including instructions configured to be executed by one or more processors. It is further noted that, while the processes described and illustrated herein and/or in the related applications may include particular stages, it is apparent that other processes including fewer, more, or different stages than those described and shown are also within the spirit and scope of the present invention. Accordingly, the processes shown herein and in the related applications are provided for purposes of illustration, not limitation.

As noted, some embodiments of the present invention may include computer software and/or computer hardware/software combinations configured to implement one or more processes or functions associated with the present invention such as those described above and/or in the related applications. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language. Java, C++, or other programming languages and software development tools as are known in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of personalizing media content rendered by a media playback device configured to render sequences of content items corresponding to a plurality of personalized radio stations, comprising:
   displaying, on a display element of the device, information associated with a first of a plurality of the content items concurrently stored within a client cache of the device, said information based at least in part on metadata associated with the first of the plurality of content items;
   receiving user input through a control element of the device, said control element facilitating selection, in response to said user input, of a first attribute value;
   updating a first station profile of a plurality of station profiles included in a user profile in response to the first attribute value wherein the plurality of station profiles correspond to the plurality of personalized radio stations;
   sending, to a server, current station inventories associated with the plurality of station profiles wherein the current station inventories are based upon the plurality of content items stored within the client cache; and
   receiving, from the server, one or more content items chosen based upon the current station inventories wherein the one or more content items are received and stored by the media playback device from the server during periods in which the media playback device is connected over a network to the server;
   wherein a first of the sequences of the content items corresponding to a first personalized radio station is selected by a content sequencer for rendering by said device based upon a first of the current station inventories and the first station profile and wherein said updating said first station profile results in a change in a playback frequency on the first personalized radio station of content items classified by said first attribute value wherein at least a portion of said rendering occurs when said media playback device is not in communication with the server.

2. The method of claim 1 wherein the control element further comprises a favorites control, said method further including increasing playback frequency of certain of said plurality of content items in response to said user input.

3. The method of claim 2 wherein the first of said plurality of content items comprises an audio track.

4. The method of claim 3 wherein said updating comprises modifying the user profile to increase a playback frequency of said audio track.

5. The method of claim 3 wherein said updating comprises modifying the user profile to increase a playback frequency of content of an artist associated with said audio track.

6. The method of claim 1 wherein the control element further comprises a ban control, said method further including at least decreasing a playback frequency of certain of said plurality of content items in response to said user input.

7. The method of claim 6 wherein said first of said plurality of content items comprises an audio track.

8. The method of claim 7 wherein said updating comprises modifying the user profile to inhibit playback of the audio track.

9. The method of claim 7 wherein said updating comprises modifying the user profile to inhibit playback of content of an artist associated with the audio track.

10. The method of claim 1 further comprising:
    receiving content data; and
    selectively storing, in accordance with said user profile, portions of said content data as corresponding ones of said plurality of content items.

11. The method of claim 1 wherein said adjusting comprises toggling the DJ content from an on state to an off state or from said off state to said on state and wherein said on state is associated with rendering of said DJ content by said device.

12. The method of claim 1 further including providing said control element through a web browser executing on the device.

13. The method of claim 1 further including providing said control element through a standalone software application executing on the device.

14. The method of claim 2 further including:
    displaying a favorites list comprised of content items established in response to said user input; and
    receiving editing instructions relating to editing of said favorites list.

15. The method of claim 6 further including:
    displaying a banned list comprised of content items established in response to said user input; and
    receiving editing instructions relating to editing of said banned list.

16. The method of claim 1 further comprising creating the first station profile, the creating including:
    receiving an artist name;
    generating a set of artists for the first station profile based upon the artist name and a plurality of related artists corresponding to the artist name;
    wherein at least certain content items rendered during playback of the first personalized radio station are associated with the set of artists.

17. A method of personalizing media content rendered by a media playback device configured to render sequences of content items corresponding to a plurality of personalized radio stations, comprising:
    receiving, from a server, said media content wherein said media content includes a plurality of the content items concurrently stored within a memory of said media playback device;
    receiving user input through a station attributes control of the device, said station attributes control facilitating selection, in response to the user input, of a first attribute value; and updating, in response to the user input, a first station profile corresponding to one of the plurality of personalized radio stations;

sending, to the server, a current station inventory associated with the first station profile wherein the current station inventory is based upon the plurality of content items stored within the memory; and receiving, from the server, one or more content items chosen based upon the current station inventory wherein the one or more content items are received and stored by the media playback device from the server during periods in which the media playback device is connected over a network to the server;

wherein a first of the sequences of the content items corresponding to the one of the plurality of personalized radio stations is selected by a content sequencer for rendering by said device based upon the current station inventory and the first station profile and wherein at least a portion of said media content is rendered when said media playback device is not in communication with said server and wherein said updating said first station profile results in a change in a playback frequency on the one of the plurality of personalized radio stations of content items classified by said first attribute value.

18. The method of claim 17 wherein the station attributes control comprises a popularity input control.

19. The method of claim 17 wherein the station attributes control comprises an energy input control.

20. The method of claim 17 wherein the station attributes control comprises a year input control.

21. The method of claim 17 wherein the station attributes control comprises an artists input control responsive to select a variety of artists to be played.

22. A non-transitory machine readable medium having instructions thereon, the instructions being executed by a processor to perform a method of personalizing media content rendered by a media playback device configured to render sequences of content items corresponding to a plurality of personalized radio stations, the method comprising:

displaying, on a display element of the device, information associated with a first of a plurality of the content items concurrently stored within the device, said information based at least in part on metadata associated with the plurality of content items;

receiving user input through a control element of the device, said control element facilitating selection, in response to said user input, of a first attribute value;

updating a first station profile of a plurality of station profiles included in a user profile in response to the selection of the first attribute value updating a first station profile of a plurality of station profiles included in a user profile in response to the first attribute value wherein the plurality of station profiles correspond to the plurality of personalized radio stations;

sending, to a server, current station inventories associated with the plurality of station profiles wherein the current station inventories are based upon the plurality of content items stored within the device; and receiving, from the server, one or more content items chosen based upon the current station inventories wherein the one or more content items are received by the media playback device from the server during periods in which the media playback device is connected over a network to the server;

wherein a first of the sequences of the content items corresponding to a first personalized radio station of the plurality of stations is selected by a content sequencer for rendering by said device based upon a first of the current station inventories and the first station profile and wherein said updating said first station profile results in a change in a playback frequency on the first personalized radio station of content items classified by said first attribute value and wherein at least a portion of said rendering occurs when said media playback device is not in communication with the server.

23. The non-transitory machine readable medium of claim 22 wherein the control element further comprises a favorites control, said method further including increasing a playback frequency of certain of said plurality of content items in response to said user input.

24. The non-transitory machine readable medium of claim 23 wherein the first of the plurality of content items comprises an audio track and said updating comprises modifying the user profile to increase a playback frequency of content of an artist associated with the audio track.

25. The non-transitory machine readable medium of claim 22 wherein the control element further comprises a ban control, the machine readable medium having additional instructions which, when executed by the processor, at least decrease a playback frequency of certain of said plurality of content items in response to said user input.

26. The non-transitory machine readable medium of claim 25 wherein the first of the plurality of content items comprises an audio track and said updating comprises modifying the user profile to decrease a playback frequency of content of an artist associated with the audio track.

27. The non-transitory machine readable medium of claim 22 having additional instructions executed by the processor to:

receive content data; and selectively store, in accordance with said user profile, portions of said content data corresponding to said plurality of content items.

28. The non-transitory machine readable medium of claim 23 having additional instructions executed by the processor to:

display a favorites list comprised of content items established in response to said user input; and receive editing instructions relating to editing of said favorites list.

29. The non-transitory machine readable medium of claim 25 having additional instructions executed by the processor to:

display a banned list comprised of content items established in response to said user input; and receive editing instructions relating to editing of said banned list.

30. A non-transitory machine-readable medium having instructions thereon, the instructions being executed by a processor to perform a method of personalizing media content rendered by a media playback device configured to render sequences of content items corresponding to a plurality of personalized radio stations, the method comprising:

receiving, from a server, said media content wherein said media content includes a plurality of the content items concurrently stored within a memory of said media playback device;

receiving user input through a station attributes control of the device, said station attributes control facilitating selection, in response to said user input, of a first attribute value;

updating, in response to the selection of the first attribute value, a first station profile corresponding to one of the plurality of personalized radio stations;

sending, to the server, a current station inventory associated with the first station profile wherein the current station inventory is based upon the plurality of content items stored within the memory; and receiving, from the server, one or more content items chosen based upon the current station inventory wherein the one or more content items are received by the media playback device from the server during periods in which the media playback device is connected over a network to the server;

wherein a first of the sequences of the content items corresponding to the one of the plurality of personalized radio stations is selected by a content sequencer for rendering by said device based upon the current station inventory and the first station profile and wherein at least a portion of said media content is rendered when said media playback device is not in communication with said server and wherein said updating said first station profile results in a change in a playback frequency on the one of the plurality of personalized radio stations of content items classified by said first attribute value.

* * * * *